United States Patent
Khaligh et al.

(10) Patent No.: US 10,562,404 B1
(45) Date of Patent: Feb. 18, 2020

(54) INTEGRATED ONBOARD CHARGERS FOR PLUG-IN ELECTRIC VEHICLES

(71) Applicant: UNIVERSITY OF MARYLAND, College Park, MD (US)

(72) Inventors: Alireza Khaligh, Arlington, VA (US); Yichao Tang, Santa Clara, CA (US); Chuan Shi, College Park, MD (US)

(73) Assignee: University of Maryland, College Park, MD (US)

( * ) Notice: Subject to any disclaimer, the term of this patent is extended or adjusted under 35 U.S.C. 154(b) by 372 days.

(21) Appl. No.: 15/285,062

(22) Filed: Oct. 4, 2016

Related U.S. Application Data

(60) Provisional application No. 62/237,205, filed on Oct. 5, 2015.

(51) Int. Cl.
```
H02J 7/00      (2006.01)
B60L 50/10     (2019.01)
B60L 53/24     (2019.01)
```

(52) U.S. Cl.
CPC ............. *B60L 53/24* (2019.02); *B60L 50/10* (2019.02); *H02J 7/0077* (2013.01); *B60L 2210/10* (2013.01); *B60L 2210/20* (2013.01); *B60L 2210/30* (2013.01)

(58) Field of Classification Search
USPC .................................. 320/107, 108, 109
See application file for complete search history.

(56) References Cited

U.S. PATENT DOCUMENTS

| | | | | |
|---|---|---|---|---|
| 4,920,475 A | * | 4/1990 | Rippel | B60L 11/1803 363/132 |
| 5,099,186 A | * | 3/1992 | Rippel | B60L 3/0023 318/803 |
| 5,341,075 A | * | 8/1994 | Cocconi | B60L 11/1811 307/66 |
| 2012/0049792 A1 | * | 3/2012 | Crombez | B60L 11/1862 320/109 |
| 2012/0303397 A1 | * | 11/2012 | Prosser | H02J 7/0054 705/7.12 |
| 2015/0061569 A1 | * | 3/2015 | Alexander | B60L 11/1809 320/101 |

(Continued)

OTHER PUBLICATIONS

A. Emadi, et al., "Power electronics intensive solutions for advanced electric, hybrid electric, and fuel cell vehicular power systems," IEEE Trans. Power Electronics, vol. 21, No. 3, pp. 567-577, May 2006.

(Continued)

*Primary Examiner* — Alexis B Pacheco
(74) *Attorney, Agent, or Firm* — Rosenberg, Klein & Lee

(57) ABSTRACT

An onboard charger for both single-phase (level-1 and level-2, up to 19.2 kW) and three-phase (level-3, above 20 kW) charging of a battery in Plug-in Electric Vehicles (PEVs) is integrated with the Propulsion machine-Inverter Group residing in the PEV, and is controlled to operate in propulsion and battery charging modes. The subject integrated onboard charger provides battery charging at the rated power of the Propulsion machine, does not need motor/inverter rearrangement, does not require additional bulk add-on passive components, provides an effective input current ripple cancellation, and operates without rotation of the Propulsion machine during the steady state charging.

10 Claims, 47 Drawing Sheets

(56) References Cited

U.S. PATENT DOCUMENTS

2016/0129794 A1* 5/2016 Huang ............... B60L 11/1838
 320/108

OTHER PUBLICATIONS

A. Gaeta, et al., "Modeling and control of three-phase PMSMs under open-phase fault," IEEE Trans. on Industry Applications, vol. 49, No. 1, pp. 74-83, Jan./Feb. 2013.

A. Khaligh and S. Dusmez, "Comprehensive topological analysis of conductive and inductive charging solutions for plug-in electric vehicles," IEEE Trans. Vehicular Technology, vol. 61, No. 8, pp. 3475-3489, Oct. 2012.

C. C. Chan, et al., "Electric, hybrid, and fuel-cell vehicles: architectures and modeling," IEEE Trans. Vehicular Technology, vol. 59, No. 2, pp. 589-598, Feb. 2010.

C. Wang, "Investigation on interleaved boost converters and applications," PhD Dissertation, Dept. Elec. Eng., Virginia Poly. Inst. State Univ., Jul. 2009.

D. C. Erb, et al., "An integrated bi-directional power electronic converter with multi-level AC-DC/DC-AC converter and non-inverted buck-boost converter for PHEVs with minimal grid level disruptions," in Proc. IEEE Vehicle Power Propulsion Conf., pp. 1-6, Sep. 2010.

D. C. Erb, et al., "Bi-directional charging topologies for plug-in hybrid electric vehicles," in Proc. IEEE Applied Power Electronics Conf. Expo., pp. 2066-2072, Feb. 2010.

D. Gautam, et al., "A zero voltage switching full-bridge DC-DC converter with capacitive output filter for a plug-in-hybrid electric vehicle battery charger," in Proc. IEEE Applied Power Electronics Conf. Expo., Orlando, FL, pp. 1381-1386, May 2012.

D. Gautam, et al., "An automotive onboard 3.3 kW battery charger for PHEV application," IEEE Trans. Power Electronics, vol. 61, No. 8, pp. 3466-3474, Oct. 2012.

D. Y. Ohm, "Dynamic model of PM synchronous motors," Drivetech, Inc., Blacksburg, Virginia, www.drivetechinc.com 16 (2000).

E. Inoa and J. Wang, "PHEV charging strategies for maximized energy saving," IEEE Trans. on Vehicular Technology, vol. 60, No .7, pp. 2978-2986, Sep. 2011.

G. Pellegrino, et al., "An integral battery charger with power factor correction for electric scooter," IEEE Trans. Power Electronics, vol. 25, No. 3, pp. 751-759, Mar. 2010.

G. J. Su and L. Tang, "Current source inverter based traction drive for EV battery charging applications," in Proc. IEEE Vehicle Power Propulsion Conf., pp. 1-6, Sep. 6-9, 2011.

H. C. Chang and C. M. Liaw, "An integrated driving/charging switched reluctance motor drive using three-phase power module," IEEE Trans. Industrial Electronics, vol. 58, No. 5, pp. 1763-1775, May 2011.

H. Chen, et al., "A single stage integrated bidirectional AC/DC and DC/DC converter for plug-in hybrid electric vehicles," in Proc. IEEE Vehicle Power Propulsion Conf., pp. 1-6, Sep. 6-9, 2011.

H. J. Chae, et al., "3.3 kW on board charger for electric vehicle," in Proc. Int. Conf. Power Electronics, Shilla Jeju, Korea, pp. 2717-2719, May 30-Jun. 3, 2011.

H. J. Chae, et al., "On-board battery charger for PHEV without high-voltage electrolytic capacitor," Electronics Letters, vol. 46, No. 25, pp. 1691-1692, Dec. 2010.

J. de Santiago, et al., "Electrical motor drivelines in commercial all-electric vehicles: a review," IEEE Trans. on Vehicular Technology, vol. 61, No. 2, pp. 475-484, Feb. 2012.

J. G. W. West, "DC, induction, reluctance and PM motors for electric vehicles," Power Engineering J., vol. 8, No. 2, pp. 77-88, Apr. 1994.

J. P. M. Figuerido, et al., "A review of single-phase PFC topologies based on the boost converter," in Proc. IEEE/IAS Int. Conf. Industrial Applications, Sao Paulo, Brazil, pp. 1-6, Nov. 8-10, 2010.

J. S. Kim, et al., "Design and implementation of a high-efficiency onboard battery charger for electric vehicles with frequency control strategy," in Proc. IEEE Vehicle Power Propulsion Conf., Lille, France, pp. 1-6, Sep. 2010.

K. T. Chau, et al., "Overview of permanent-magnet brushless drives for electric and hybrid electric vehicles," IEEE Trans. Industrial Electronics, vol. 55, No. 6, pp. 2246-2257, Jun. 2008.

L. Solero, "Nonconventional on-board charger for electric vehicle propulsion batteries," IEEE Trans. Vehicular Technology, vol. 50, No. 1, pp. 144-149, Jan. 2001.

M. Yilmaz and P. T. Krein, "Review of battery charger topologies, charging power levels, and infrastructure for plug-in electric and hybrid vehicles," IEEE Trans. Power Electronics, vol. 28, No. 5, pp. 2151-2169, May 2013.

S. Dusmez and A. Khaligh, "A novel low cost integrated on-board charger topology for electric vehicles and plug-in hybrid electric vehicles," in Proc. Applied Power Electronics Conf., pp. 2611-2616, Feb. 2012.

S. Dusmez and A. Khaligh, "Cost effective solutions to level 3 on-board battery chargers," in Proc. Applied Power Electronics Conf., pp. 2121-2127, Feb. 5-8, 2012.

S. Haghbin, et al., "An isolated high-power integrated charger in electrified-vehicle applications," IEEE Trans. Vehicular Technology, vol. 60, No. 9, pp. 4115-4126, Nov. 2011.

S. Haghbin, et al., "Grid-connected integrated battery chargers in vehicle applications: review and new solution," IEEE Trans. Industrial Electronics, vol. 60, No. 2, pp. 459-473, Feb. 2013.

S. Lacroix, et al., "An integrated fast battery charger for electric vehicle," in Proc. IEEE Vehicle Power Propulsion Conf., pp. 1-6, Sep. 1-3, 2010.

S. K. Sul and S. J. Lee, "An integral battery charger for four-wheel drive electric vehicle," IEEE Trans. Industrial Applications, vol. 31, No. 5, pp. 1096-1099, Sep./Oct. 1995.

T. Bohn, "Plug-in electric (PEV) standards, upcoming PEVs/ features, charging system overview," U.S. Dept. of Energy, Clean Cities Coalition, Feb. 27, 2012.

Y. J. Lee, et al., "Advanced integrated bidirectional AC/DC and DC/DC converter for plug-in hybrid electric vehicles," IEEE Trans. Vehicular Technology, vol. 58, No. 8, pp. 3970-3980, Oct. 2009.

* cited by examiner

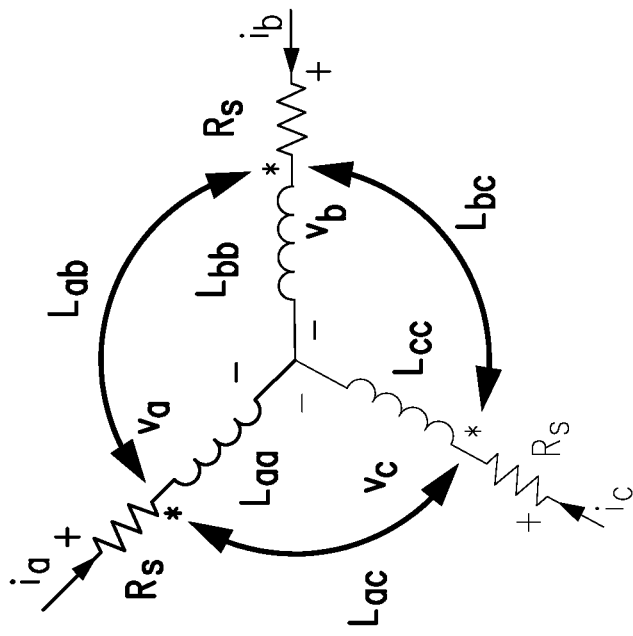
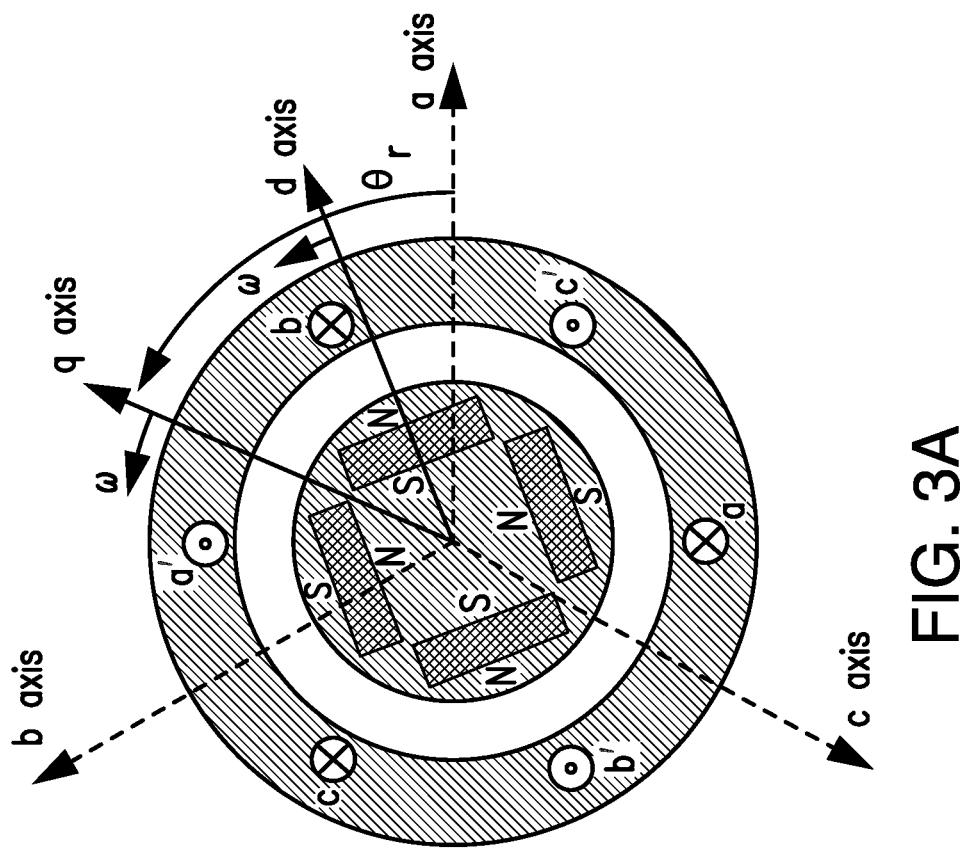
FIG. 3B
FIG. 3A

INTEGRATED ONBOARD CHARGERS FOR PLUG-IN ELECTRIC VEHICLES

STATEMENT REGARDING FEDERAL SPONSORED RESEARCH OR DEVELOPMENT

This invention was made with Government support under ECCS1238985 awarded by NSF. The Government has certain rights in the invention.

REFERENCE TO THE RELATED APPLICATION(S)

This Utility Patent Application is based on the Provisional Patent Application No. 62/237,205 filed 5 Oct. 2015.

FIELD OF THE INVENTION

The present invention is directed to plug-in electric vehicles (PEVs), and more in particular to onboard chargers for PEVs.

In overall concept, the present invention directs itself to Level-1, Level-2 single-phase and Level-3 three-phase charging of electric vehicles using AC Propulsion machine and Propulsion inverter residing in PEVs.

Additionally, the present invention is directed to an onboard charger adapted for single-phase or three-phase, as well as hybrid single- and three-phase, grid connection which is integrated with the AC Propulsion machine-Inverter group of a PEV, where the bi-directional operation of the Propulsion machine-Inverter group in the PEV permits battery charging by the integrated onboard charger at the rated power of the AC Propulsion machine.

The present invention also is directed to an integrated onboard charger for Electrical Vehicles, such as Plug-In Electric Vehicles, which is integrated with the AC Propulsion machine in the PEVs and does not require motor/inverter rearrangement which (1) is advantageous in the reduced complexity of charging systems and enable high-power onboard charging, (2) does not require additional passive and bulky components (except for a few compact semiconductor devices), (3) avoids a need for an access to inaccessible points of the Propulsion machine windings, (4) does not cause the Propulsion machine rotation during steady-state charging, and (5) provides effective input current ripple cancellation.

BACKGROUND OF THE INVENTION

Electrical vehicles (EVs) and plug-in hybrid electric vehicles (PHEVs), cumulatively referred to herein as plug-in electric vehicles (PEVs), are vehicles propelled by electricity, as opposed to the conventional vehicles which operate on organically based fuel. The plug-in electric vehicles are composed of an energy storage sub-system (ESS), and an Inverter followed by a Propulsion machine for electric propulsion, called the powertrain.

Electric vehicles operate with higher energy conversion efficiency, produce a lower level of exhaust emissions, and lower levels of acoustic noise and vibration, than conventional vehicles. The electricity needed for electric vehicle operation can be produced either external the vehicle and stored in the ESS, or can be produced onboard with the help of the energy storage source(s) contained in the ESS.

In electric vehicles (EVs), the main energy source can be assisted by one or more energy storage devices. A combination of batteries and super-capacitors are often used as energy storage sources which can be connected to a fuel cell stack in a number of ways. The voltage characteristics of the two devices must match perfectly, and only a fraction of the range of operation of the energy storage devices can be utilized. For example, in a fuel cell/battery configuration, the fuel cell must provide substantially constant power due to the fixed voltage of the battery, and in a battery/supercapacitor configuration, only a fraction of the energy exchange capability of the supercapacitor can be used.

Battery chargers replenish the energy used by an electric vehicle much like a gasoline pump refuels a gas tank. A plug-in electric vehicle (PEV) can be recharged from an external source of electricity, such as, for example, a wall socket. The electricity stored in the rechargeable battery packs drives or contributes to driving the wheels.

The battery charger is a device which converts the alternating current distributed by electric utilities to the direct current needed to recharge a battery. There are a number of different types of battery chargers based on the way they control the charging rate.

Chargers are also classified by the level of power they can provide to the battery pack:

Level 1, which is a common household type of circuit, rated to 120 V/AC and to 15 amps. Level 1 chargers use the standard household three-prong connection and are usually considered portable equipment.

Level 2—permanently wired electric vehicle supply equipment used specifically for electric vehicle charging and is rated up to 240 V/AC, up to 60 amps, and up to 14.4 KW.

Level 3—permanently wired electric vehicle supply equipment used specially for electric vehicles charging and it is rated greater than 14.4 KW. Fast chargers are rated as level 3 chargers.

Electric vehicle battery chargers may be onboard (residing in the electric vehicle) or off board (at a fixed location outside the vehicle). There are two basic coupling methods used to complete the connection between the utility power grid, the battery charger, and the vehicle connector. The first is a traditional plug (the conductive coupling). With this connection, the EV operator plugs his/her vehicle into the appropriate outlet (i.e., 110V or 220V) to begin charging. This type of coupling can be used with a charger in the car (onboard) or out of the car (off board).

The second type of coupling is called inductive coupling. This type of coupling uses a paddle which fits into a socket on the car. Rather than transferring the power by a direct wire connection, power is transferred by induction via a magnetic coupling between the windings of two separate coils, one in the paddle, and the other mounted in the vehicle.

As with many options, there are advantages and disadvantages with both onboard and off-board charger systems. If the battery charger is onboard, the batteries can be recharged anywhere there is an electric outlet. The drawback with onboard chargers is the limitation in their power output due to size and weight restrictions dictated by the vehicle design. Onboard chargers are limited in their power output only by the ability of the onboard charger to deliver the charge. The time it takes to recharge the batteries can be shortened by using a high power off board charger.

Thus, onboard chargers provide flexibility of batteries charging using single-phase power outlets. However, they contribute to additional weight, volume and cost of the car. Due to their charging power limitations and slow charging process, it would take between 4 to 20 hours to fully charge a PEV battery using conventional level-1 and level-2 onboard chargers.

Thus, a high-power charger which does not need additional bulky onboard or off-board power electronic interfaces (PEIs), and which would provide fast onboard charging, without an additional cost and weight, would be highly desirable in the PEVs industry.

The onboard and off-board PEIs for a conventional PEV are illustrated in FIG. 1.

Typically, an onboard charger 10 consists of two stages: (1) an AC-DC stage 12 for rectification of the AC voltage from the grid and Power Factor Correction (PFC), and (2) a DC-DC stage 14 for battery current and voltage regulation.

As shown in FIG. 1, in the onboard power electronic converter of a PEV 18, the conventional onboard battery charger 10 operates independent of the Propulsion machine 20 and the Propulsion Inverter 22. This structural approach is detrimental due to addition of extra components, weight and cost of the vehicle design.

In order to reduce the size, weight and cost of the onboard chargers, different integrated chargers have been designed. For example, initial studies and efforts have focused on integrated non-isolated single-stage chargers that combine an AC-DC rectifier with the Propulsion machine being a DC-DC bidirectional converter (as for example presented in Y. I. Lee, et al., "Advanced Integrated Bidirectional AC/DC and DC/DC Converter for Plug-In Hybrid Electric Vehicles," IEEE Trans. Vehicular Technology, vol. 58, no. 8, pp. 3970-3980, October 2009).

In comparison to two-stage converters, these single-stage topologies advantageously reduce the number and size of bulky passive components, such as inductors. However, to achieve all the required modes of operation, additional transistors and diodes are needed that increases the complexity and brings to the fore reliability issues. In addition, the propulsion machine DC-DC bidirectional converter is usually rated for much larger power level than an onboard charger. Therefore, utilizing an integrated high-power converter as a low-power converter during relatively low-power charging prevents the attainment of high efficiency operation.

Another group of efforts has been focused on integrated chargers using propulsion machine windings and its inverter (as presented in S. Haghbin, et al., "Grid-Connected Integrated Battery Chargers in Vehicle Applications: Review and New Solution," IEEE Trans. Industrial Electronics, vol. 60, no. 2, pp. 459-473, February 2013; U.S. Pat. Nos. 4,920,475, 5,099,186, 5,341,075, and W. E. Rippel, et al., "Integrated Motor Drive and Recharge System"). However, the proposed topologies have drawbacks in terms of requirement for bulky add-on components, customization of propulsion machines, access to inaccessible points of the propulsion machine's windings, intensive winding/inverter rearrangement, or the propulsion machine unwanted rotation during charging.

In a typical three-phase PEV propulsion system, shown in FIG. 1, a bidirectional three-phase inverter 22 enables the power flow from the battery 24 to the AC Propulsion machine 20 during the propulsion mode of operation, and the battery charging during the regenerative braking. In order to acquire high driving efficiency, the voltage on the DC_link 26 of the Propulsion Inverter 22 (typically 360 V or 720 V) is preferred to be higher than the rated peak voltage of the AC Propulsion machine 20.

Furthermore, a DC-DC bi-directional converter 28 can be used to regulate DC_link voltage with a wide range of battery voltage variations which adds to the unwanted weight and cost of the existing onboard chargers. DC-to-DC converters are used to interface the elements in the electric powertrain by boosting or chopping the voltage levels as required by the load in different regions of the EV operations. By introducing the DC-to-DC converters, the voltage variations of the devices can be selected, and the power of each device can be controlled.

Another shortcoming of the conventional PEV powertrains is that the only external accessible points to the AC Propulsion machine are the three phase-terminals of the AC Propulsion machine.

It is desirable to provide an innovative solution for high-power onboard charging of PEV batteries which alleviates the above-mentioned limitations of prior technologies.

SUMMARY OF THE INVENTION

It is therefore an object of the present invention to provide an onboard charging system for single-phase (level-1 and level-2) and three-phase (level-3) charging of plug-in electric vehicles (PEVs), using an AC propulsion machine and Propulsion inverter of the PEVs without addition of bulky passive components where the bi-directional operation of the Propulsion inverter supports the PEV batteries charging at the rated power of the Propulsion machine.

It is also an object of the present invention to provide a simple design and operational onboard battery charger integrated with the PEV's AC Propulsion machine-Propulsion Inverter Group which is (1) capable of high-power onboard battery charging with effective input current ripple cancellation, (2) does not need motor-inverter rearrangement, and (3) does not require an access to inaccessible points of the Propulsion machine's windings, and, (4) does not rotate of the Propulsion machine during steady-state charging.

In one aspect, the present invention is directed to an onboard charger system for charging a battery in Plug-in Electric Vehicles (PEVs). The system includes an onboard charger integrated with at least one Propulsion machine-Inverter Group of the PEV. The Propulsion Machine-Inverter Group is built with a 3-phase Alternative Current (AC) Propulsion Machine having three phase-terminals (A, B, C) and a Propulsion Inverter coupled to an input of the 3-phase AC Propulsion machine.

The subject onboard charger is operatively coupled between a grid (supplying AC voltage) and a battery of the PEV to charge the battery at a rated power of the 3-phase AC propulsion machine.

The subject onboard integrated charger can operate in a (1) propulsion mode of operation, (2) battery charging mode of operation, and (3) numerous switching sub-modes.

A controller is operatively coupled to the Propulsion Machine-Inverter Group and configured to generate control signals in a predetermined order depending on a required mode of operation and switching sub-mode, and to supply the respective control signals to the Propulsion Machine-Inverter Group to attain an efficient charging of the battery.

The subject onboard charger system is adaptable for operating with an AC 1-phase grid, or an AC 3-phase grid, as well as with both 1-phase and 3-phase AC grids in a hybrid charger system's implementation.

When the AC grid is a 1-phase grid, the subject integrated onboard charger is augmented by a diode bridge coupled between the grid and the Propulsion Machine-Inverter Group, as well as between at least one of the three machine phase-terminals (A, B, C) and the Propulsion Inverter, and specifically, to a negative terminal of the DC_link of the Propulsion Inverter. The 3-phase AC Propulsion machine is built with three windings ($L_a$, $L_b$, $L_a$), which are angularly spaced apart 120° one from another, and are supplied power, under command of the controller, in predetermined time intervals with a predetermined phase shift therebetween.

In the battery charging mode of operation, the diode bridge operates to rectify the AC voltage supplied by the 1-phase AC grid.

The Propulsion Inverter is built with a first leg, a second leg, and a third leg, each coupled to a first, second, a third winding of the 3-phase AC Propulsion Machine, respectively. The first leg of the Propulsion Inverter includes semiconductor switches $S_1$ and $S_2$, and corresponding diodes $D_1$ and $D_2$, each coupled in parallel to its respective semiconductor switches $S_1$ or $S_2$. The second leg includes semiconductor switches $S_3$ and $S_4$, and corresponding diodes $D_3$ and $D_4$, each coupled in parallel to its respective switch $S_3$ or $S_4$. The third leg includes semiconductor switches $S_5$ and $S_6$, and corresponding diodes $D_5$ and $D_6$, respectively, each coupled in parallel to its respective switch, $S_5$, or $S_6$.

In the battery charging mode of operation (and when powered by a 1-phase AC grid), the 3-phase AC Propulsion Machine's windings and the Propulsion Inverter are pulse-width-modulation (PWM) switched by the controller to operate as a two-channel interleaved boost converter. The controller operates the interleaved two of the first, second and third legs with 180° phase difference in time domain, where one of the switches $S_2$, $S_4$, $S_6$, and one of corresponding diodes $D_1$, $D_3$, $D_5$ form a first channel, and one of the switches $S_2$, $S_4$, $S_6$ and one of corresponding diodes $D_1$, $D_3$, $D_5$ form a second channel of the two-channel interleaved boost converter. Generally, the two interleaved legs are those not connected to the positive terminal of rectifier.

The PWM switching, as commanded by the controller, is divided into switching sub-modes I, II, III, IV. When a duty cycle D of the PWM switching 0<D<0.5, the controller PWM switches the two-channel interleaved boost controller in a periodical switching sequence I-III-II-III-I of the switching sub-modes.

When the duty cycle 0.5<D<1, the controller PWM switches the two-channel interleaved boost controller in a periodical switching sequence IV-I-IV-II-IV of the switching sub-modes.

In the switching sub-mode I, the controller turns ON the switch $S_4$, turns OFF the switch $S_6$, and the diode $D_5$ is in conducting state. In the switching sub-mode II, the controller turns the semiconductor switch $S_6$ ON, turns OFF the switch $S_4$, and the diode $D_3$ is in conducting state. In the switching sub-mode III, the controller turns OFF the switches $S_4$ and $S_6$, and the diodes $D_3$ and $D_5$ are in conducting state. In the switching sub-mode IV, the controller turns ON the switches $S_4$ and $S_6$, and reverse biases the diodes $D_3$ and $D_5$.

When the AC grid is a 3-phase grid, the subject battery charger system includes a unidirectional AC-DC 3-phase buck-type PWM rectifier coupled between at least one of the three machine phase-terminals (A, B, C) and a negative terminal of the DC_link of the Propulsion Inverter, and an Electromagnetic Interference (EMI) filter coupled between the 3-phase grid and the 3-phase buck-type PWM rectifier.

In this embodiment, the 3-windings ($L_a$, $L_b$, $L_c$) of the Propulsion Machine are utilized as a DC-inductor. The 3-phase buck-type PWM rectifier is built with semiconductor switches $Q_1$, $Q_2$, $Q_3$, $Q_4$, $Q_5$, $Q_6$. The switches $Q_1$-$Q_6$ may be in the form of any unidirectional switch, and specifically, insulated-gate-bipolar-transistors (IGBTs) each coupled in series with a freewheeling diode, or metal-oxide-semiconductor field-effect-transistors (MOSFETs) each coupled in series with a freewheeling diode, or silicon-controlled-rectifier (SCR), or combination thereof.

In the propulsion mode of operation, the battery provides propulsion power through the switches $S_1$-$S_6$ of the three-phase Propulsion Inverter.

In the battery charging mode of operation, a first leg containing the switches $S_1$ and $S_2$ of the Propulsion Inverter connected to a positive terminal of the unidirectional AC-DC 3-phase buck-type PWM rectifier are disabled, and the second and third legs containing the $S_4$ and $D_3$, as well as $S_6$ and $D_5$, respectively, form a two-channel interleaved boost converter, and $D_1$ and $D_2$ are reverse biased.

During the battery charging mode of operation, the controller controls the semiconductor switches $Q_1$-$Q_6$ of the unidirectional AC-DC 3-phase buck-type rectifier with active switching sub-modes I1, I2, I3, I4, I5, I6, and zero-switching sub-modes I0 and I7 in a predetermined order. In each of the switching sub-modes, three out of the six semiconductor switches $Q_1$-$Q_6$ are turned ON at the same time.

During the active switching sub-modes, DC current flows through respective three switches of the switches $Q_1$-$Q_6$, and the 3-phase AC grid, and the diode $D_2$ is reverse biased. In the zero-switching sub-modes, the 3-phase AC grid is disconnected from the subject onboard charger.

The PWM switching in the embodiment with the unidirectional AC-DC 3-phase buck-type PWM rectifier is divided into switching sub-modes I, II, III, IV. When a duty cycle D of the PWM switching 0<D<0.5, the controller switches the two-channel interleaved boost controller in a periodical switching sequence I-III-II-III-I of the sub-modes.

When 0.5<D<1, the controller PWM switches the two-channel interleaved boost controller in a periodical switching sequence IV-I-IV-II-IV of the sub-modes. In the switching sub-mode I, the controller turns ON the switch $S_4$, turns OFF the switch $S_6$, and the diode $D_5$ is in conducting state. In the switching sub-mode II, the controller switches the switch $S_6$ ON, turns OFF the switch $S_4$, and the diode $D_3$ is in the conducting state. In the switching sub-mode III, the controller turns OFF the switches $S_4$ and $S_6$, and the diodes $D_3$ and $D_5$ are in conducting state, and the switching sub-mode IV, the controller turns ON the switches $S_4$ and $S_6$, and reverse biases the diodes $D_3$ and $D_5$.

Alternatively, for operation with a 3-phase AC grid, the subject onboard charger system may be augmented with a bidirectional AC-AC three-phase buck-boost type PWM rectifier coupled to the Propulsion Machine's three-phase-terminals (A, B, C), and an EMI filter coupled between the 3-phase AC grid and the bi-directional AC-AC three-phase buck-boost type PWM rectifier.

The bi-directional AC-AC three-phase buck-boost type PWM rectifier is configured with a first, a second and a third leg, each leg including a semiconductor bi-directional switch which may be configured, for example, as a pair of back-to-back connected IGBTs, or a pair of back-to-back MOSFETs, or bilateral triode thyristors (TRIACs), as well as combinations thereof.

In the embodiment of the subject onboard charger system using the bi-directional AC-AC three-phase buck-boost type PM rectifier, during the battery charging mode of operation, the switches $S_1$-$S_6$ of the first, second and third legs of the Propulsion Inverter are disabled by the controller, and the corresponding freewheeling diodes $D_1$-$D_6$ of the propulsion inverter are in a conducting state. In this mode, the Propulsion machine's windings $L_a$, $L_b$, $L_c$, and the freewheeling diodes $D_1$-$D_6$ create a three-phase buck-boost AC-DC converter.

The bi-directional switches $G_1$-$G_6$ of the first, second and third legs of the bi-directional AC-AC three-phase buck-boost type PWM rectifier are controlled in a number of switching sub-modes in a predetermined order. In each switching sub-mode, respective three out of size switches $G_1$-$G_6$ are turned ON.

Each of the switching sub-modes includes a respective one of active switching modes I1-I6 (to charge a corresponding winding of the Propulsion machine), followed by a corresponding one of zero switching modes IO1-IO6 (to discharge the corresponding winding) of the Propulsion machine.

In the respective active switching mode, one of the back-to-back switches is turned ON, and the diode corresponding to another switch in the two back-to-back switches conducts, thus creating a uni-directional rectifier leg. In the corresponding zero switching mode, the switches $G_1$-$G_6$ are turned OFF, and three out of six diodes $D_1$-$D_6$ of the Propulsion Inverter conduct.

The onboard battery charger system preferably comprises a bi-directional DC-DC converter coupled between the Propulsion Inverter and the battery. The bi-directional DC-DC converter may be represented by a non-isolated converter or isolated converter. The non-isolated DC-DC converter may be used in the propulsion mode of operation, while the isolated DC-DC converter may be used in the battery charging mode of operation.

In another aspect, the present invention is directed to a method of charging a battery in a plug-in electric vehicle (PEV). In accordance with the method, the following steps are performed to attain the objectives:

integrating an onboard charger with at least one Propulsion machine-Inverter Group of a PEV, where the Propulsion machine-Inverter Group is built with a 3-phase Alternative Current (AC) Propulsion machine having three machine windings $L_a$, $L_b$, and $L_c$ spaced apart angularly 120° each from the other. This defines three machine phase-terminals A, B, and C, respectively. A Propulsion Inverter is coupled to an input of the 3-phase AC Propulsion machine.

The method further proceeds with coupling the onboard charger between a grid supplying AC voltage and a battery to charge the battery at a rated power of the 3-phase AC propulsion machine. The AC grid may be an AC 1-phase grid or an AC 3-phase grid, as well as combinations thereof in the hybrid implementation of the PEV's subject onboard charger.

In the subject method, a controller is operatively coupled to the onboard charger to supply control signals to the Propulsion machine-Inverter Group in a predetermined order depending on a required mode of operation of the PEV to attain an efficient charging of the battery.

The method further continues with the steps of:

configuring the Propulsion Inverter with a first leg, a second leg, and a third leg, wherein the first leg includes semiconductor switches $S_1$ and $S_2$, and corresponding diodes $D_1$ and $D_2$, respectively, the second leg includes semiconductor switches $S_3$ and $S_4$ and corresponding diode $D_3$ and $D_4$, respectively, and the third leg includes semiconductor switches $S_5$ and $S_6$, and corresponding diodes $D_5$ and $D_6$, respectively, and coupling each leg to a respective winding $L_a$, $L_b$, $L_c$ of the 3-phase AC Propulsion Machine, respectively.

When the grid is a 1-phase grid, the method provides coupling of a diode bridge between the grid and a negative terminal of a DC_link of the Propulsion machine-Inverter Group, and between at least one of the three machine-phase-terminals A, B, C and the Propulsion Inverter.

The subject method proceeds with the steps of controlling the onboard charger in PWM switching sub-modes I, II, III, IV, in a predetermined order, to operate the Inverter as a two-channel interleaved boost converter.

When a duty cycle D of the PWM switching 0<D<0.5, the two-channel interleaved boost is switched in a periodical switching sequence I-III-II-III-I, of the switching sub-modes.

When 0.5<D<1, PWM the two-channel interleaved boost converter is switched in a periodical switching sequence IV-I-IV-II-IV of the PWM switching sub-modes.

In the PWM switching sub-mode I, the controller operates to turn ON the switch $S_4$, to turn OFF the switch $S_6$, and the diode $D_5$ is in conducting state.

In the PWM switching sub-mode II, the controller operates to turn ON the switch $S_6$, turn OFF the switch $S_4$, and the diode $D_3$ is in conducting state.

In the PWM switching sub-mode III, the controller operates to turn OFF the switches $S_4$ and $S_6$, and the diodes $D_3$ and $D_5$ are in conducting state.

In the PWM switching sub-mode IV, the controller operates to turn ON the switches $S_4$ and $S_6$, and to reverse bias the diodes $D_3$ and $D_4$.

In case of using a three-phase AC grid, the method further proceeds with the steps of:

coupling a unidirectional AC-DC 3-phase buck-type PWM rectifier between at least one of the three machine phase-terminals A, B, C and a negative terminal of the DC_link of the Propulsion Inverter, coupling an electromagnetic interference (EMI) filter between the 3-phase grid and the 3-phase buck-type PWM rectifier, and utilizing the windings $L_a$, $L_b$, $L_c$ of the Propulsion Machine as a DC-inductor.

In the subject method, the 3-phase buck-type PWM rectifier is configured with uni-directional semiconductor switches $Q_1$, $Q_2$, $Q_3$, $Q_4$, $Q_5$, $Q_6$, for example, in the form of insulated-gate-bipolar-transistor (IGBT) switches, each coupled in series with a freewheeling diode, or metal-oxide-semiconductor field-effect-transistors (MOSFETs), each coupled in series with a freewheeling diode, or silicon-controller rectifier (SCR) switches, or their combination.

The subject method continues with either operating the subject onboard charger in the propulsion mode of operation for providing propulsion power from the battery through the switches $S_1$-$S_6$ of the three-phase Propulsion Inverter, or in the battery charging mode of operation by disabling the first leg containing the switches $S_1$ and $S_2$ of the Propulsion Inverter connected to a positive terminal of the unidirectional AC-DC 3-phase buck-type PWM rectifier, forming, from the second and third legs containing the switch $S_4$ (and diode $D_3$) and switch $S_6$ (and diode $D_5$), respectively, a two-channel interleaved boost converter, and reverse biasing the diodes $D_1$, $D_2$, controlling, the semiconductor switches $Q_1$-$Q_6$ with active switching sub-modes I1, I2, I3, I4, I5, I6, and zero-switching sub-modes I0 and I7 in a predetermined order, wherein during the active switching sub-modes, a DC current flows through respective three switches of the switches $Q_1$-$Q_6$ and the 3-phase AC grid, and the diode $D_2$ is reverse biased. In each of the switching sub-modes, three out of six semiconductor switches $Q_1$-$Q_6$ are turned ON at a time.

In the zero-switching sub-modes, the 3-phase grid is disconnected from the onboard charger.

The subject method further includes the steps of:

coupling a bi-directional AC-AC three-phase buck-boost type PWM rectifier to the propulsion machine's three-phase-terminals A, B, C, configuring the bi-directional AC-AC three-phase buck-boost type PWM rectifier with first, second and third legs, each leg including a bi-directional switch which may be configured as a pair of back-to-back connected IGBTs, or a pair of back-to-back connected MOSFETs, or bilateral triode thyristors (TRIACs), and coupling an EMI filter between the 3-phase AC grid and the bi-directional AC-AC three-phase buck-boost type PWM rectifier.

The subject method further proceeds with the following steps:

during the battery charging mode of operation, disabling the switches $S_1$-$S_6$ of said first, second and third legs of the Propulsion Inverter, switching the corresponding freewheeling diodes $D_1$-$D_6$ of the Propulsion Inverter in conducting state, and controlling the bi-directional switches $G_1$-$G_6$ of the first, second and third legs of the buck-boost-type PWM rectifier by the controller in a number of switching sub-modes in a predetermined order.

In each of the switching sub-modes, respective three of six switches $G_1$-$G_6$ and are turned ON, and the onboard charger is operated in a respective one of active switching sub-modes I1-I6 (to charge a corresponding winding) followed by a corresponding one of zero switching modes I01-I06 (to discharge the corresponding winding).

In the respective active switching sub-mode, one of the back-to-back switches is turned ON, and the diode corresponding to another switch in the two back-to-back switches is switched into conducting state, thus creating a uni-directional rectifier leg.

In the corresponding zero switching sub-mode, the switches $G_1$-$G_6$ are turned OFF, and three out of six diodes $D_1$-$D_6$ of the Propulsion Inverter are switched into conducting state.

These and other objects of the present invention will become apparent after reading further description of the preferred embodiments in conjunction with accompanying Patent Drawings in the subject Patent Application.

BRIEF DESCRIPTION OF THE DRAWINGS

FIG. 3A is a cross-section of a permanent magnet synchronous machine (PMSM);

FIG. 3B is a simplified electrical model of the PMSM;

FIG. 20A shows the three-phase buck-type PWM rectifier, and FIG. 20B shows the subject onboard charger with the three-phase buck-boost type PWM rectifier;

DETAILED DESCRIPTION OF THE PREFERRED EMBODIMENT(S)

Figure 1:
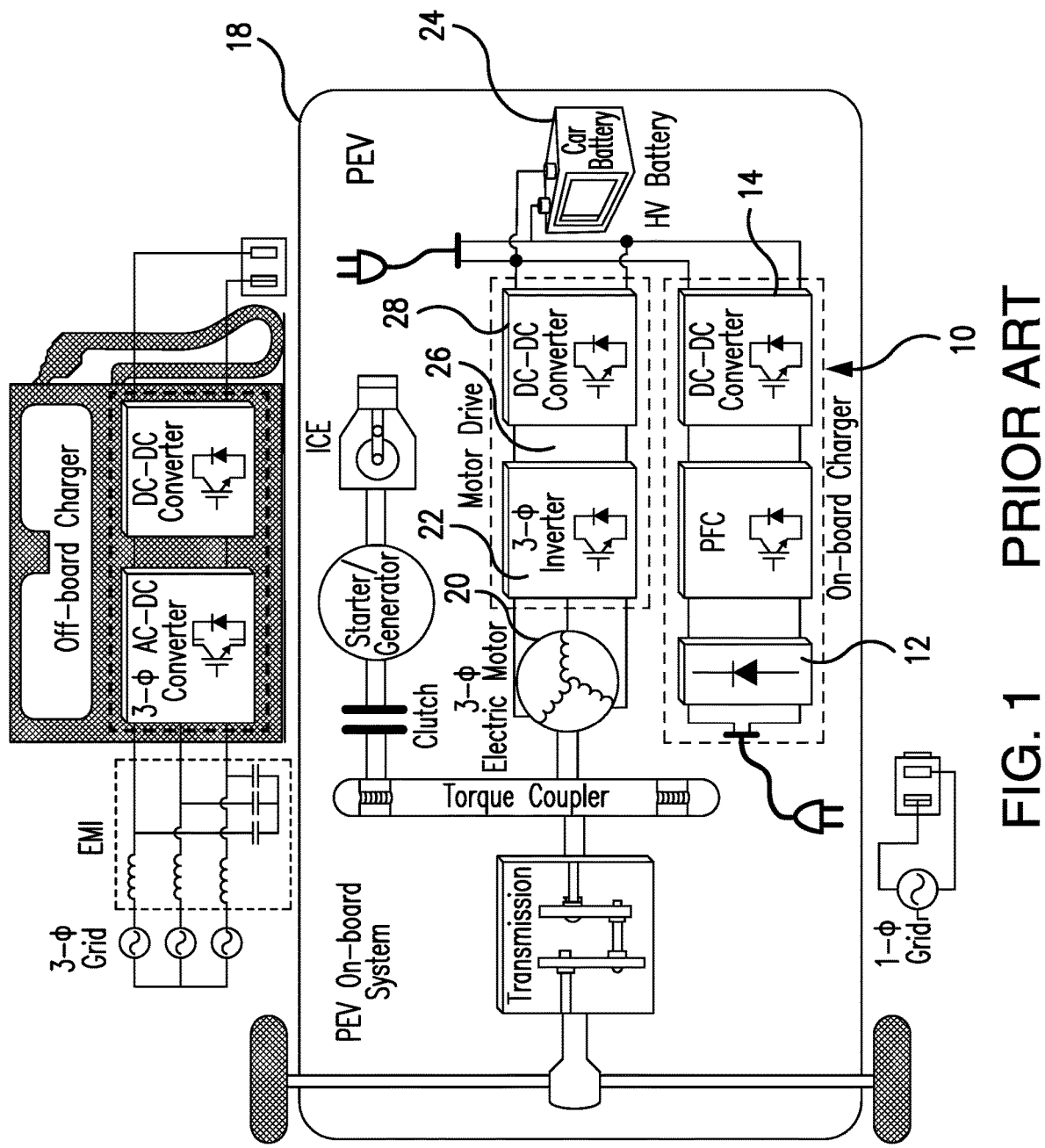
FIG. 1 is a schematic representation of the conventional power electronic interface for a Plug-in Electric Vehicle.

The powertrain for the plug-in electric vehicle using the subject system may include either a single high-power battery pack as the energy storage sub-system (ESS) or a number of ESSes, as well as one or a number of Propulsion machine-Inverter Groups. Each Propulsion machine-Inverter Group is built with a Propulsion Inverter followed by a Propulsion machine for electrical propulsion of the plug-in electric vehicle.

The electric propulsion is attained through at least one Propulsion machine which may include various propulsion machines, such as, for example, induction machines, permanent magnet machines, synchronous machines, switched reluctance machines, or other potential electrical machines.

The function of the Propulsion Inverters is to drive the Propulsion machine according to the speed command received from a driver. Required torque value is generated from an error between the speed command and the actual speed. Both values are supplied as inputs to a maximum efficiency controller which generates the torque value for individual propulsion machines based on their maximum efficiency operation points. The control of the inverters may include, but not limited to, field-oriented control, direct torque control, etc., depending on the utilized electric machine type.

The energy storage sub-system (ESS) may be composed of one or a number of energy sources which may include an energy storage source including, but not limited to, high-power batteries, high energy batteries, hybrid high power/high energy batteries, high power supercapacitors, ultra-high power electrostatic supercapacitors, electrochemical nano-structures, ultra high-power supercapacitors, hybrid super-capacitors, and other kinds of energy sources.

In one of numerous implementations, the energy storage system, for example, may be based on a battery, which is connected to the DC_link via the power converter which may be a bi-directional DC-to-DC converter. Alternatively, in the case of the energy storage system with AC output (such as for example, flywheels), the subject topology may include AC-to-DC converter or DC-to-AC bi-directional converter.

A further description of the subject system will, for the sake of the simplicity, be referred to as a plug-in electric machine using for an example, an HV car battery charged by an onboard battery charger (or converter) which integrates a single Propulsion machine-Inverter Group operatively coupled to the battery via the DC_link, and, optionally, the DC-DC converter. However, a number of energy saving devices of different nature and a number of propulsion machine-inverter groups interconnected in various manners is contemplated in the present structure.

The major operation modes of the subject system include a boost mode taking place when the power flow is directed from the battery to the DC_link, and a buck mode when the energy flow is directed from the DC_link to the battery. Each mode of operation assumes several equivalent circuits due to different switching combinations, which will be detailed in further paragraphs. The switching of the subject system is controlled by a controller which is operatively coupled to the Propulsion Machine-Inverter Group, as well as the DC-DC converter, and to the rectifiers, used in the subject system. The controller generates command signals to control switching of various switches and diodes included with subject circuitries.

The energy storage system can be connected to the electric traction system either directly or through power electronic interfaces.

One or several energy storage sub-systems can be connected to the DC_link, and one or multiple Propulsion machines can be connected to the common DC_link, or to separate DC_links.

A maximum efficiency tracker sub-system may be included in the subject system to track the power requirements of the Propulsion machine(s) in order to efficiently split power therebetween to dynamically control their associated Inverters.

An inverter controller may be coupled to the output of the maximum efficiency tracker to acquire readings of the operational power requirements of the Propulsion machine(s), and accordingly control the Propulsion Inverter(s) when needed, to dynamically redistribute power received from the ESS between the Propulsion machines.

Single-Phase Integrated Charger Topology

Referring to FIGS. 2, 4A-4B, 5A-5D, and 8A, in one implementation, an onboard charger system 30 includes a single-phase grid-connected integrated onboard charger 32 which is integrated with the three-phase AC Propulsion system 34 of the PEV 36. The AC Propulsion system 34 forms a Propulsion machine-Propulsion Inverter group which is built with a 3-phase Alternative Current (AC) Propulsion machine 38 having three windings La, Lb, Lc defining terminals A, B, C, and a Propulsion Inverter 40 coupled to an input of the Propulsion machine 38.

The subject onboard charger 32 (also referred to herein as onboard charging converter) is designed with a very small add-on diode bridge 42 connected between one of the Propulsion machine's terminals, for example, the terminal A of the AC propulsion machine 38, and the negative terminal 44 of the DC_link 48 of the Propulsion Inverter 40.

Figure 2:
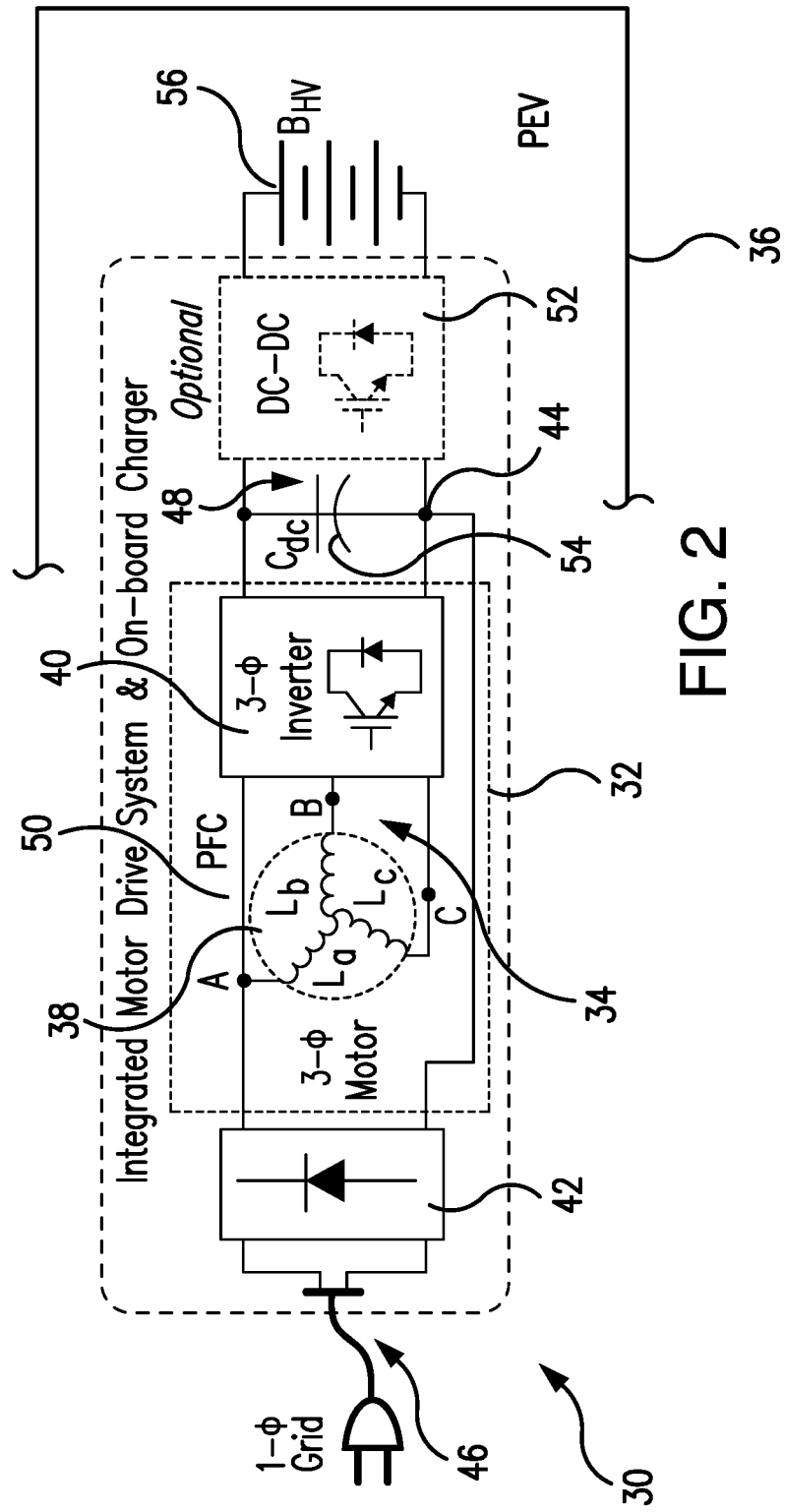
FIG. 2 is a schematic representation of the subject onboard charger system integrated with the PEV's three-phase AC Propulsion system.

In the subject onboard integrated charger 32, the only additional element to the onboard power electronic interface (PEI) is the diode bridge 42, which is shown in FIG. 2 symbolically by a single diode coupled between the 1-phase grid 46 and the charger 32. The diode bridge will be presented in detail in further illustrations of the subject onboard integrated charger.

The subject battery charger 32 of the plug-in electric vehicle 36 provides a Power Factor Correction. Thus, once connected to the grid 46, the charging system 30 may be also seen as a Power Factor Correction (PFC) stage 50 of the PEV 36, which can reach the power factor level near 1.

There are various PFC topologies designed for different modes of operation, the goal of which is to shape the input current of the grid 46 to maximize the real power provided to the battery 56. Specifically, the function of the PFC stage 50 is to rectify the input AC voltage coming from the grid 46, and to transfer the rectified voltage into a regulated intermediate DC-link DC_link bus 48. Unlike conventional charging systems, where the PFC stage is separated from the Propulsion system, in the subject system, the PFC stage 50 is integrated with the Propulsion system 34.

All three stator windings $L_a$, $L_b$, $L_c$, of the AC propulsion machine 38 are utilized in the subject topology as PFC inductors. The DC-DC stage 52, which optionally follow the PFC unit 50, subsequently converts the current or voltage at the DC_link bus capacitor 54 to a regulated output DC voltage for charging the battery 56.

The integration theory for the subject system is focused on a permanent magnet synchronous machine (PMSM) based propulsion system. However, the proposed system and method are applicable also to any other AC 3-phase propulsion machine, such as induction machines and any other synchronous machines with feasible access to machine face-terminals (terminals A, B, C).

Equivalent Model of PMSM

FIG. 3A illustrates a conceptual cross-sectional view of a 3-phase, 4-pole PMSM along with two reference frames (a-b-c frame and d-q frame). In this model, $\theta_r$ is the rotor angle between a-axis and q-axis in radians, $\omega = d\theta_r/dt$ is the angular velocity of rotation in rad/sec, and P is the number of pole pairs.

The corresponding 3-phase electrical model is illustrated in FIG. 3B where $i_a$, $i_b$ and $i_c$ are instantaneous stator phase currents, $v_a$, $v_b$ and $v_c$ are instantaneous stator phase voltages, $R_s$ is the stator resistance, $L_{aa}$, $L_{bb}$ and $L_{cc}$ denote the a-axis, b-axis and c-axis stator self-inductances, respectively, and $L_{ab}$, $L_{ac}$ and $L_{bc}$ denote the mutual inductances representing the coupling effects among the three-phase stator windings.

In the two-phase d-q equivalent circuit model of a PMSM, the d-axis and q-axis stator self-inductances ($L_d$ and $L_q$) can be used to represent the three-phase self and mutual inductances, as $$\begin{cases} L_{aa} = L_s + L_x\cos(2\theta_e) & \text{(Eq. 1)} \\ L_{bb} = L_s + L_x\cos\left(2\theta_e + \frac{2\pi}{3}\right) & \text{(Eq. 2)} \\ L_{cc} = L_s + L_x\cos\left(2\theta_e - \frac{2\pi}{3}\right) & \text{(Eq. 3)} \\ L_{ab} = -M_s + L_x\cos\left(2\theta_e - \frac{2\pi}{3}\right) & \text{(Eq. 4)} \\ L_{bc} = -M_s + L_x\cos(2\theta_e) & \text{(Eq. 5)} \\ L_{ac} = -M_s + L_x\cos\left(2\theta_e + \frac{2\pi}{3}\right) & \text{(Eq. 6)} \end{cases}$$

where $L_s = \frac{1}{2}(L_q + L_d)$ is the average inductance; $L_x = \frac{1}{2}(L_q - L_d)$ is the inductance fluctuation; $M_s = -(L_{ab} + L_{bc} + L_{ac})/3$ is the average mutual inductance; and $\theta_e = P\theta_r$ is the electrical angle between a-axis and q-axis. Assuming $\theta_e = \pi/2$ in stationary condition, where d-axis is aligned with a-axis, the three-phase stator self-inductances and mutual inductances in Eqs. (1)-(6) can be expressed as $$\begin{cases} L_{aa} = L_d & \text{(Eq. 7)} \\ L_{bb} = \frac{3}{4}L_d + \frac{1}{4}L_q & \text{(Eq. 8)} \\ L_{cc} = \frac{3}{4}L_d + \frac{1}{4}L_q & \text{(Eq. 9)} \\ L_{ab} = -M_s + \frac{1}{4}L_d - \frac{1}{4}L_q & \text{(Eq. 10)} \\ L_{bc} = -M_s - \frac{1}{2}L_d + \frac{1}{2}L_q & \text{(Eq. 11)} \\ L_{ac} = -M_s + \frac{1}{4}L_d - \frac{1}{4}L_q & \text{(Eq. 12)} \end{cases}$$

In the three-phase model, the electrical dynamic equations in terms of instantaneous stator phase voltages $v_a$, $v_b$ and $v_c$ can be written as $$\begin{cases} v_a = R_s i_a + \frac{\partial \lambda_a}{\partial t} & \text{(Eq. 13)} \\ v_b = R_s i_b + \frac{\partial \lambda_b}{\partial t} & \text{(Eq. 14)} \\ v_c = R_s i_c + \frac{\partial \lambda_c}{\partial t} & \text{(Eq. 15)} \end{cases}$$

where $\lambda_a$, $\lambda_b$, and $\lambda_c$ are stator flux linkages, satisfying $$\begin{cases} \lambda_a = L_{aa}i_a + L_{ab}i_b + L_{ac}i_c + \lambda_{ma} & \text{(Eq. 16)} \\ \lambda_b = L_{ab}i_a + L_{bb}i_b + L_{bc}i_c + \lambda_{mb} & \text{(Eq. 17)} \\ \lambda_c = L_{ac}i_a + L_{bc}i_b + L_{cc}i_c + \lambda_{mc} & \text{(Eq. 18)} \end{cases}$$

where $\lambda_{ma}$, $\lambda_{mb}$, and $\lambda_{mc}$ are rotor permanent magnet flux linkages.

According to Kirchhoff's Current Law (KCL), $$i_a = -(i_b + i_c) \quad \text{(Eq. 19)}$$

Hence, applying Eqs. (7)-(12) and Eq. (19) into Eqs. (13)-(18), the phase variables in Eqs. (13)-(15) can be written as $$\begin{cases} v_a = R_s i_a + L_1 \frac{\partial i_a}{\partial t} & \text{(Eq. 20)} \\ v_b = R_s i_b + L_2 \frac{\partial i_b}{\partial t} + L_3 \frac{\partial i_c}{\partial t} & \text{(Eq. 21)} \\ v_c = R_s i_c + L_2 \frac{\partial i_c}{\partial t} + L_3 \frac{\partial i_b}{\partial t} & \text{(Eq. 22)} \end{cases}$$

where $L_1$, $L_2$ and $L_3$ are equivalent inductances in terms of $L_d$, $L_q$ and $M_s$, $$\begin{cases} L_1 = \frac{3}{4}L_d + \frac{1}{4}L_q + M_s & \text{(Eq. 23)} \\ L_2 = \frac{1}{2}L_d + \frac{1}{2}L_q + M_s & \text{(Eq. 24)} \\ L_3 = \frac{3}{4}L_q - \frac{3}{4}L_d & \text{(Eq. 25)} \end{cases}$$

Therefore, in stationary condition ($\theta_e = \pi/2$), the mutual effect appears between phase b and phase c, however, it has no influence on phase a. The relationship among the phase voltages can be expressed as $$v_a = -\left[v_b + v_c + (L_q - L_d)\frac{\partial i_a}{\partial t}\right] \quad \text{(Eq. 26)}$$

which, using Eq. (20), can be rewritten as $$v_a = -\frac{1}{\kappa + 1}[(v_b + v_c) + \kappa R_s i_a] \quad \text{(Eq. 27)}$$

where, κ is defined as $$\kappa = \frac{L_q - L_d}{L_1} \quad \text{(Eq. 28)}$$

In the case of a round rotor ($L_q=L_d$), $L_1=L_2=L_{aa}+M_s$, $L_3=0$, and κ=0. Thus, Eq. (20)-(22) can be modified as $$\begin{cases} v_a = R_s i_a + (L_{aa} + M_s)\frac{\partial i_a}{\partial t} & \text{(Eq. 29)} \\ v_b = R_s i_b + (L_{aa} + M_s)\frac{\partial i_b}{\partial t} & \text{(Eq. 30)} \\ v_c = R_s i_c + (L_{aa} + M_s)\frac{\partial i_c}{\partial t} & \text{(Eq. 31)} \end{cases}$$

Eqs. (29)-(31), in a round-rotor structure, indicate that in stationary condition, each phase serves as a discrete inductor with equal inductances ($L_{aa}+M_s$).

Interleaved Boost Converter Using 3-Phase AC Machine

Figure 4A:
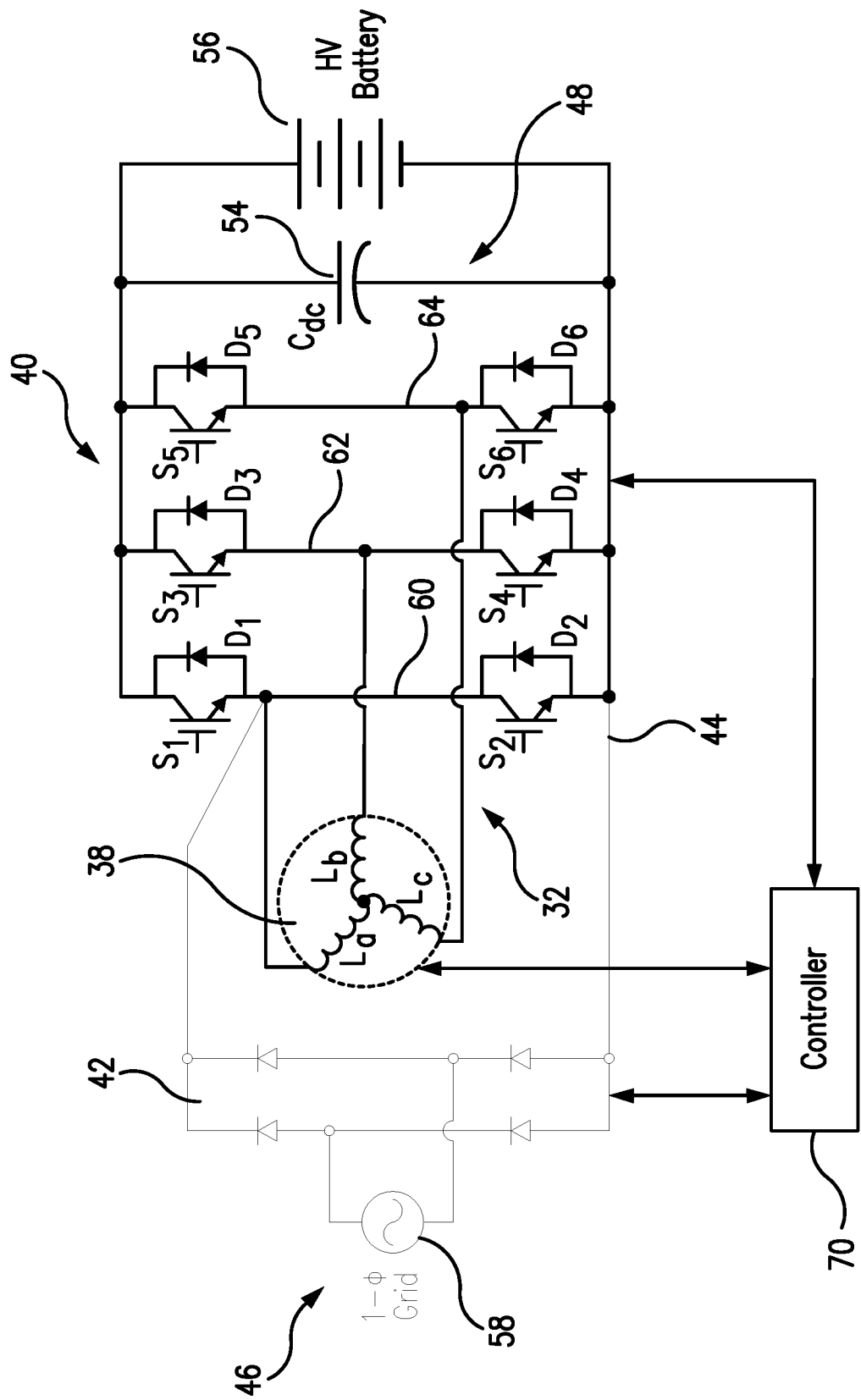
FIGS. 4A and 4B are electrical schemes representative of operation modes of the subject integrated onboard battery charger in the propulsion mode (FIG. 4A) and the charging mode (FIG. 4B)

During the propulsion mode of operation, the battery 56 provides the propulsion power to the AC propulsion machine 38 through the three-phase Propulsion Inverter 40, as shown in FIG. 4A. The diode bridge 42 in the propulsion mode of operation has no influence on the Inverter 40 operation.

Figure 4B:
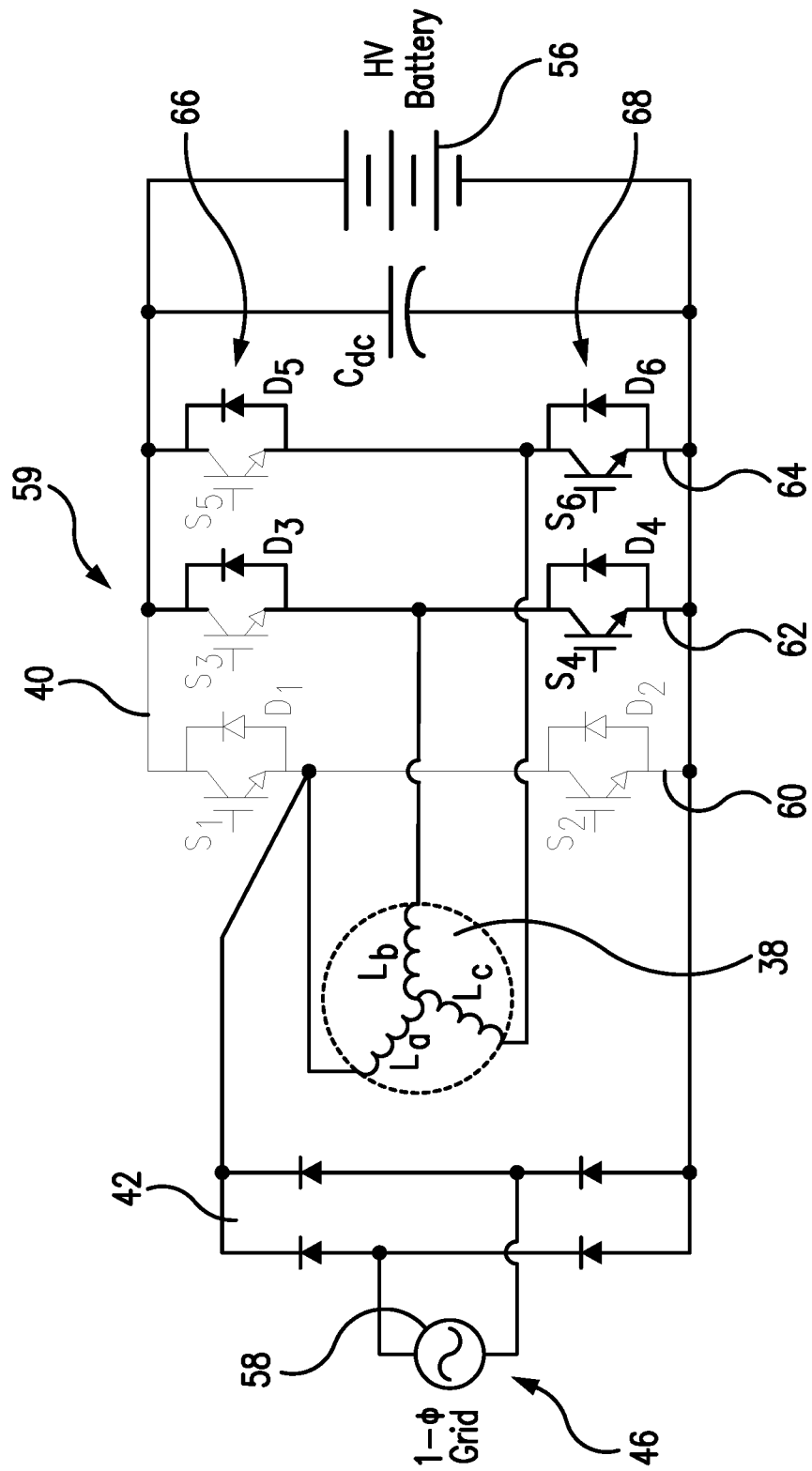

In the battery charging mode operation, as shown in FIG. 4B, the AC voltage 58 of the grid 46 is rectified by the diode bridge 42, and the windings $L_a$, $L_b$, $L_c$ of the Propulsion machine 38 and the Inverter 40 form a two-channel interleaved boost converter 59, which is utilized in the subject system as the PFC stage. The Propulsion Inverter 40, and thus the two-channel interleaved boost converter 59 based thereon, is created with the legs 60, 62, 64, each connected to a respective one of the propulsion machine's windings $L_a$, $L_b$, $L_c$, respectively. The leg 60 is connected to the winding $L_a$, and is formed with semiconductor switches (transistors) $S_1$ and $S_2$ serially connected each to the other, and diodes $D_1$ and $D_2$, each coupled in parallel to a respective one of the switches $S_1$ and $S_2$, respectively.

The leg 62 is coupled to the winding $L_b$ and is formed with the semiconductor switches (transistors) $S_3$ and $S_4$ and diodes $D_3$, $D_4$, each coupled in parallel to a respective switch $S_3$ and $S_4$.

The leg 64 is coupled to the winding $L_c$ and is formed with transistors $S_5$, $S_6$ and corresponding diodes $D_5$, $D_6$, each coupled in parallel to a respective switch $S_5$ or $S_6$.

Each winding is coupled to the respective leg 60, 62, 64 between the switches/diodes group, thus dividing the converter structure with two channels 66 and 68, with the channel 66 using transistor/diode units $S_1/D_1$, $S_3/D_3$, and $S_5/D_5$, while the channel 68 uses units $S_2/D_2$, $S_4/D_4$, and $S_6/D_6$.

The AC Propulsion machine 38 serves as a three-winding coupled inductor for energy storage and ripple cancellation. In the battery charging mode, one of the three-phase inverter legs, for example, the leg 60 (switches $S_1$, $S_2$) connected to the positive terminal of the diode rectifier is disabled, as shown in FIG. 4B, while the other two legs 62, 64 are used to develop the interleaved boost converter. In this case, the freewheeling diode $D_2$ is reverse biased by the positive output voltage of the diode rectifier 42. In addition, the diode $D_1$ is reverse biased since the DC_link voltage is higher than the output voltage of the diode rectifier 42, as a consequence of the boost operation of the subject converter 32. Due to the low total harmonic distortion (THD) requirement of the grid, the converter operates in continuous current mode (CCM).

For simplicity of the circuit model, initially a resistive load is considered. However, this will not impact the problem generality, as a battery could be modeled with an equivalent resistance during different charging modes. The pulse-width-modulation (PWM) switching operation is similar to that of a two-channel interleaved boost with two discrete inductors or one inverse coupled inductor. The interleaving legs 62, 64 operate with 180° phase difference in time domain.

However, in comparison to conventional interleaved boost converters, the subject converter integrated with the AC Propulsion machine-Inverter Group has different steady-state equivalent inductances. Utilization of the 120° spatial out-of-phase distributed windings ($L_a$, $L_b$, $L_c$) as interleaved channels of the boost converter 59 further reduces the steady-state current ripple.

In the subject system, the switching operation is divided into four switching sub-modes (I)-(IV), as shown in FIG. 5A-5D. According to the PWM switching duty cycle (D), the steady-state operation is categorized into two different cases: (1) 0<D<0.5, in which $V_o$<$2V_{in}$<$2V_o$, and (2) 0.5<D<1, where $V_o$>$2V_{in}$, where $V_{in}$ and $V_o$ are the input and output voltages of the interleaved boost converter.

Figure 5A:
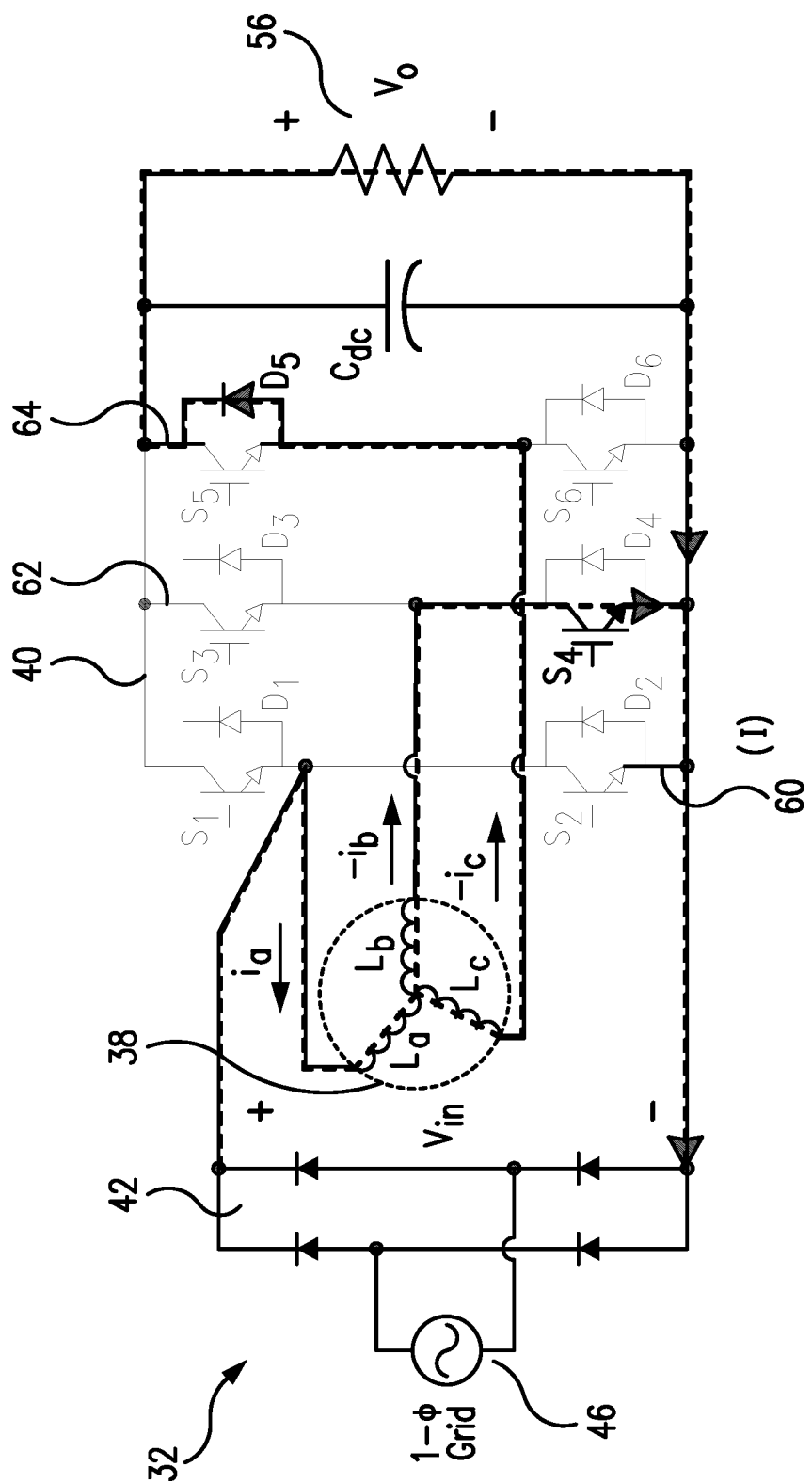
FIGS. 5A-5D are electrical diagrams representative of the switching sub-modes during battery charging mode of operation, with FIGS. 5A, 5B, 5C, and 5D corresponding to the switching sub-modes I, II, III, and IV, respectively.

When 0<D<0.5, the circuit operation has a periodical switching sequence (I)-(III)-(II)-(III)-(I) of the switching sub-modes. When 0<D<1, the switching sequence changes to (IV)-(I)-(IV)-(II)-(IV). Stator inductor currents and semiconductor currents corresponding to different switching sub-modes of FIGS. 5A-5D are illustrated in FIGS. 6A-6B.

In the Case of 0<D<0.5

Due to the 120° spatial out-of-phase coupling effect between the stator windings $L_a$, $L_b$, $L_c$, the two-channel operation with the stator inductors is different from that with discrete inductors and inverse coupled inductor.

In the switching sub-Mode I (shown in FIG. 5A), the transistor $S_4$ of the leg 62 is turned ON, and the diode $D_5$ of the channel 68 conducts.

$$\begin{cases} v_a - v_b = V_{in} & \text{(Eq. 32)} \\ v_a - v_c = V_{in} - V_o & \text{(Eq. 33)} \end{cases}$$

where $V_{in}$ and $V_o$ are the input and output voltages of the interleaved boost converter. Using Eq. (27), (32), and (33), the stator phase voltages in sub-Mode I can be expressed as $$\begin{cases} v_a^I = \frac{1}{\kappa+3}[2V_{in} - V_o - \kappa R_s i_a] & \text{(Eq. 34)} \\ v_b^I = \frac{1}{\kappa+3}[-(\kappa+1)V_{in} - V_o - \kappa R_s i_a] & \text{(Eq. 35)} \\ v_c^I = \frac{1}{\kappa+3}[-(\kappa+1)V_{in} + (\kappa+2)V_o - \kappa R_s i_a] & \text{(Eq. 36)} \end{cases}$$

Therefore, according to Eq. (20)-(22), the stator currents are represented as $$\begin{cases} \dfrac{\partial i_a^I}{\partial t} = \dfrac{1}{L_1(\kappa+3)}[2V_{in} - V_o] & \text{(Eq. 37)} \\ -\dfrac{\partial i_b^I}{\partial t} = \dfrac{1}{(L_2^2 - L_3^2)(\kappa+3)}\{(L_2 - L_3)(\kappa+1)V_{in} + [L_2 + L_3(\kappa+2)]V_o\} & \text{(Eq. 38)} \\ -\dfrac{\partial i_c^I}{\partial t} = \dfrac{1}{(L_3^2 - L_2^2)(\kappa+3)}\{(L_3 - L_2)(\kappa+1)V_{in} + [L_3 + L_2(\kappa+2)]V_o\} & \text{(Eq. 39)} \end{cases}$$

The round-rotor motors are more suitable as propulsion machines in PEVs, since they are more suitable than salient-pole motors at high rotating speeds. In the case of a round rotor ($L_q = L_d$, $L_1 = L_2 = L_{aa} + M_s$, $L_3 = 0$, and $\kappa = 0$), the stator phase voltages and currents can be written as $$\begin{cases} v_a^I = \dfrac{2V_{in} - V_o}{3} & \text{(Eq. 40)} \\ v_b^I = -\dfrac{V_{in} + V_o}{3} & \text{(Eq. 41)} \\ v_c^I = -\dfrac{V_{in} - 2V_o}{3} & \text{(Eq. 42)} \end{cases}$$

and $$\begin{cases} \dfrac{\partial i_a^I}{\partial t} = \dfrac{v_a^I}{L_{aa} + M_s} & \text{(Eq. 43)} \\ -\dfrac{\partial i_b^I}{\partial t} = -\dfrac{v_b^I}{L_{aa} + M_s} & \text{(Eq. 44)} \\ -\dfrac{\partial i_c^I}{\partial t} = -\dfrac{v_c^I}{L_{aa} + M_s} & \text{(Eq. 45)} \end{cases}$$

Hence, in a round-rotor structure, the stator windings act as independent discrete inductors. Since $V_o < 2V_{in} < 2V_o$ for $0 < D < 0.5$, $i_a$ and $-i_b$ increase linearly, and $-i_c$ decreases linearly.

Figure 5B:
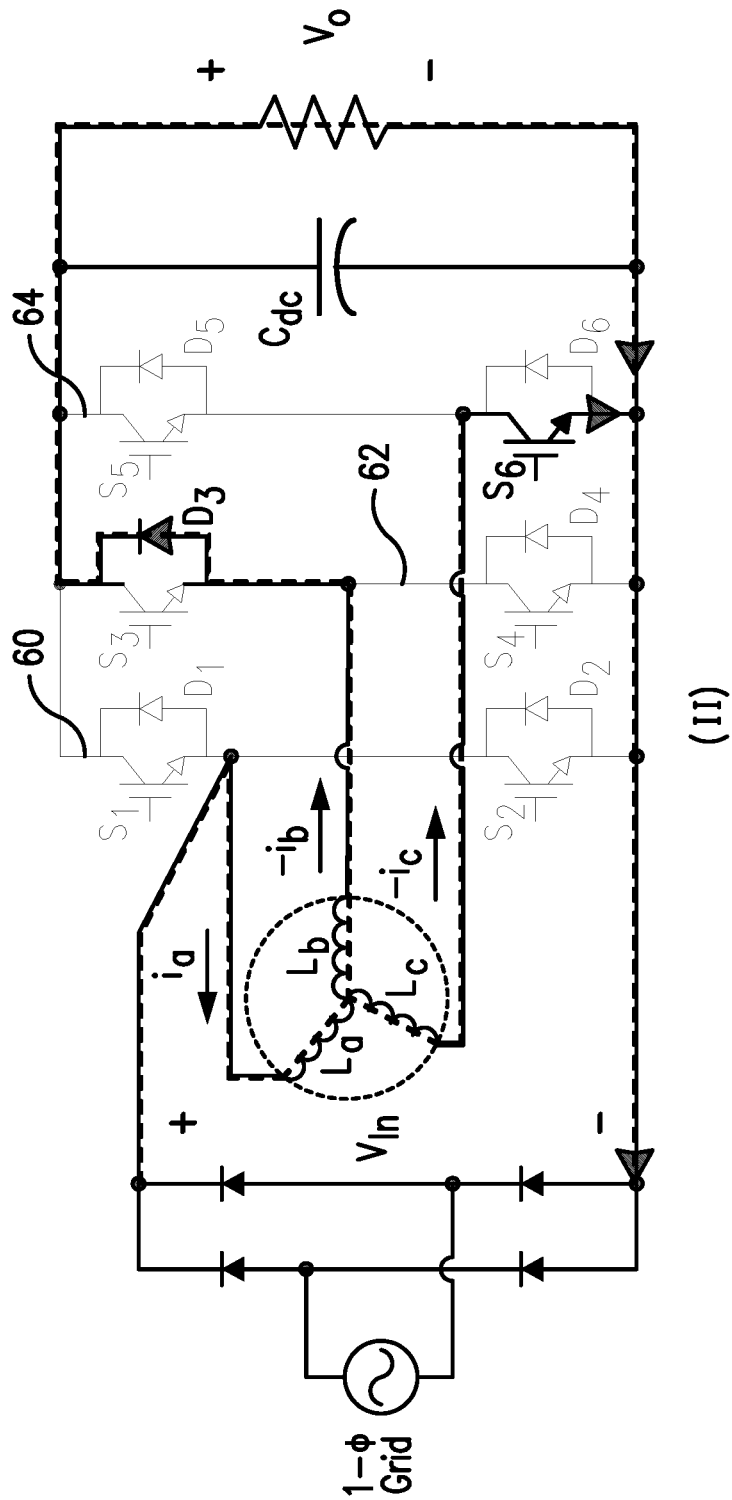
Figure 5C:
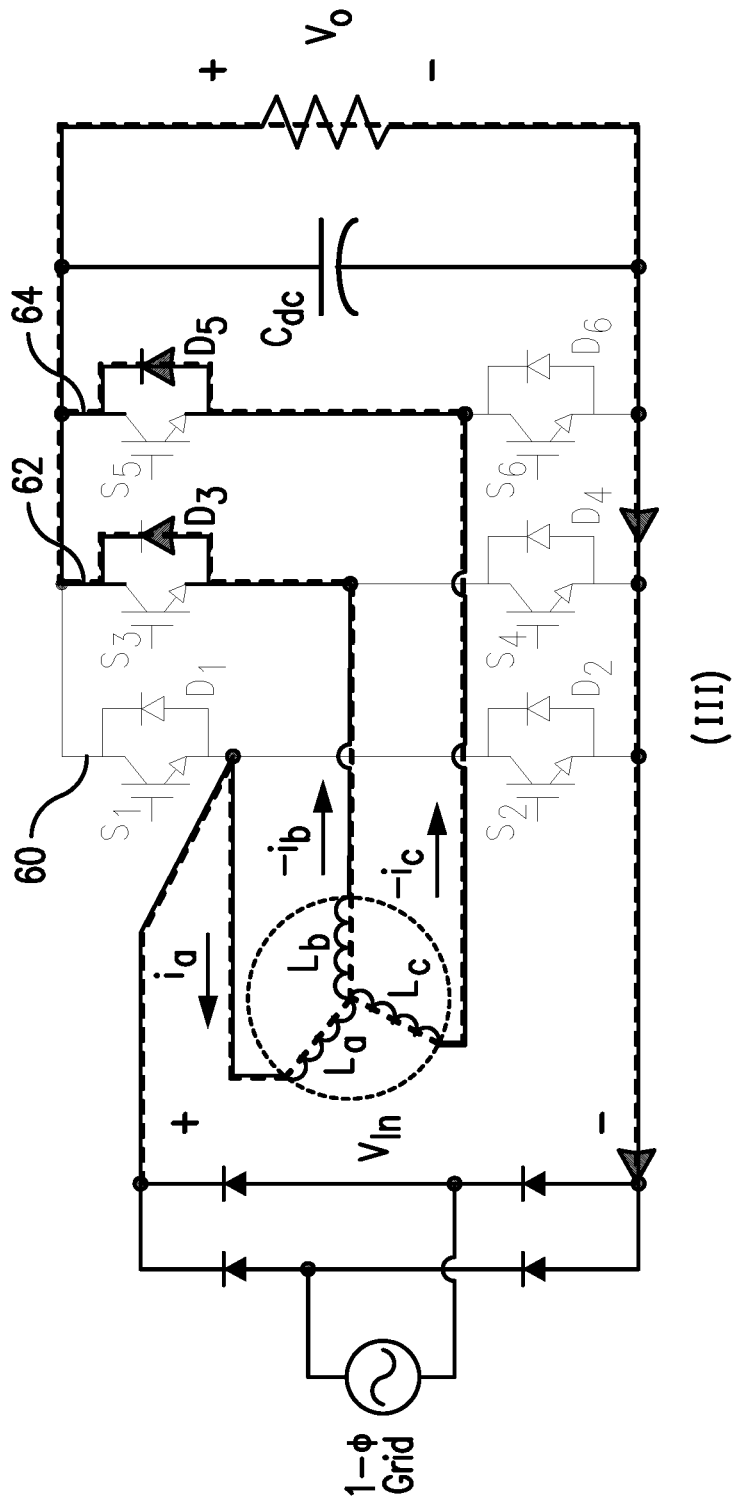
Figure 6B:
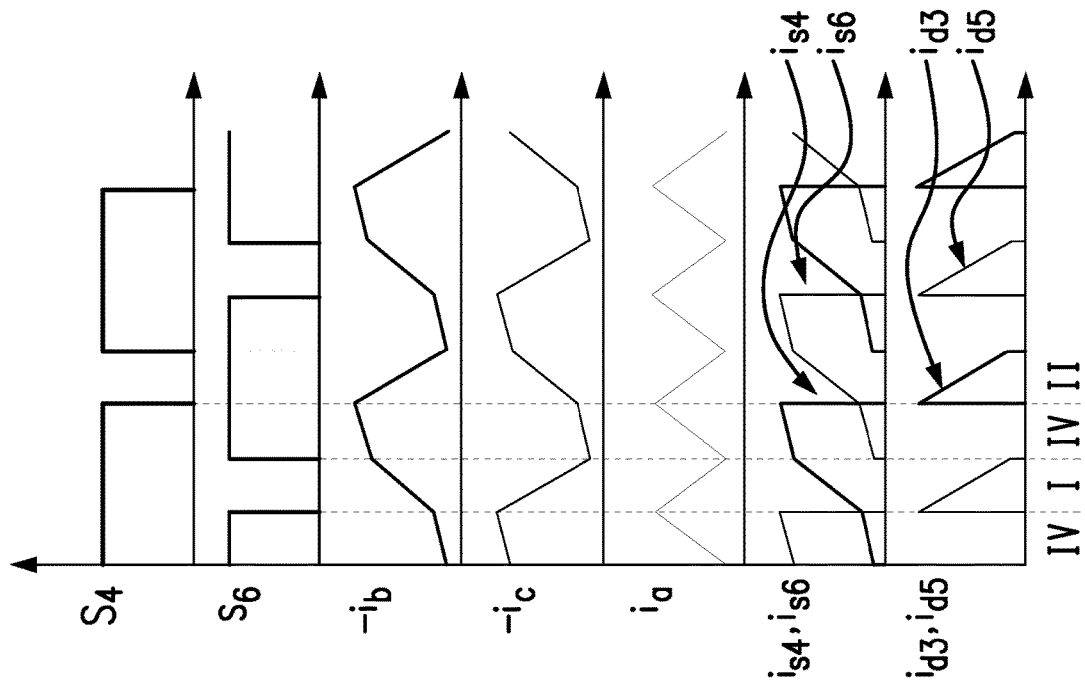
FIGS. 6A and 6B are diagrams representative of the current waveforms of the interleaved boost converter during 0<D<0.5 (FIG. 6A), and 0.5<D<1 (FIG. 6B)
Figure 6A:
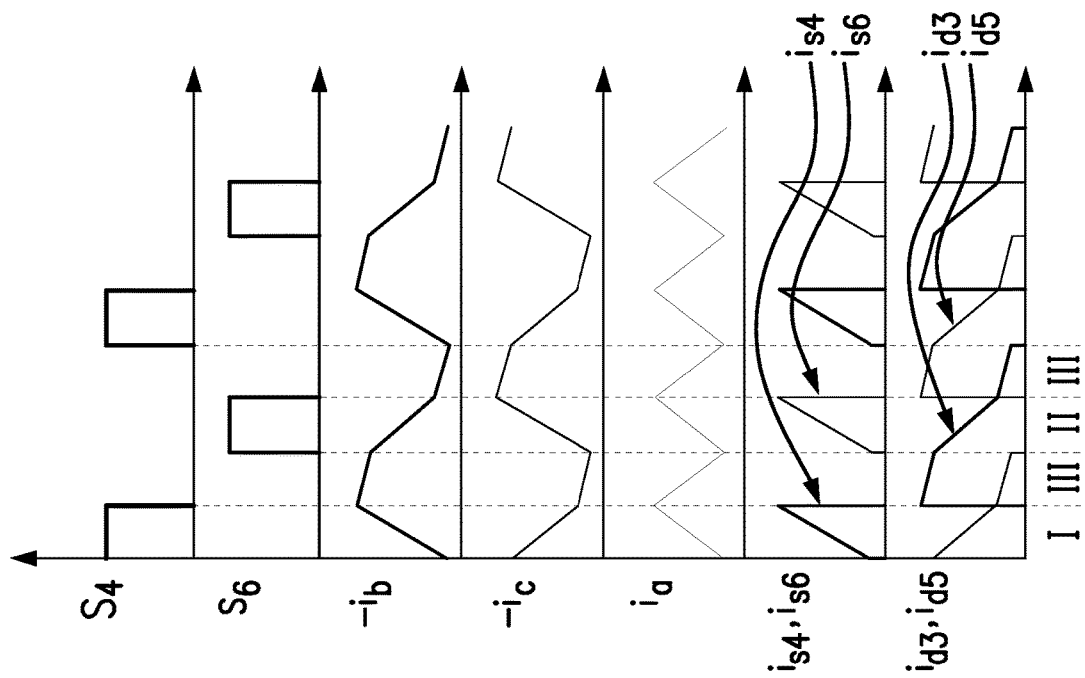

In the switching sub-Mode II shown in FIG. 5B, the transistor $S_6$ of the leg 64 is turned ON, and the diode $D_3$ of the leg 62 conducts. In this mode: $v_a^{II} = v_a^I$, $v_b^{II} = v_c^I$, $v_c^{II} = v_b^I$. For a round rotor, the phase currents can be expressed as $$\begin{cases} \dfrac{\partial i_a^I}{\partial t} = \dfrac{2V_{in} - V_o}{3(L_{aa} + M_s)} & \text{(Eq. 46)} \\ -\dfrac{\partial i_b^I}{\partial t} = \dfrac{V_{in} - 2V_o}{3(L_{aa} + M_s)} & \text{(Eq. 47)} \\ -\dfrac{\partial i_c^I}{\partial t} = \dfrac{V_{in} + V_o}{3(L_{aa} + M_s)} & \text{(Eq. 48)} \end{cases}$$

The switching sub-Mode III exists only when $0 < D < 0.5$. It occurs after the sub-Mode I and sub-Mode II. In the sub-mode III, both transistors of $S_4$ and $S_6$ of the legs 62, 64 are turned OFF, and diodes $D_3$ and $D_5$ of the legs 62, 64 are in the conduction state.

$$\begin{cases} v_a - v_b = V_{in} - V_o & \text{(Eq. 49)} \\ v_a - v_c = V_{in} - V_o & \text{(Eq. 50)} \end{cases}$$

yielding, $$\begin{cases} v_a^{III} = \dfrac{1}{\kappa+3}[2V_{in} - 2V_o - \kappa R_s i_a] & \text{(Eq. 51)} \\ v_b^{III} = v_c^{III} = \dfrac{1}{\kappa+3}[-(\kappa+1)V_{in} + (\kappa+1)V_o - \kappa R_s i_a] & \text{(Eq. 52)} \end{cases}$$

and $$\begin{cases} \dfrac{\partial i_a^{III}}{\partial t} = \dfrac{1}{L_1(\kappa+3)}[2V_{in} - 2V_o] & \text{(Eq. 53)} \\ -\dfrac{\partial i_b^{III}}{\partial t} = -\dfrac{\partial i_c^{III}}{\partial t} = \dfrac{1}{(L_2 + L_3)(\kappa+3)}[(\kappa+1)V_{in} - (\kappa+1)V_o] & \text{(Eq. 54)} \end{cases}$$

For a round rotor ($L_q = L_d$), $i_a$, $-i_b$ and $-i_c$ decrease linearly due to their equivalent discrete inductor. The slope of $i_a$ is twice of $-i_b$ and $-i_c$:

$$\begin{cases} \dfrac{\partial i_a^{III}}{\partial t} = \dfrac{2(V_{in} - V_o)}{3(L_{aa} + M_s)} & \text{(Eq. 55)} \\ -\dfrac{\partial i_b^{III}}{\partial t} = -\dfrac{\partial i_c^{III}}{\partial t} = \dfrac{V_{in} - V_o}{3(L_{aa} + M_s)} & \text{(Eq. 56)} \end{cases}$$

In the Case of $0.5 < D < 1$

In the switching sub-Mode I shown in FIG. 5A, the voltage and current equations are the same as described by Eqs. (34)-(45).

In the case of a round rotor, since $2V_{in} < V_o$ for $0.5 < D < 1$, $i_a$ and $-i_c$ decrease linearly, while $-i_b$ increases linearly. The governing voltage and current equations of the switching sub-Mode II for $0.5 < D < 1$ are the same as those for $0 < D < 0.5$.

Figure 5D:
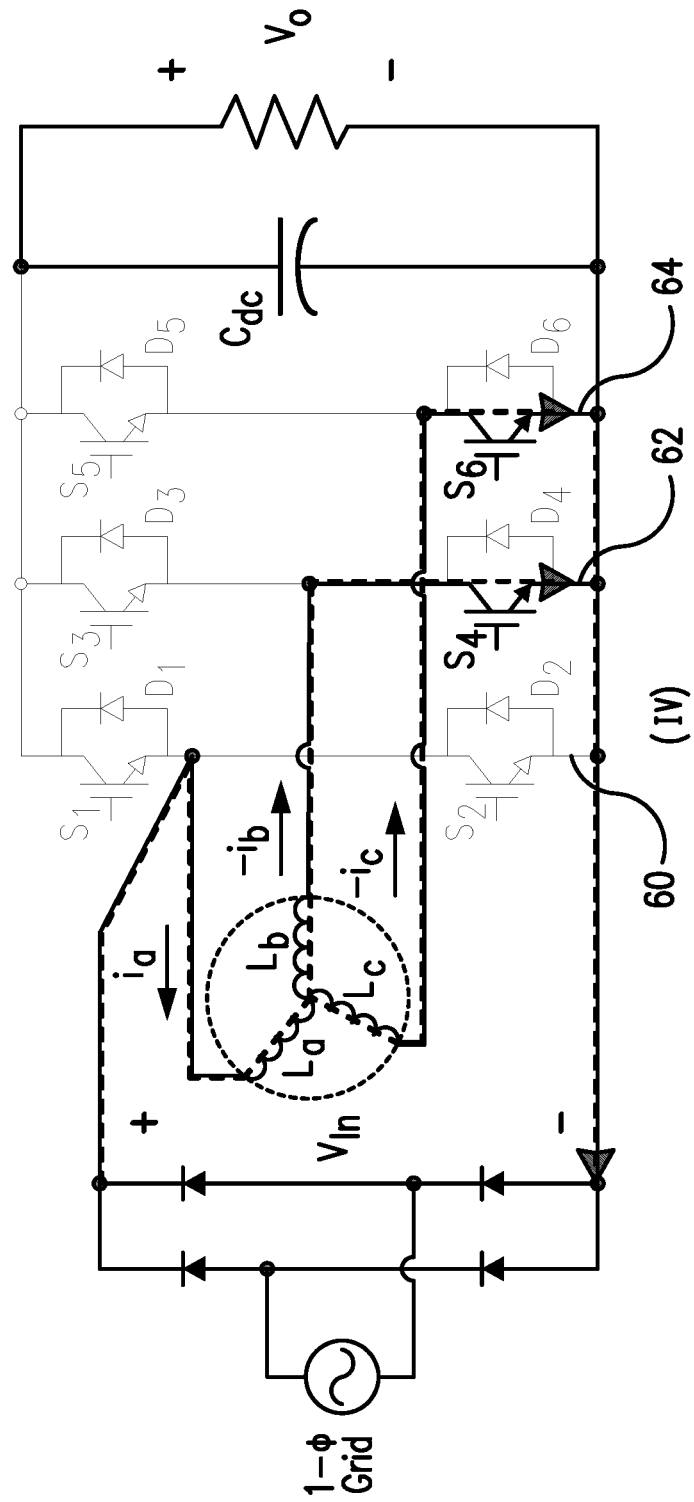

The switching sub-Mode IV shown in FIG. 5D, only exists for $0.5 < D < 1$. This condition happens directly before the switching sub-Mode I and sub-Mode II. In the switching sub-mode IV, both transistors $S_4$ and $S_6$ on the legs 62, 64 are turned ON, and the diodes $D_3$ and $D_5$ on the legs 62, 64 are reverse biased. The same voltage, $V_{in}$, appears across the stator windings:

$$\begin{cases} v_a - v_b = V_{in} & \text{(Eq. 57)} \\ v_a - v_c = V_{in} & \text{(Eq. 58)} \end{cases}$$

Thereby, one can present the phase voltages and currents as $$\begin{cases} v_a^{IV} = \dfrac{1}{\kappa+3}[2V_{in} - \kappa R_s i_a] & \text{(Eq. 59)} \\ v_b^{IV} = v_c^{IV} = \dfrac{1}{\kappa+3}[-(\kappa+1)V_{in} - \kappa R_s i_a] & \text{(Eq. 60)} \end{cases}$$

and $$\begin{cases} \dfrac{\partial i_a^{IV}}{\partial t} = \dfrac{1}{L_1(\kappa+3)}(2V_{in}) & \text{(Eq. 61)} \\ -\dfrac{\partial i_b^{IV}}{\partial t} = -\dfrac{\partial i_c^{IV}}{\partial t} = \dfrac{1}{(L_2 + L_3)(\kappa+3)}[(\kappa+1)V_{in}] & \text{(Eq. 62)} \end{cases}$$

In the particular case of a round rotor, the phase currents can be written as $$\begin{cases} \dfrac{\partial i_a^{IV}}{\partial t} = \dfrac{2V_{in}}{3(L_{aa}+M_s)} & \text{(Eq. 63)} \\ -\dfrac{\partial i_b^{IV}}{\partial t} = -\dfrac{\partial i_c^{IV}}{\partial t} = \dfrac{V_{in}}{3(L_{aa}+M_s)} & \text{(Eq. 64)} \end{cases}$$

Steady State Analyses

Based on Eqs. (43), (53), and (61), the steady-state output-to-input voltage ratio $A_v$ for 0<D<1 can be expressed as $$A_v = \frac{V_o}{V_{in}} = \frac{1}{1-D} \quad \text{(Eq. 65)}$$

According to Eq. (65), at the steady state the interleaved boost converter using the AC Propulsion machine operates equivalent to an interleaved boost converter. Ideally, in steady state, the input power is equal to the output power of electrical load $R_L$, yielding $$I_{in} = \frac{V_o^2}{R_L V_{in}} = \frac{V_{in}}{(1-D)^2 R_L} \quad \text{(Eq. 66)}$$

For a round rotor PMSM, the input current ripple can be written as $$|\Delta i_{in}| = \begin{cases} \dfrac{D(1-2D)}{1-D}\dfrac{V_{in}}{3(L_{aa}+M_s)f_s}, & 0<D<0.5 \quad \text{(Eq. 67)} \\ (2D-1)\dfrac{V_{in}}{3(L_{aa}+M_s)f_s}, & 0.5<D<1 \quad \text{(Eq. 68)} \end{cases}$$

On the other hand, the stator current ripple of phase b and phase c can be presented as, $$|\Delta i_{b,c}| = \begin{cases} \dfrac{D(2-D)}{1-D}\dfrac{V_{in}}{3(L_{aa}+M_s)f_s}, & 0<D<0.5 \quad \text{(Eq. 69)} \\ (2-D)\dfrac{V_{in}}{3(L_{aa}+M_s)f_s}, & 0.5<D<1 \quad \text{(Eq. 70)} \end{cases}$$

It can be seen from Eqs. (69) and (70) that, in comparison to a boost converter, the input current ripple is reduced by two degrees of freedom. In the subject system, the current ripple is suppressed by the equivalent stator inductance equal to the sum of self-inductance and average mutual inductance of three stator coils. This indicates a significant suppression of the current ripple in comparison to discrete inductors and inverse coupled inductor where only one coil inductance contributes to current ripple suppression.

Figure 7:
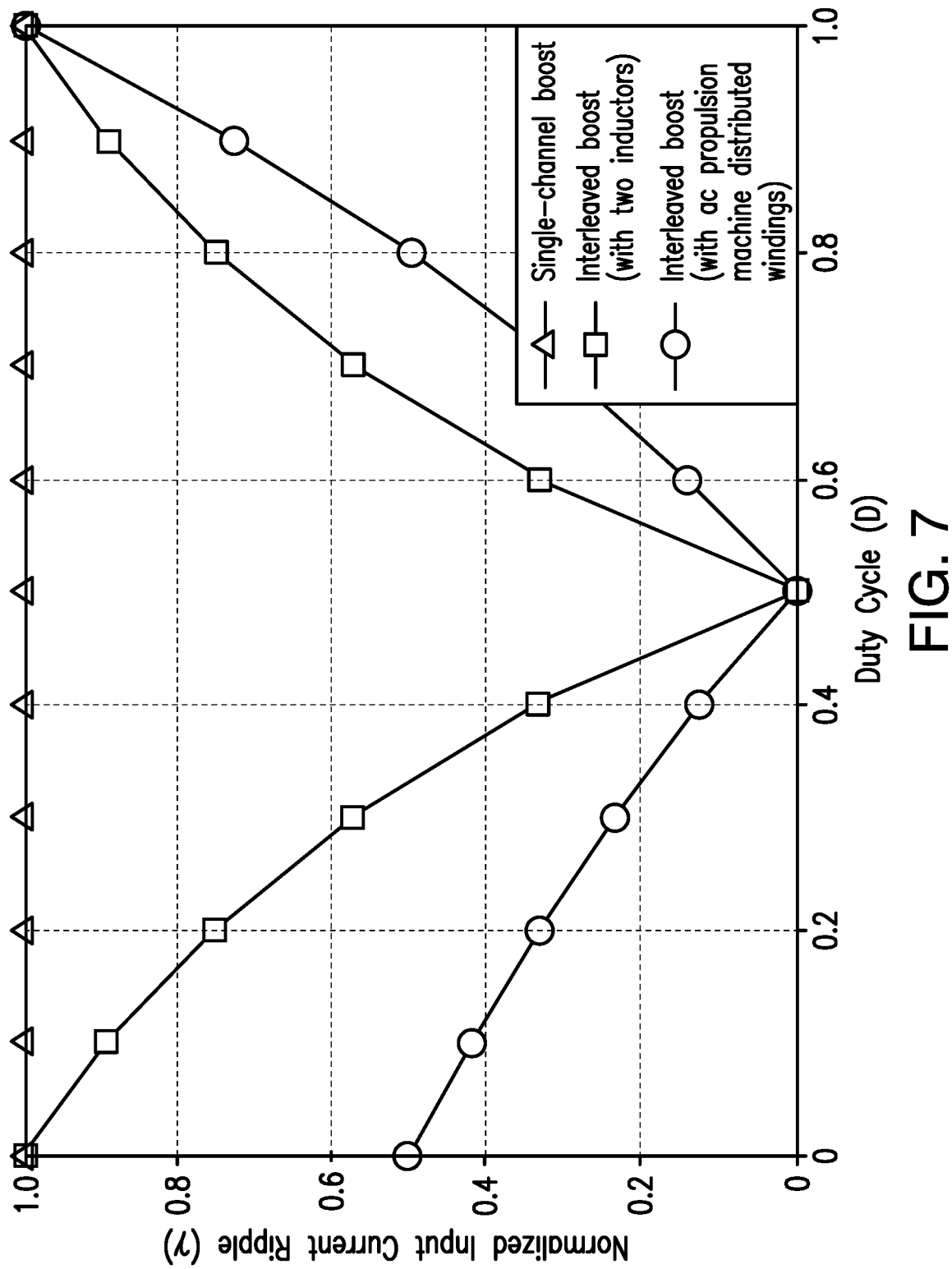
FIG. 7 is a diagram representative of the effectiveness of the input current ripple cancellation for boost and interleaved boost converters.

In addition, the current cancellation effect of two channels can further reduce the current ripple. The effectiveness of ripple cancellation, plotted in FIG. 7, can be represented as the normalized current ripple, γ(D), expressed as a function of duty cycle, $$\gamma(D) = \frac{|\Delta i_{in}|}{|\Delta i_{b,c}|} = \begin{cases} \dfrac{1-2D}{2-D}, & 0<D\leq 0.5 \quad \text{(Eq. 71)} \\ \dfrac{2D-1}{2-D}, & 0.5<D<1 \quad \text{(Eq. 72)} \end{cases}$$

In comparison to a single-channel boost converter and a conventional interleaved boost converter, the subject two-channel interleaved boost converter 59 has a smaller normalized current ripple (or higher effectiveness of ripple cancellation) in the entire duty cycle range. The full cancellation of the input current ripple occurs at D=0.5.

In this approach, the rotor does not rotate in steady state during charging. The rotation will not happen on the rotor without the existence of the stator rotating magnetic field. Due to the current flow direction, which in this case is positive for phase-a current and negative for phase-b and phase-c currents, the vector-sum of the three-phase stator magnetic fluxes is in the direction of a-axis and there will not be any torque to rotate the machine. The rotor may have initial dynamic rotation due to the stator remnant flux. However, it will become stationary as soon as the rotor is aligned with the a-axis.

Control Strategy

The control strategy has been developed with the capability of achieving Power Factor (PF) Unity and less than 5% Total Harmonic Distortion (THD). A controller 70 provides control signals to switch the operation of the charger in different modes, sub-modes and regimes, as well as to support the PFC stage 50 functionality. The controller may have various configurations. In an exemplary embodiment shown in FIG. 8A, the controller 70 includes two closed loops: (1) the input current loop to shape the sinusoidal input line current; and (2) the output voltage/current outer loop to regulate the output voltage/current. The inner loop shapes the steady-state phase-b and phase-c currents ($i_b$ and $i_c$) through a phase locked loop (PLL) to follow the trajectory of the line voltage. The outer loop regulates the magnitude of the phase currents corresponding to output voltage/current. Due to the symmetry of the two-channel interleaved converter 59, the steady-state currents in phase-b and phase-c windings are split equally ($i_b=i_c=\frac{1}{2}i_{in}$), even though their instantaneous values may not be equal.

For the battery load, there are two charging modes: the (1) constant current (CC) charging and (2) constant voltage (CV) charging. In the CC charging, the outer current closed-loop control regulates the battery charging current until the output voltage reaches the nominal battery voltage. When the charger operates in CV charging mode, the outer voltage closed loop is adopted to regulate the battery charging voltage.

Electromagnetic Effect

In the battery charging mode, given the phase-b and phase-c current flowing directions, the vector-sum of the stator magnetic flux due to phase-b and phase-c currents would be in the direction of the a-axis (shown in FIG. 8B), according to the right-hand rule, which is aligned with phase-a magnetic flux. Therefore, the overall vector-sum of the three-phase stator magnetic flux is in the direction of the a-axis. As a result, the rotor is stationary with an electrical angle ($\theta_e$) is equal to π/2 due to the electromagnetic force in the direction of the a-axis.

Figure 8A:
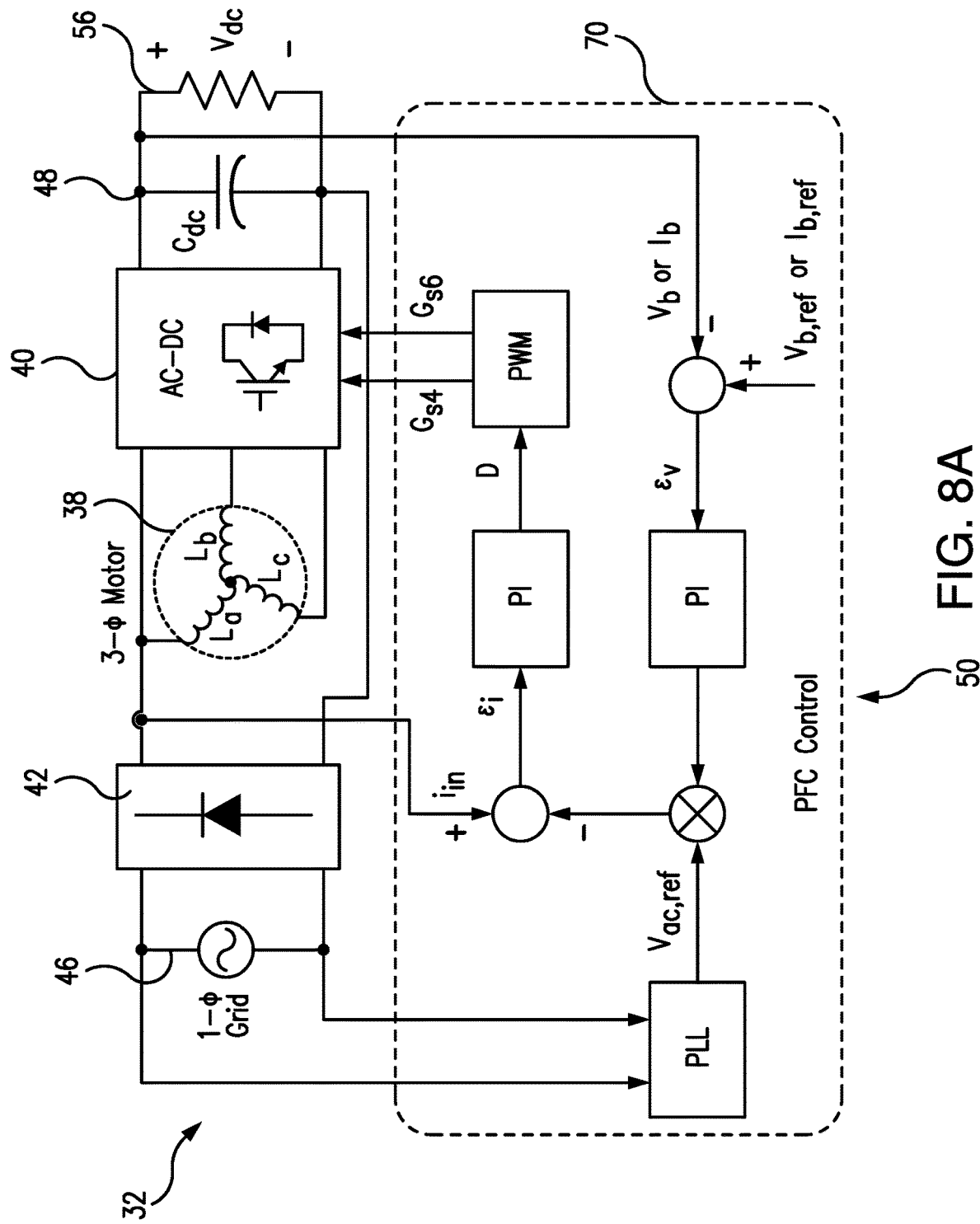
FIG. 8A is a schematic representation of the dual closed-loop PFC control for the subject integrated onboard charger.
Figure 8B:
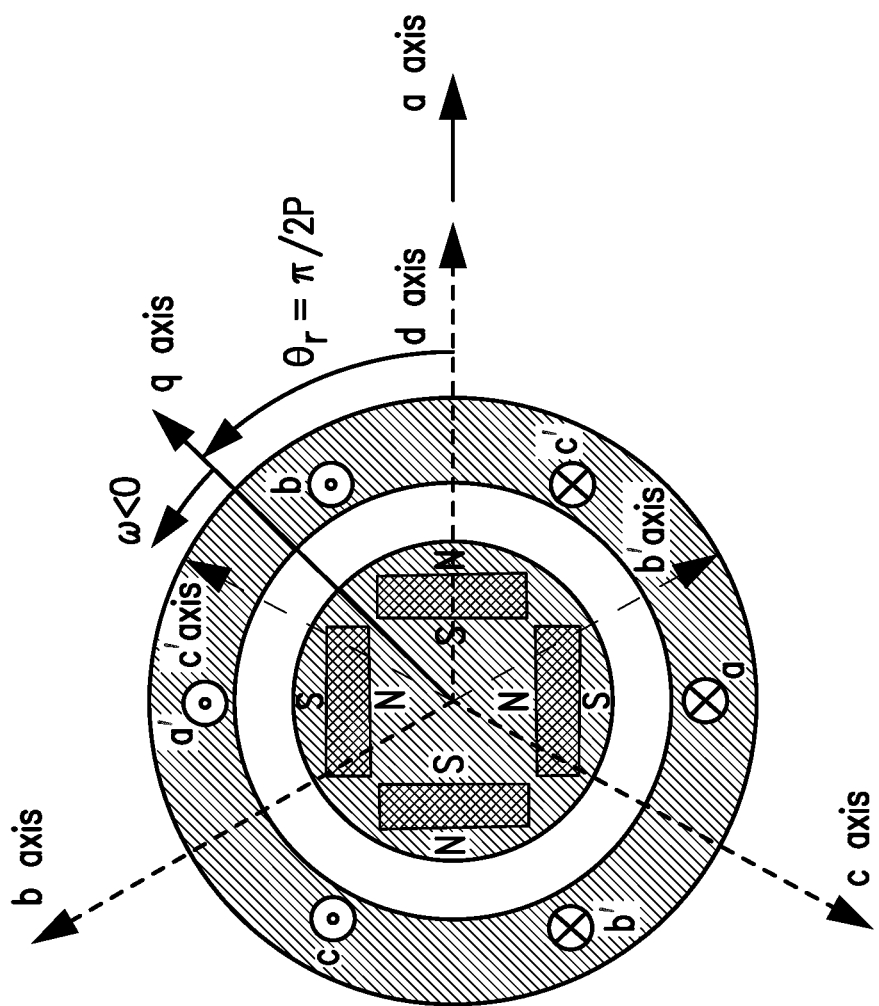
FIG. 8B illustrates the rotor condition of a 3-phase, 4-pole (P=4) PMSM during charging.

FIG. 8B illustrates the rotor condition of 3-phase 4-pole (P=4) PMSM during charging, where the rotor angle ($\theta_r$) is equal to the angle between d-axis and q-axis (π/2P).

Based on the Park transformation, the stator currents in d-axis ($i_d$) and q-axis ($i_q$) can be expressed in terms of stator phase currents ($i_a$, $i_b$, $i_c$) and electrical angle ($\theta_e$), $$\begin{cases} i_d = \frac{2}{3}\left[i_a\sin\theta_e + i_b\sin\left(\theta_e - \frac{2\pi}{3}\right) + i_c\sin\left(\theta_e + \frac{2\pi}{3}\right)\right] & \text{(Eq. 73)} \\ i_q = \frac{2}{3}\left[i_a\cos\theta_e + i_b\cos\left(\theta_e - \frac{2\pi}{3}\right) + i_c\cos\left(\theta_e + \frac{2\pi}{3}\right)\right] & \text{(Eq. 74)} \end{cases}$$

The produced electromagnetic torque $T_e$ can be represented as $$T_e = \frac{3}{2}\left[\lambda_m i_a \cos\theta_e + \frac{1}{2}(L_q - L_d)i_a^2\sin(2\theta e)\right] \qquad \text{(Eq. 75)}$$

When the electrical angle is not equal to $\pi/2$, the electromagnetic torque, generated by the magnetic flux of the permanent magnets and the stator phase currents, will force the rotor to be locked in alignment with a-axis.

Three-Phase Integrated Charger Topologies

Figure 9A:
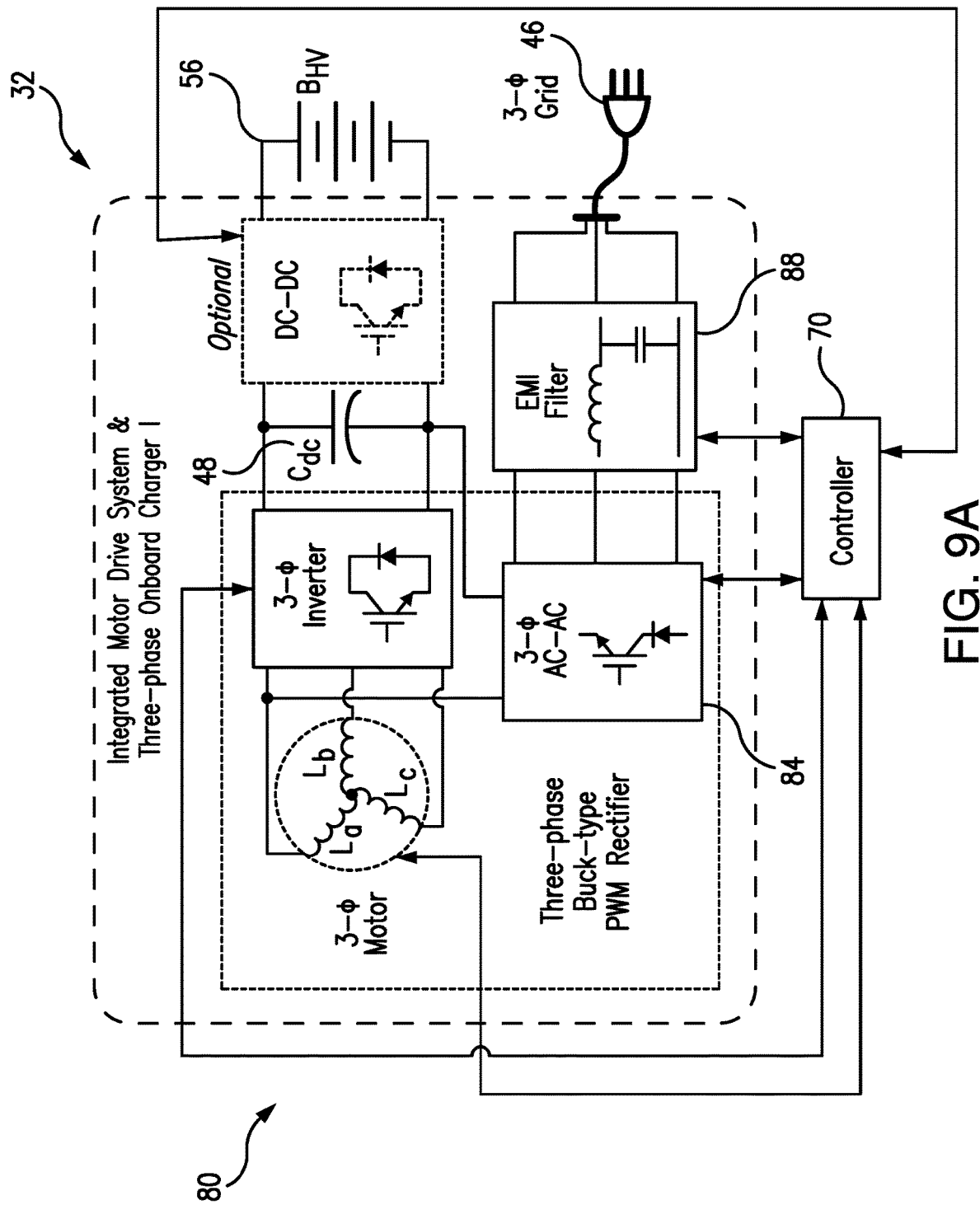
FIGS. 9A-9B are schematic representations of the subject three-phase grid-connected integrated onboard battery charger integrated with the AC propulsion system with the 3-phase buck-type PWM rectifier (FIG. 9A) and the 3-phase buck-boost-type PWM rectifier (FIG. 9B)
Figure 9B:
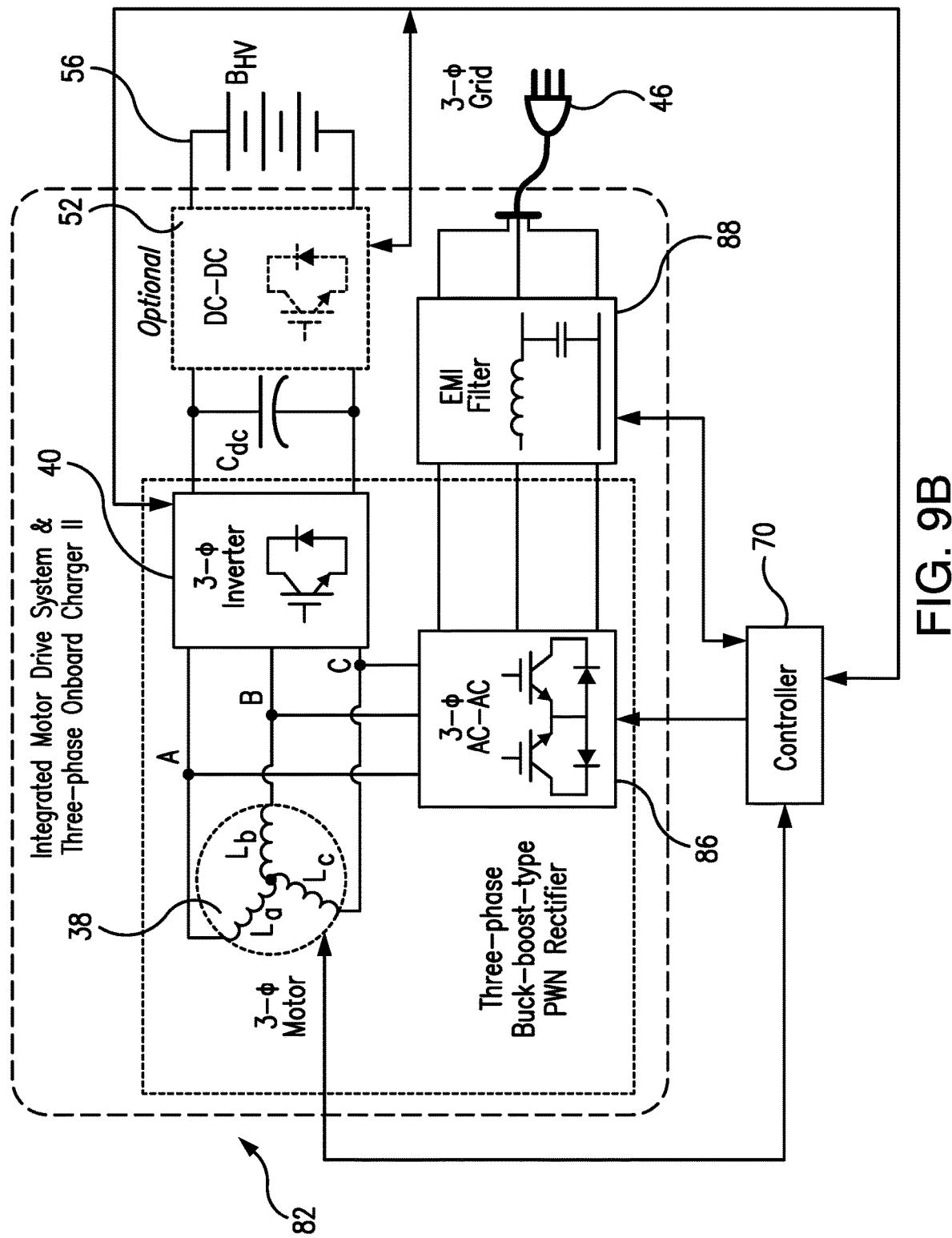

As an alternative to the one-phase integrated onboard charger topology shown in FIGS. 2, 4A-4B, 5A-5D, and 8A, three-phase, grid-connected, integrated onboard chargers 80, 82 integrated with three-phase AC propulsion machine and its inverter, have been developed, as shown in FIGS. 9A-9B, respectively. Both approaches 80 and 82 achieve PFC and battery charging using the AC Propulsion machine 38 and its bidirectional three-phase inverter 40, only with small and compact add-on semiconductor components.

The onboard integrated charger 80, shown in FIG. 9A, is realized by connecting a unidirectional three-phase active bridge 84 coupled between one of the Propulsion machine phase-terminals (in this case, terminal A), and the negative terminal 44 of the DC-link 48 of the Inverter 40.

The onboard integrated charger 82 depicted in FIG. 9B, is implemented by connecting a bidirectional three-phase active bridge 86 to the Propulsion machine's three phase-terminals A, B, and C.

The subject integration approach eliminates the need for an off-board charger without altering the conventional motor/inverter arrangement. The only additional onboard PEI in each proposed topology 80, 82 is a three-phase active bridge 84, 86 and an electromagnetic interference (EMI) filter 88.

As shown in FIG. 9A, all three stator windings $L_a$, $L_b$, $L_c$ of the AC machine 38 are utilized as a DC-inductor. In the embodiment 82 of FIG. 9B, each stator winding of the AC Propulsion machine 38 is utilized as an AC-inductor. Both proposed schemes are applicable for any three-phase AC machine propulsion system with the only feasible access to machine phase-terminals (A, B, C, no neutral).

Figure 10A:
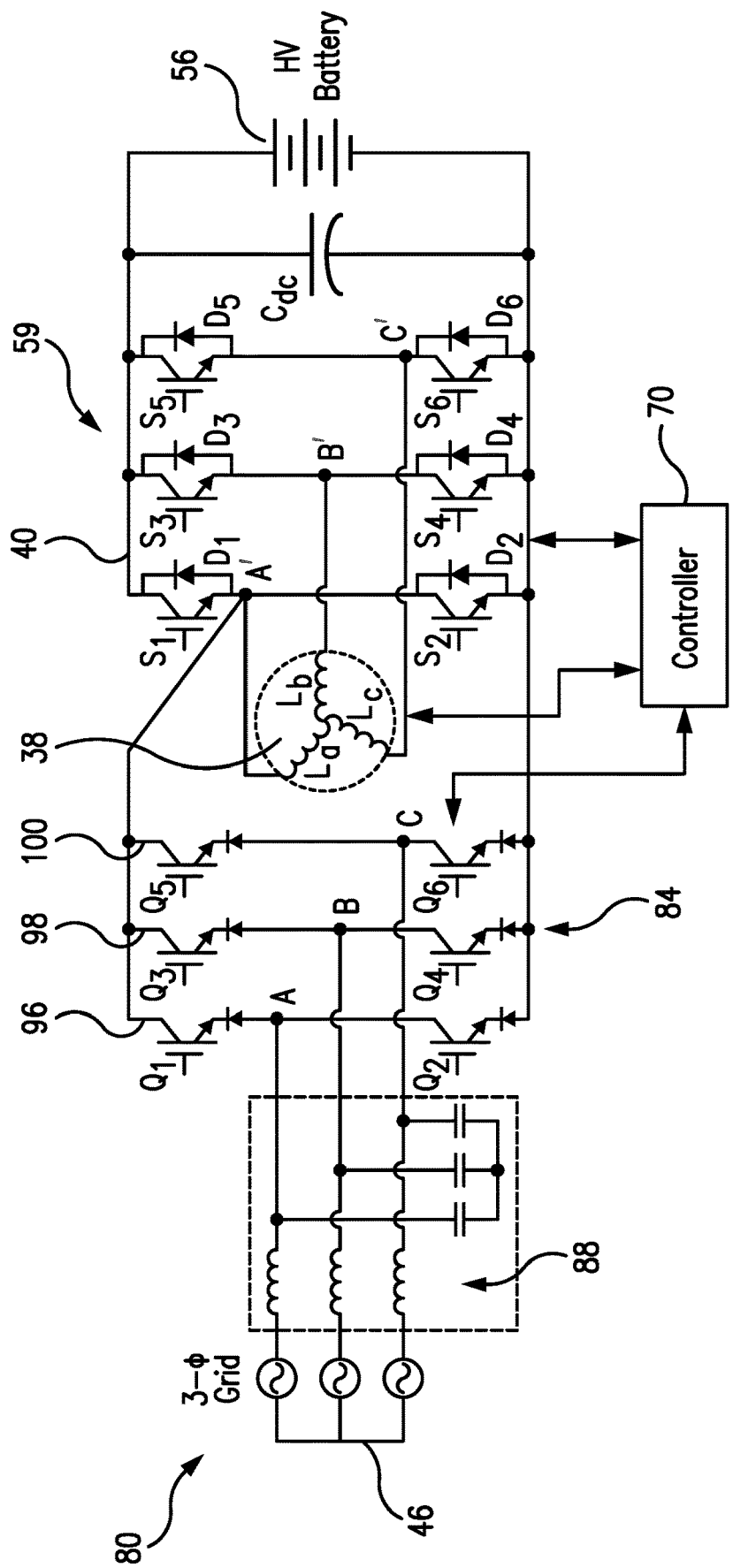
FIGS. 10A-10B are representative of circuit diagrams of the subject three-phase grid-connected integrated onboard charger with the buck-type PWM rectifier including IGBT-based PWM rectifier (shown in FIG. 10A) and SCR-based PWM rectifier (FIG. 10B)
Figure 10B:
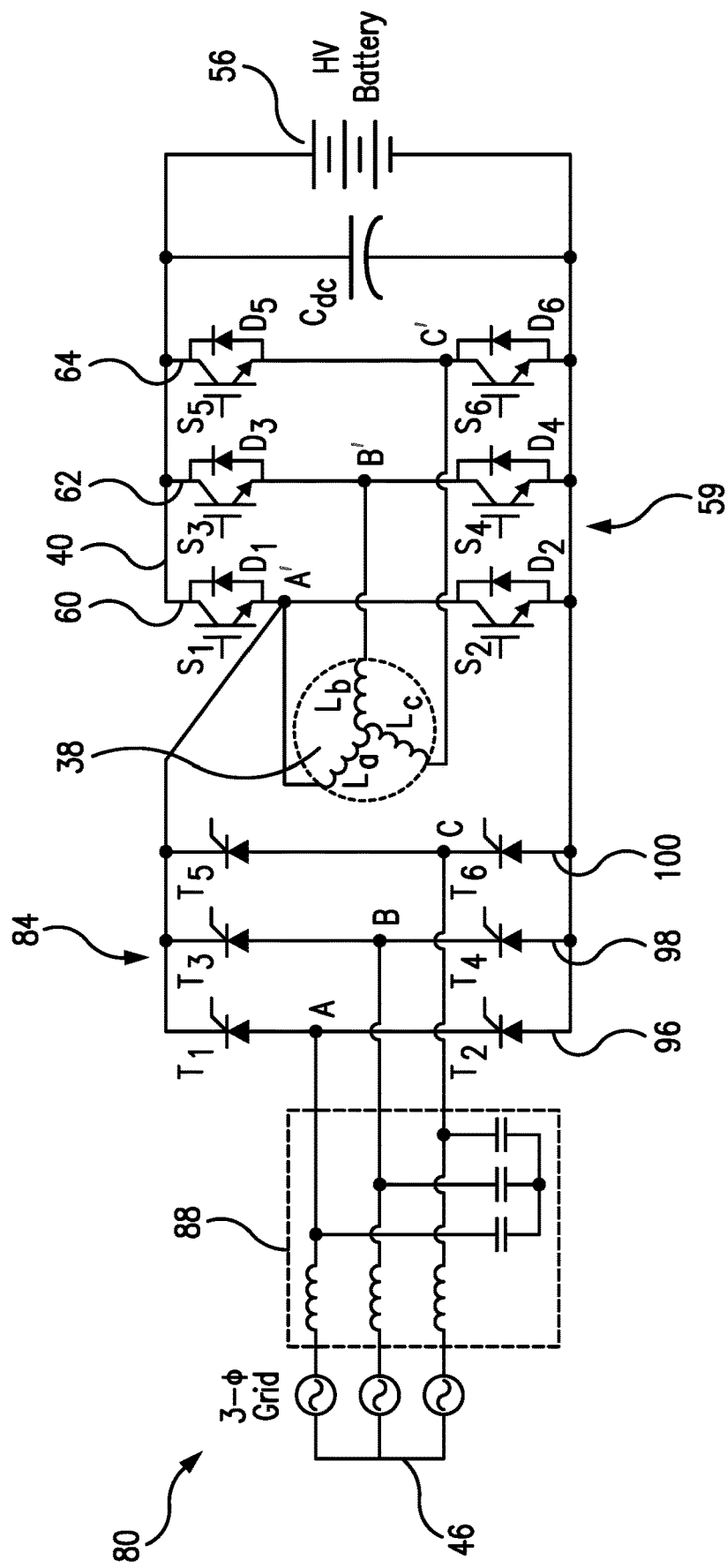
Figure 11A:
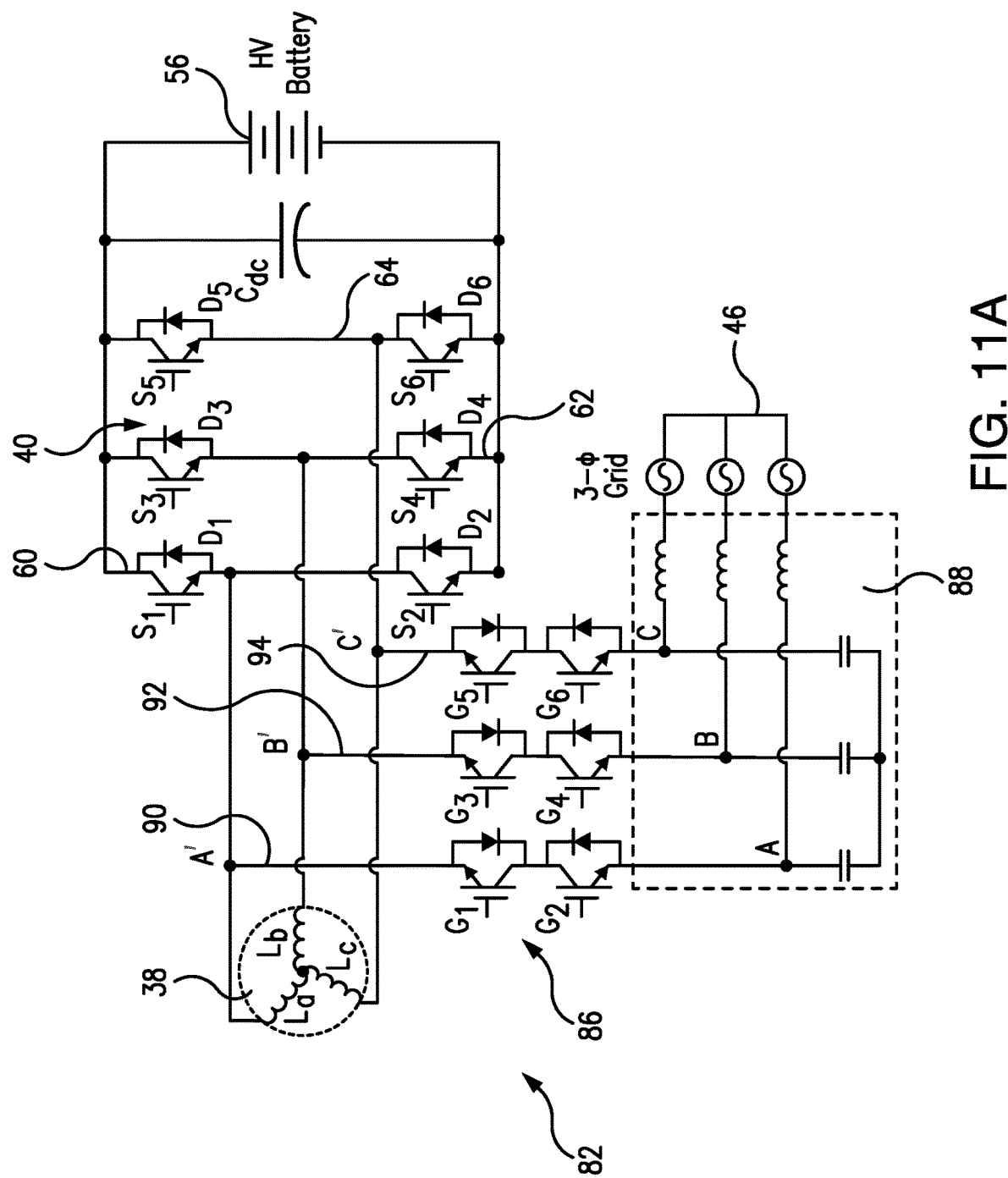
FIGS. 11A-11B are representative of circuit diagrams of the subject three-phase grid-connected integrated onboard charger with the buck-boost-type PWM rectifier built with IGBT-based PWM rectifier (FIG. 11A) and TRIAC-based PWM rectifier (FIG. 11B)
Figure 11B:
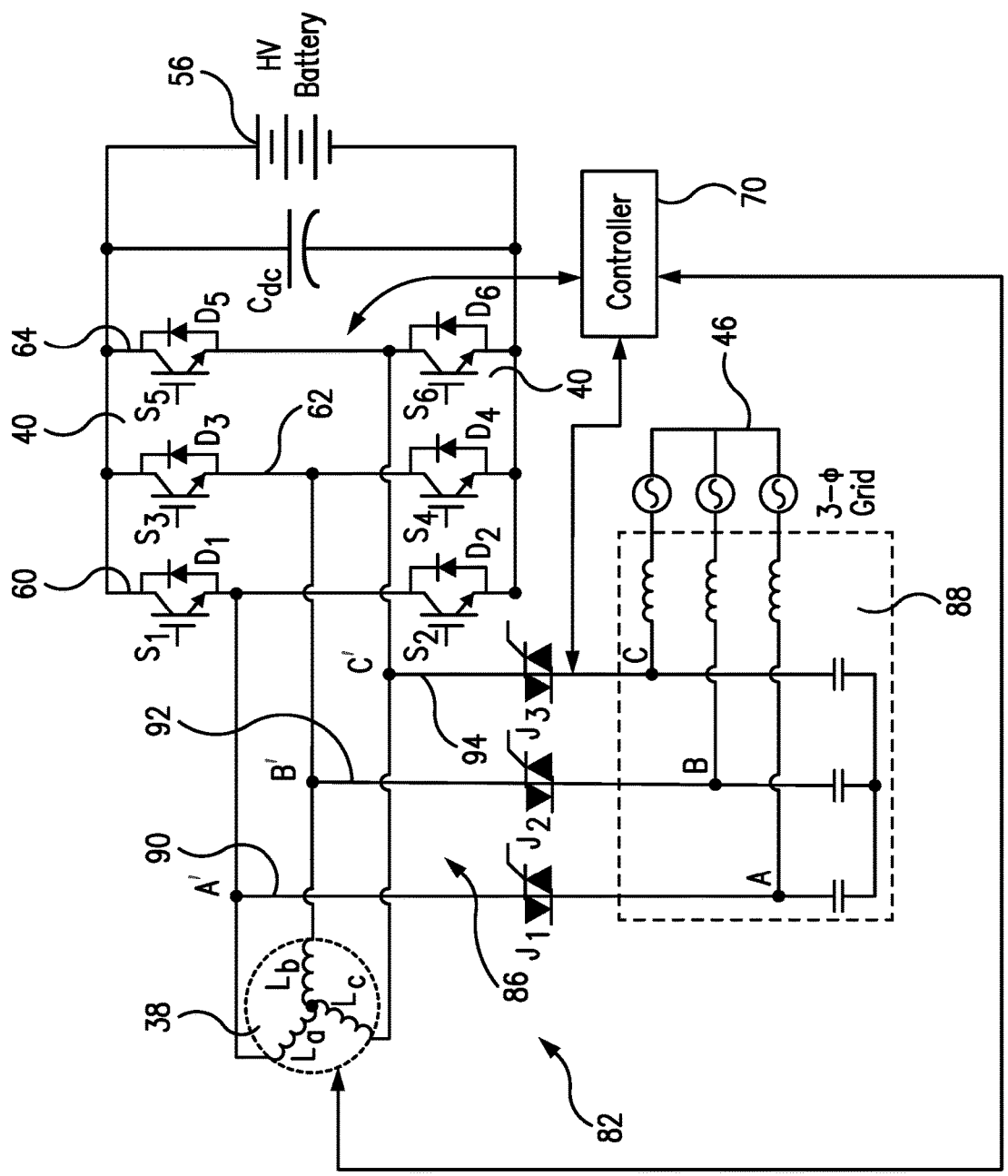

The detailed circuit schemes of the subject three-phase grid-connected integrated onboard chargers 80, 82 are illustrated in FIGS. 10A-10B (for the charger 80), and FIGS. 11A-11B (for the charger 82).

As shown in FIG. 10A, in the subject onboard integrated charger 80, the three-phase active buck rectifier 84 is composed of six unidirectional semiconductor switches, which can be configured either using six insulated-gate-bipolar-transistors (IGBT) $Q_1$-$Q_6$ in series with their corresponding freewheeling diodes, or using six silicon-controlled-rectifiers (SCRs), $T_1$-$T_6$, as shown in FIG. 10B, or MOSFETs coupled in series with a free-wheeling diode, or other types of unidirectional switches. Using SCRs may potentially reduce the component cost and number of components.

In the charger 82, shown in FIGS. 11A-11B, each leg 90, 92, 94 of three-phase active bridge 86 may include two back-to-back connected IGBTs (as shown in FIG. 11A). Bilateral triode thyristor (i.e., TRIAC) based PWM rectifier 86, as shown in FIG. 11B, or a pair of back-to-back MOSFETs (or other bidirectional switches) can be alternatively used to further reduce the cost and component count of the converter.

Charger 80 with Buck-Type PWM Rectifier 84 (FIG. 9A, 10A-10B, 12A-12B)

As shown in FIGS. 9A, and 10A-10B, a buck-type unidirectional three-phase rectifier bridge 84 is implemented between the AC propulsion system 38 and the three-phase grid 46.

Figure 12A:
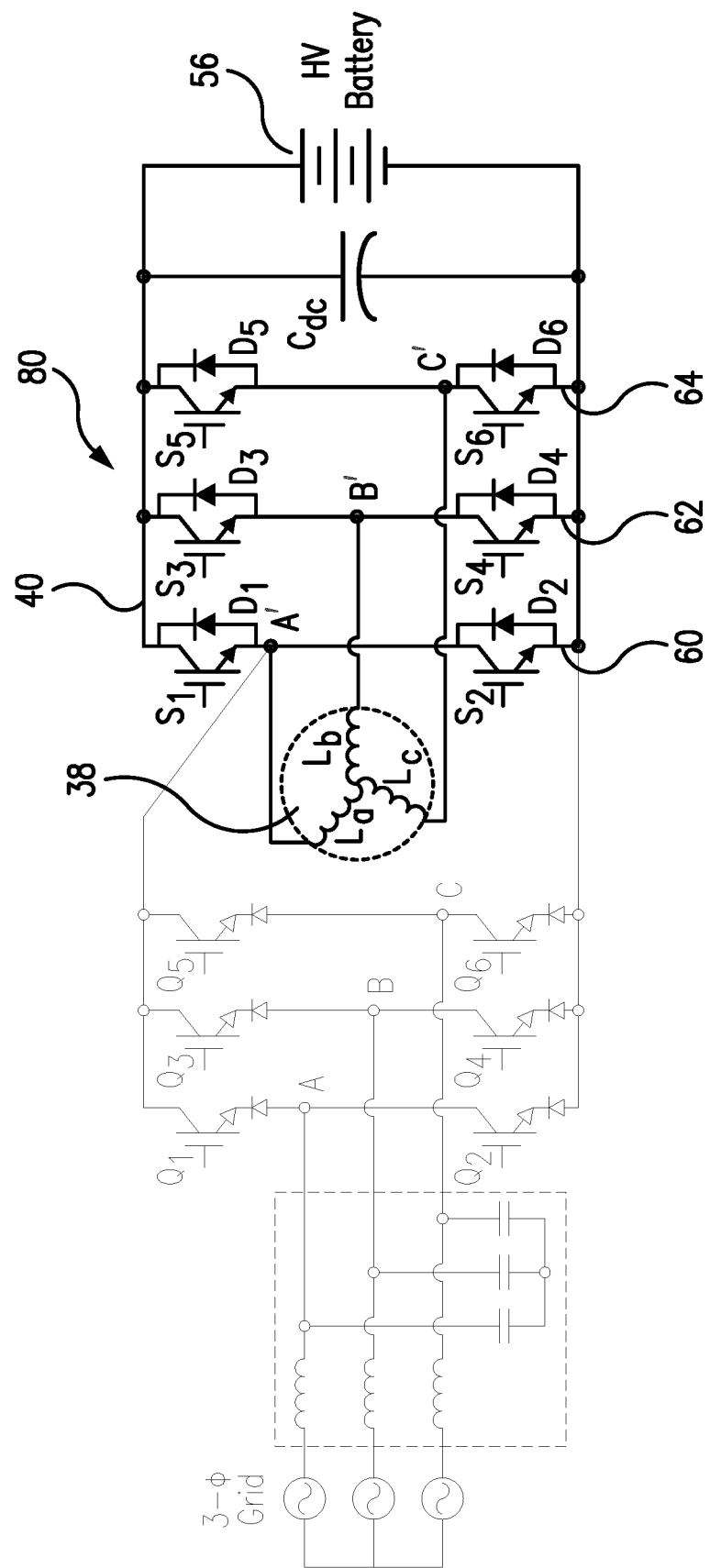
FIGS. 12A-12B are electrical diagrams showing operation modes of the front-end buck-type PWM rectifier with the AC Propulsion machine in the propulsion mode of operation (FIG. 12A) and in the battery charging mode of operation (FIG. 12B)

During the propulsion mode of operation, the battery 56 provides the propulsion power to the AC Propulsion machine 38 through the three-phase inverter ($S_1$~$S_6$), as shown in FIG. 12A, and the add-on rectifier bridge 84 (composed of $Q_1$~$Q_6$) has no influence on the inverter operation.

Figure 12B:
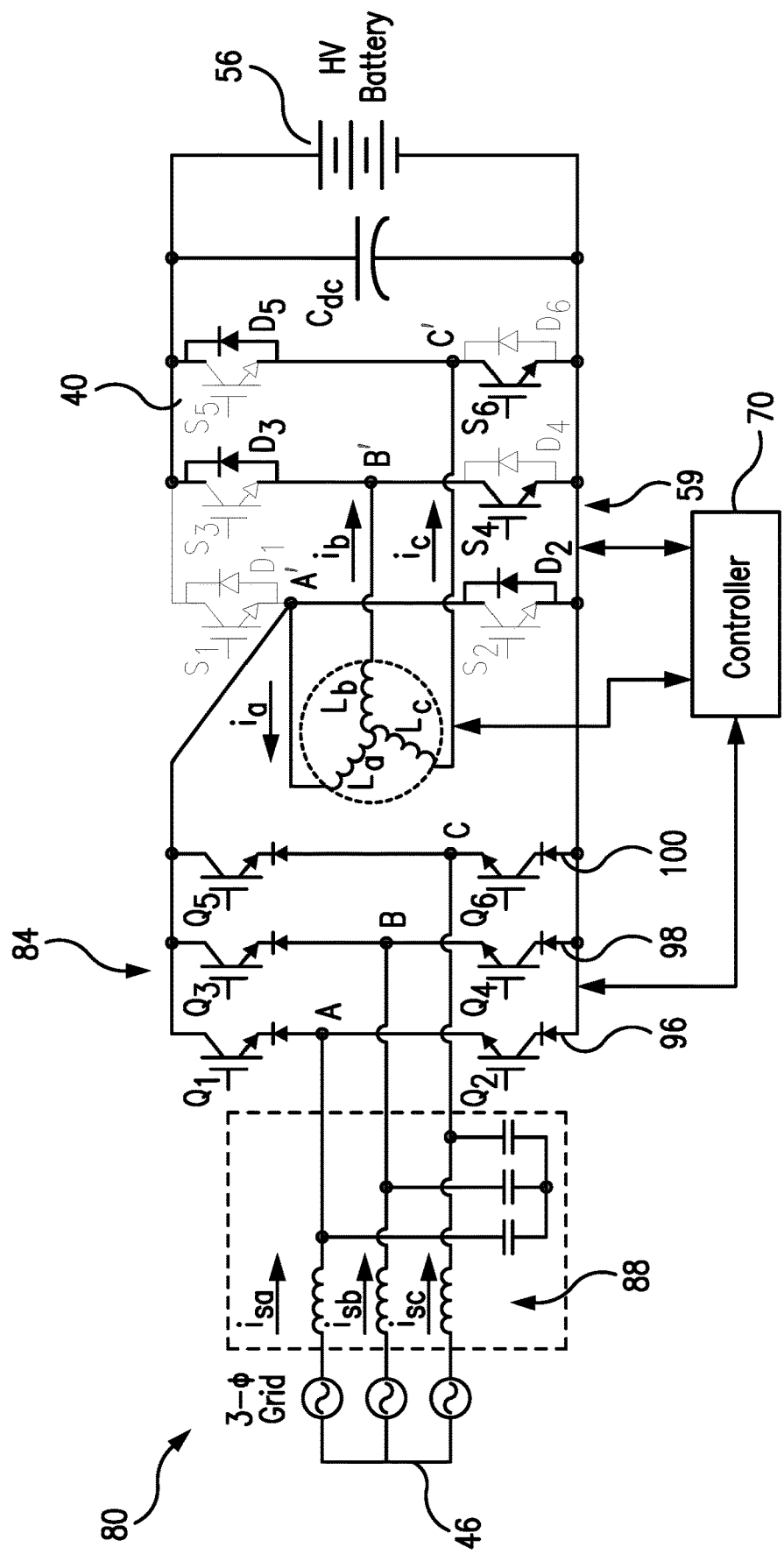

In the battery charging mode, as shown in FIG. 12B, the three-phase Inverter legs (in this case, the legs 60, built with the switches $S_1$ and $S_2$), connected to the positive terminal of the front-end buck-type rectifier 84 is disabled. The propulsion machine windings ($L_a$, $L_b$ and $L_c$) and the other two legs 62, 64 of the Inverter 40 (in this case, $S_4$ and $D_3$, $S_6$ and $D_5$) form a two-channel interleaved boost converter 59 to suppress the rectifier 84 output current ripple ($i_a$ from the terminal A' to the neutral point). The AC machine 38 serves as a three-winding coupled inductor for energy storage and current ripple suppression/cancellation. The three-phase rectifier bridge 84 composed of the $Q_1$-$Q_6$ acts as a current source rectifier. The rectifier output current $i_a$ can be assumed as a DC current due to the effective ripple suppression of the interleaved boost converter.

In this topology (FIG. 12B), the diode $D_1$ is reverse biased since the DC_link voltage is higher than the output voltage of the diode rectifier, due to the boost operation of the converter 59. Similarly, diode $D_2$ is reverse biased by the positive output voltage of rectifier. However, the diode $D_2$ acts as a freewheeling diode to create a current flow path when all the high-side or low-side switches of the front-end three-phase rectifier 84 are turned OFF. To satisfy the low total harmonic distortion (THD) requirement of grid, the interleaved boost converter operates in continuous current mode (CCM) to maintain the DC current at the rectifier's output.

Figure 13:
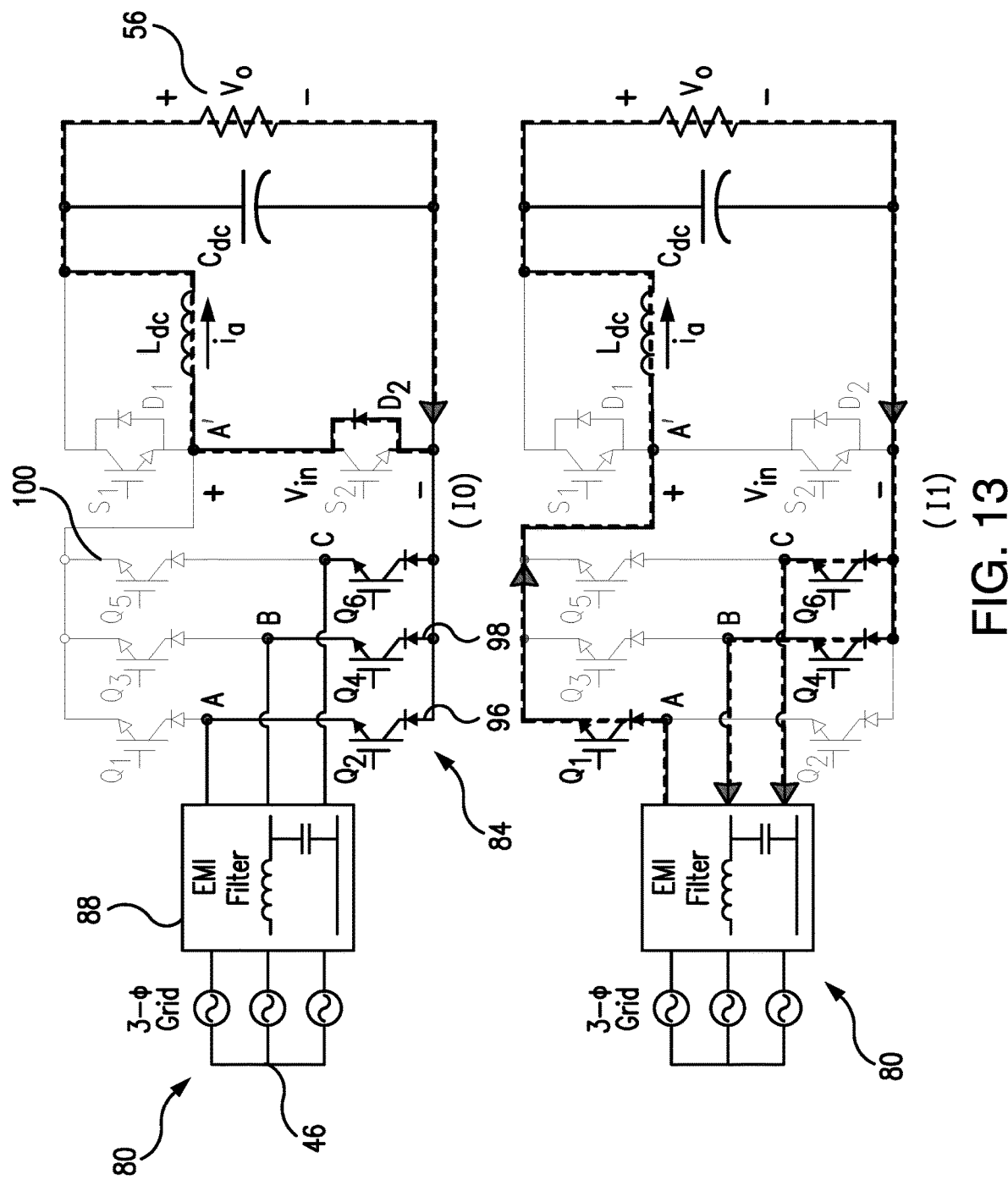
FIG. 13 is representative of eight electrical circuit diagrams reflecting eight switching sub-modes of buck-type PWM rectifier during the battery charging mode of operation.
Figure 13:
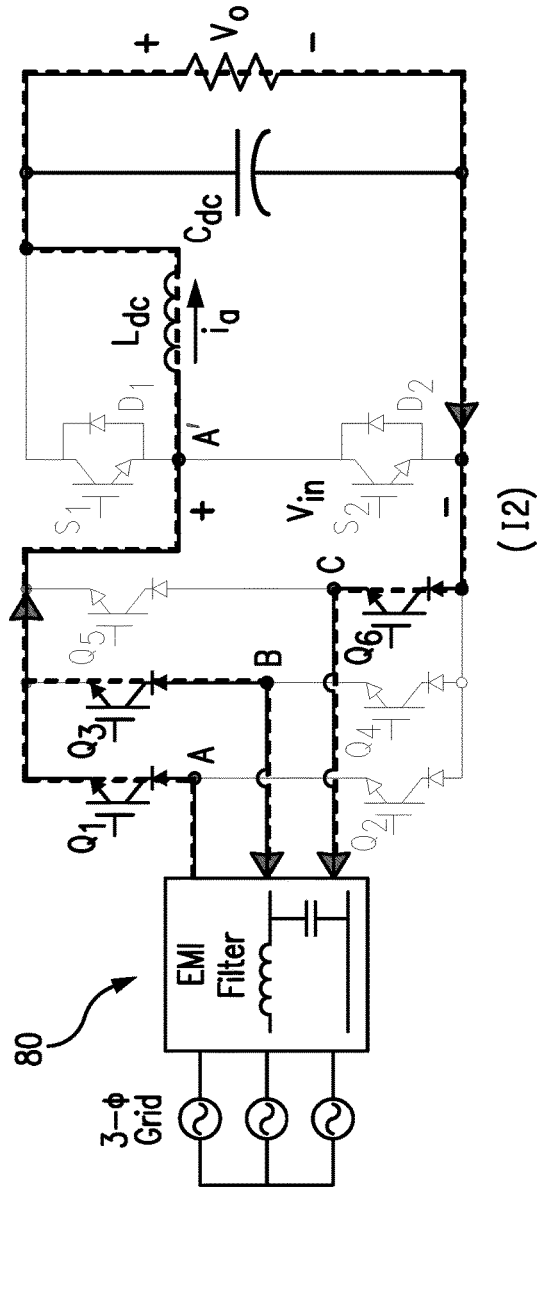
Figure 13:
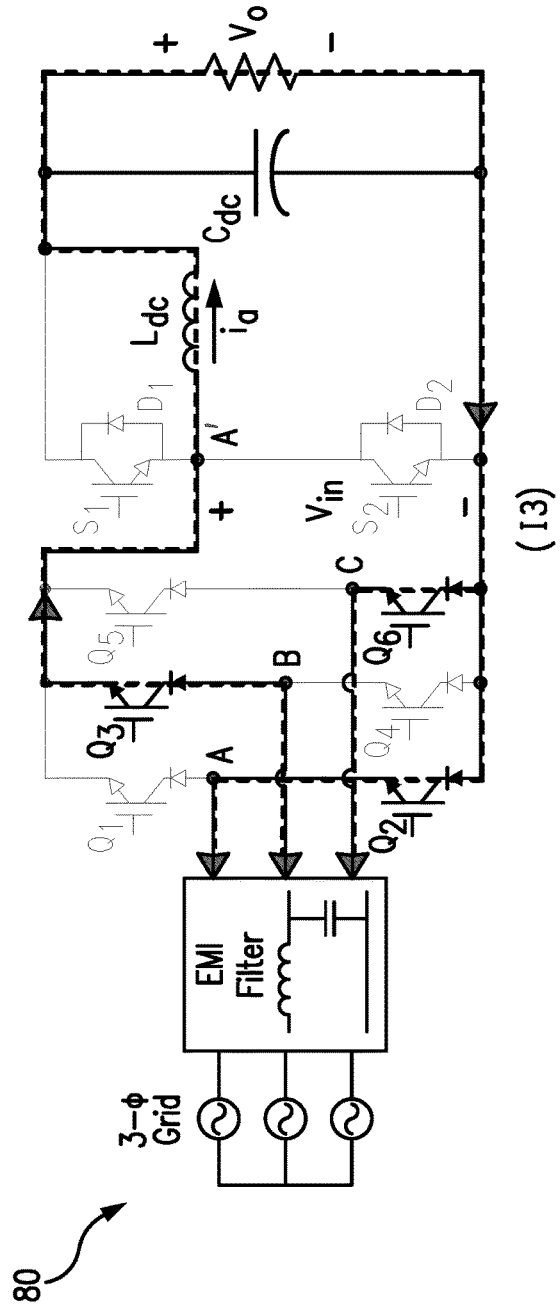
Figure 13:
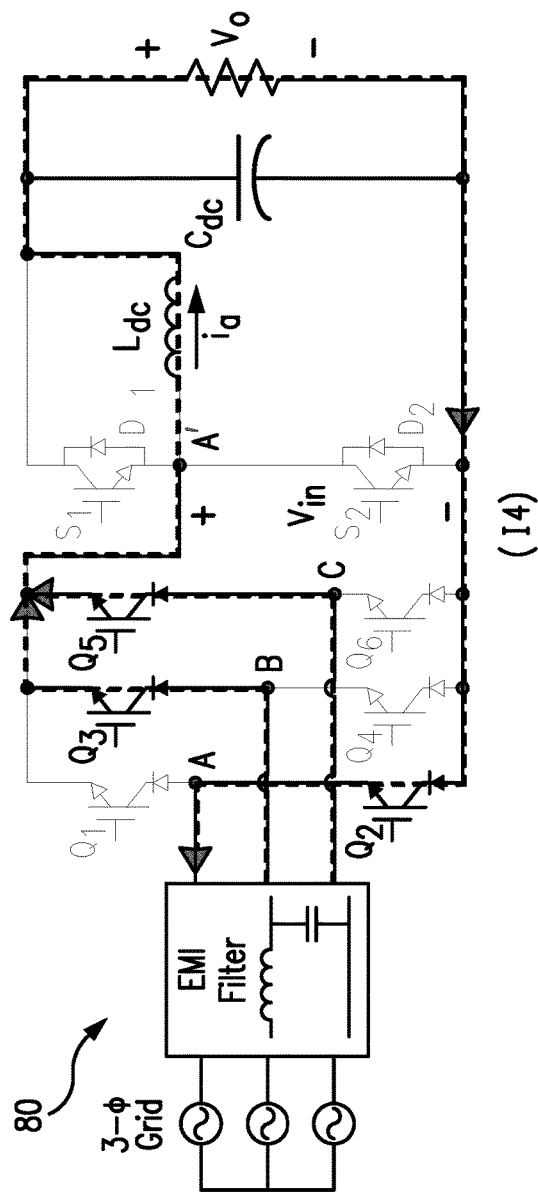
Figure 13:
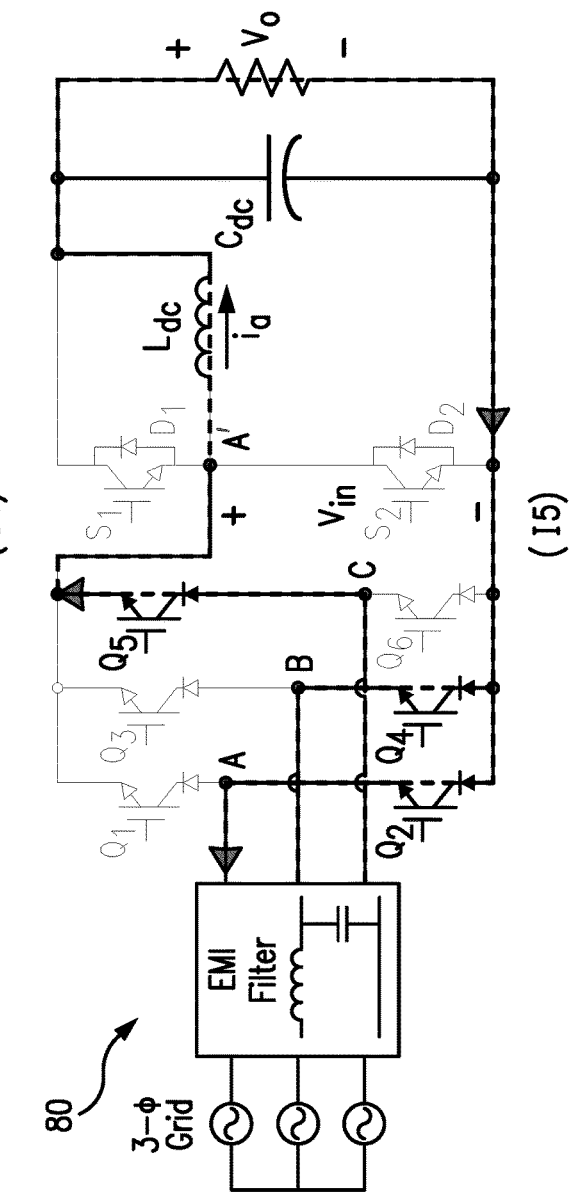
Figure 13:
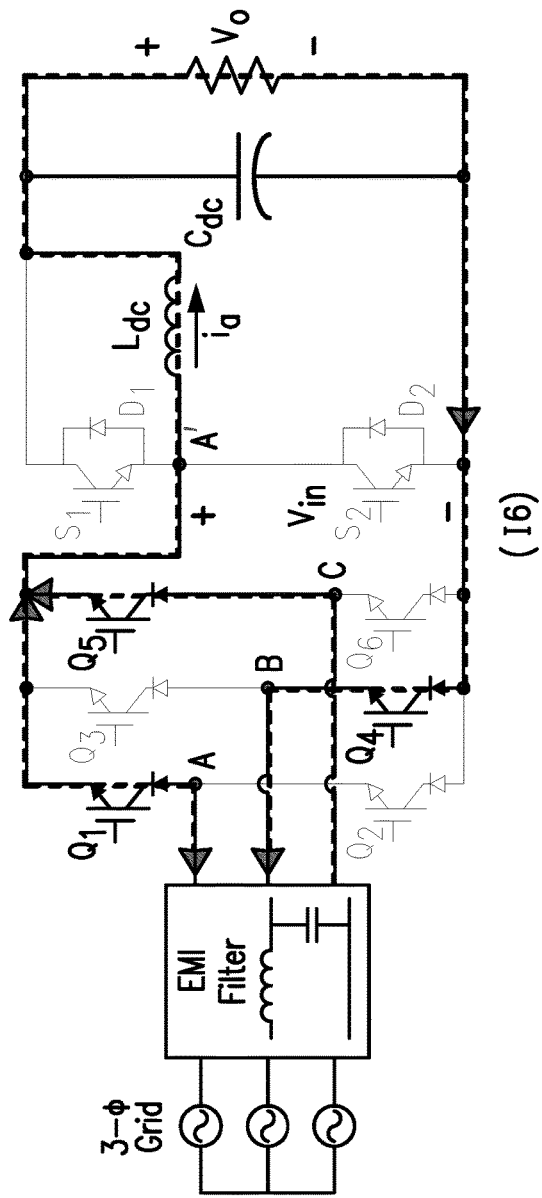
Figure 13:
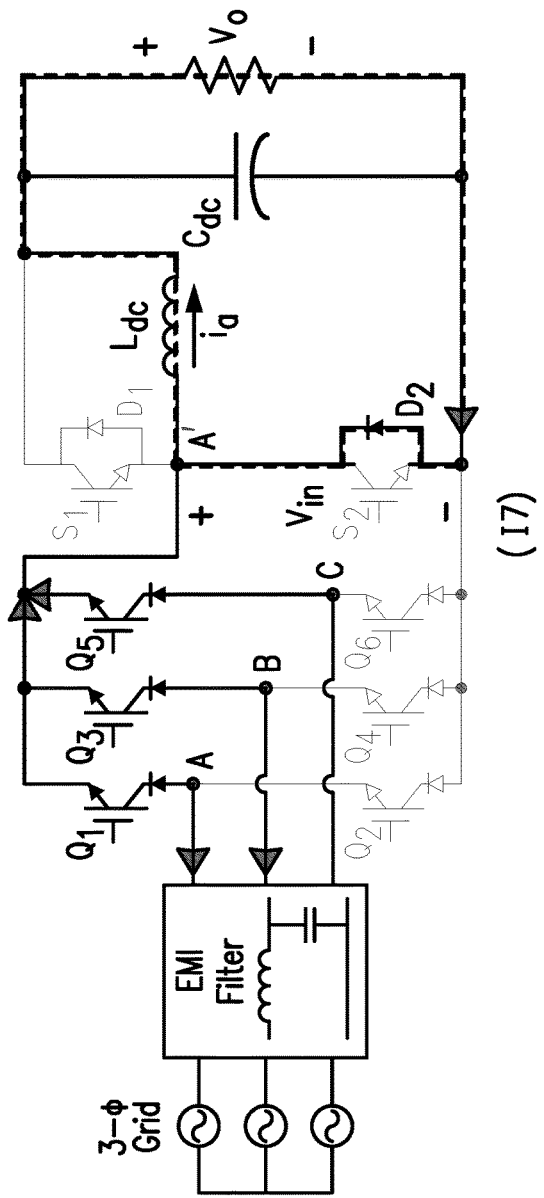
Figure 14A:
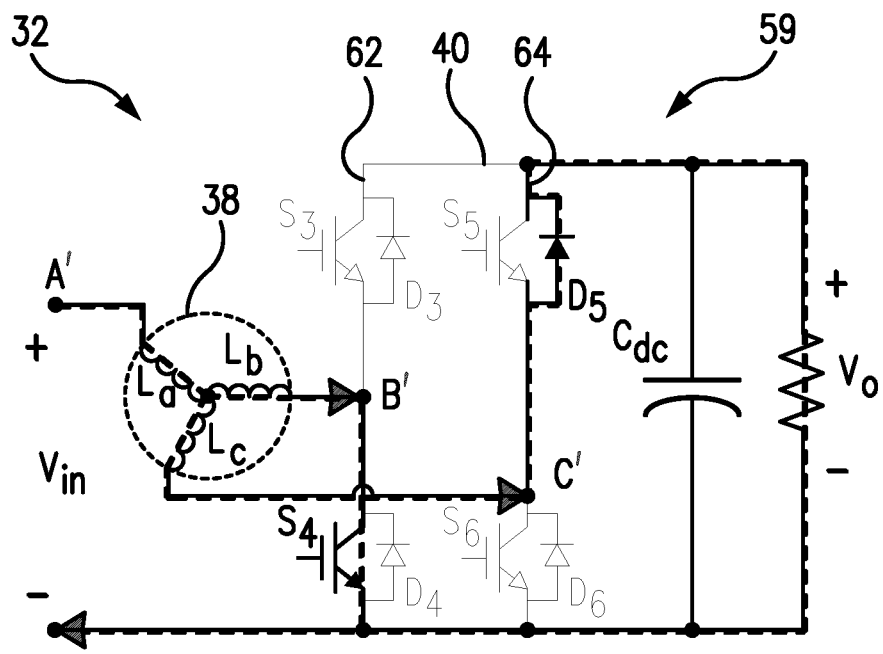
FIGS. 14A-14D are representative of four electric diagram reflecting the switching sub-modes (I, II, III, IV), respectively, of two-channel interleaved boost converter during the battery charging mode of operation.
Figure 14B:
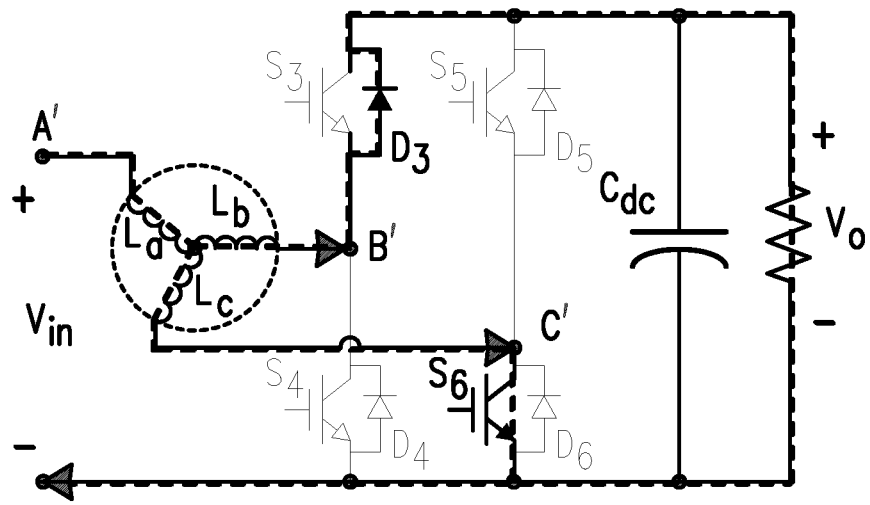
Figure 14C:
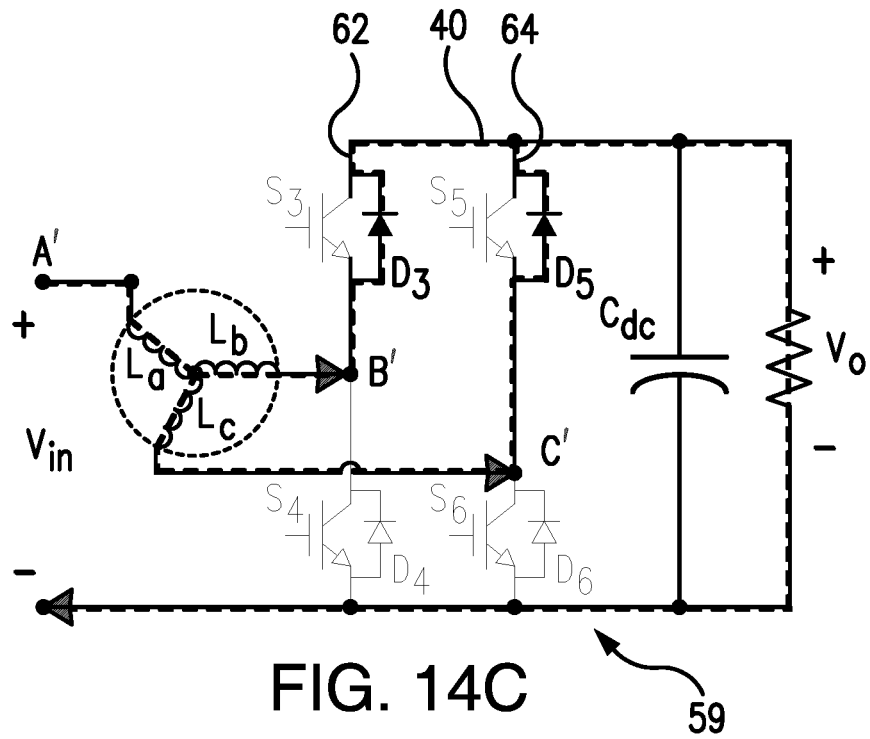
Figure 14D:
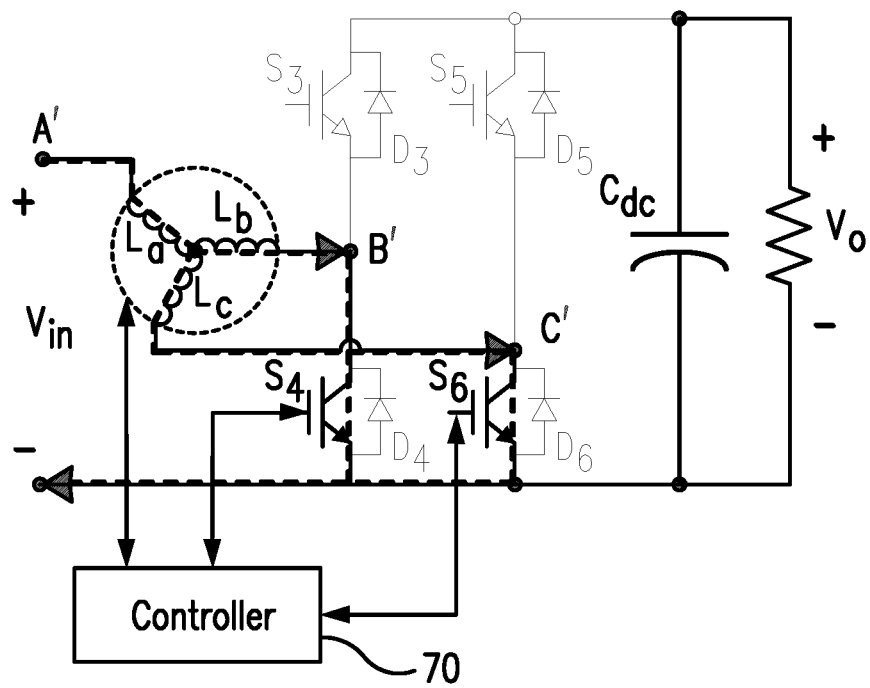

Operation of the Charger 80 with the Buck-Type PWM Rectifier 84 (FIG. 13)

The switching of PWM rectifier 84 (in this case $Q_1$-$Q_6$) are controlled with eight possible switching sub-modes, including six active switching modes (I1~I6) and two zero switching modes (I0 and I7), as demonstrated in FIG. 13. Each bridge leg 96, 98, 100 is controlled with a complementary operation: in FIG. 13, "1" stands for high-side switches turn-on, and "0" stands for low-side switches turn-on.

For each switching sub-mode, three out of six switches $Q_1$-$Q_6$ are turned ON at a predetermined time, as shown in FIG. 13. For simplicity, the two-channel interleaved boost converter 59 is considered equivalent to a large DC-inductor ($L_{dc}$) due to its effective current ripple suppression. During six active switching modes I1=I6, the dc current $i_a$ flows through the rectifier switches (3 switches of the 6 switches $Q_1$-$Q_6$) and the grid 46, while the freewheeling diode $D_2$ of the 2-channel interleaved boost converter is reverse biased by the rectifier output voltage. During two zero switching modes (I0, I7), the grid is disconnected from $L_{dc}$, and thereby $i_a$ flows through freewheeling diode $D_2$.

Two-Channel Interleaved Boost Converter

This case is very similar to the single-phase onboard charging outlined in previous paragraphs. However, it is explained again herein in order to provide additional clarity.

For simplicity, initially a resistive load is considered. However, this will not impact the problem generality, as a battery could be modeled with an equivalent resistance during different charging modes. The switching operation is similar to that of a two-channel interleaved boost converter 59 with two discrete inductors or one inverse coupled inductor. The interleaving legs ($S_4$ and $S_6$) operate with 180° phase difference in time domain. However, in comparison to other interleaved boost converters, the converter with the AC machine has different steady-state equivalent inductances. Utilization of the 120° spatial out-of-phase distributed windings ($L_a$, $L_b$, $L_c$) as interleaved channels of a boost converter further reduces the steady-state current ripple. The switching operation is divided into four switching sub-modes (I)-(IV), as shown in FIGS. 14A-14D.

When 0<D<0.5, the circuit operation has a periodical switching sequence of (I)-(III)-(II)-(III)-(I). When 0.5<D<1, the switching sequence changes to (IV)-(I)-(IV)-(II)-(IV). Stator inductor currents and semiconductor currents corresponding to different switching sub-modes are illustrated in FIGS. 6A-6B.

All the equations, expressions, and dynamic torque analyses of the single-phase integrated structure presented in previous paragraphs are applicable to this case Similar to the single-phase topology, the steady-state output-to-input voltage ratio $A_v$ for 0<D<1 can be expressed as $$A_v = \frac{V_o}{V_{in}} = \frac{1}{1-D} \quad \text{(Eq. 76)}$$

Charger 82 with Buck-Boost-Type PWM Rectifier 86 (FIGS. 9B, 15A-15B, 16, 17A-17B, 19)

In this embodiment, a buck-boost-type PWM rectifier 86 is developed using a bi-directional three-phase active bridge between the three terminals A, B, C of the AC machine 38 and the three-phase grid 46.

Figure 15A:
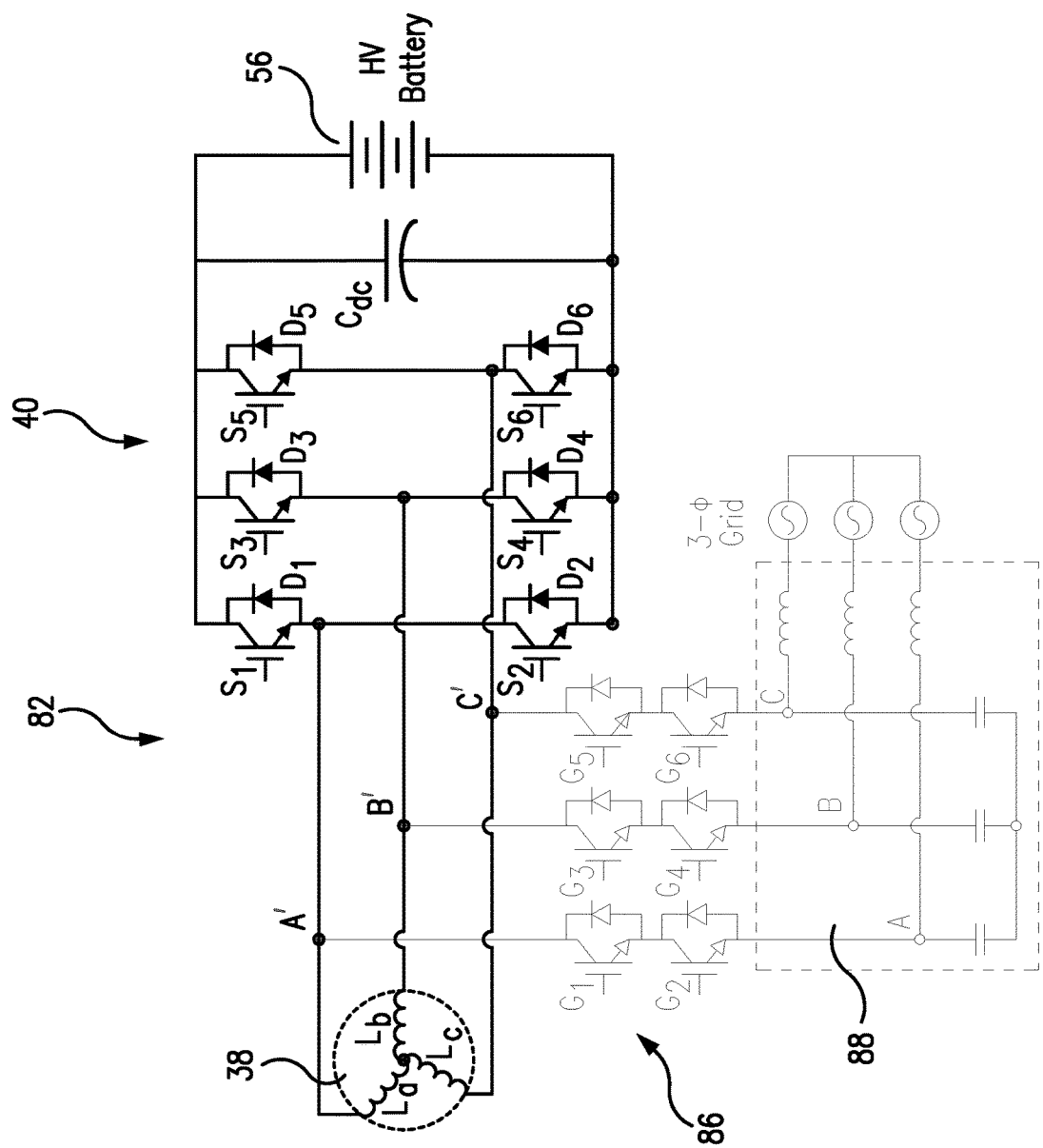
FIGS. 15A-15B are representative of electrical diagrams of the subject onboard charger system reflecting the operation of the front-end buck-boost-type PWM rectifier in the propulsion mode of operation (FIG. 15A), and the battery charging mode of operation (FIG. 15B)
Figure 15B:
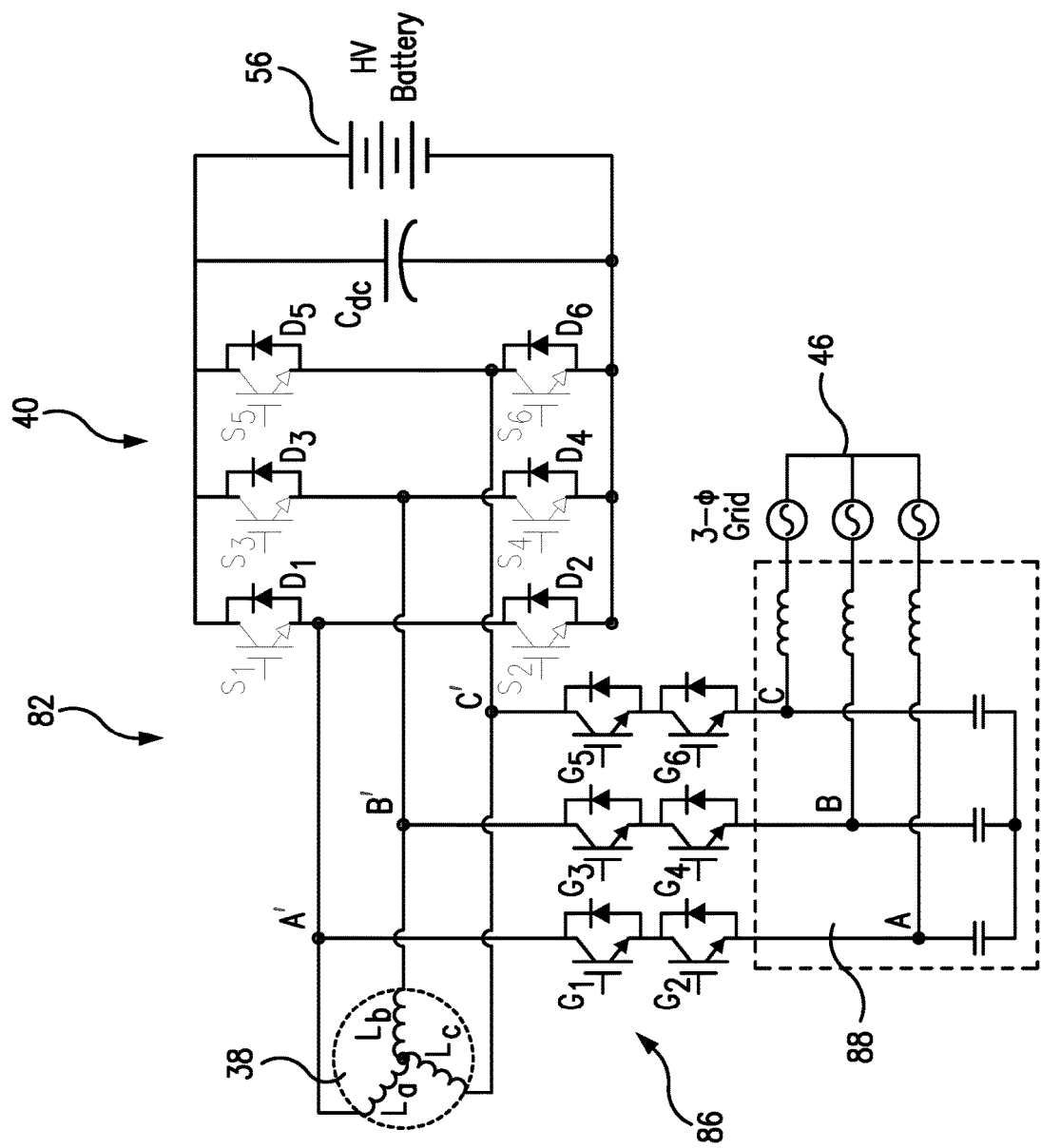

During the propulsion mode of operation, the add-on active bridge ($G_1$~$G_6$) has no influence on the inverter 40 operation, as shown in FIG. 15A. In the battery charging mode operation, as shown in FIG. 15B, all the switches $S_1$-$S_6$ of the three-phase inverter legs 60, 62, 64 are disabled, and only their freewheeling diodes ($D_1$~$D_6$) are used. Therefore, the active bridge 86 ($G_1$~$G_6$), the Propulsion machine 38 windings ($L_a$, $L_b$ and $L_c$) and the Inverter freewheeling diodes ($D_1$~$D_6$) create a three-phase buck-boost AC-DC converter, which can provide direct AC-DC conversion and PFC. The AC machine windings $L_a$, $L_b$, $L_c$ perform as three ac-inductors for energy storage. The three-phase grid continuous currents flow through the machine windings. The three-phase EMI filter (LC filter) 88 is used to ensure low THD.

Operation of Buck-Boost-Type PWM Rectifier

Figure 16:
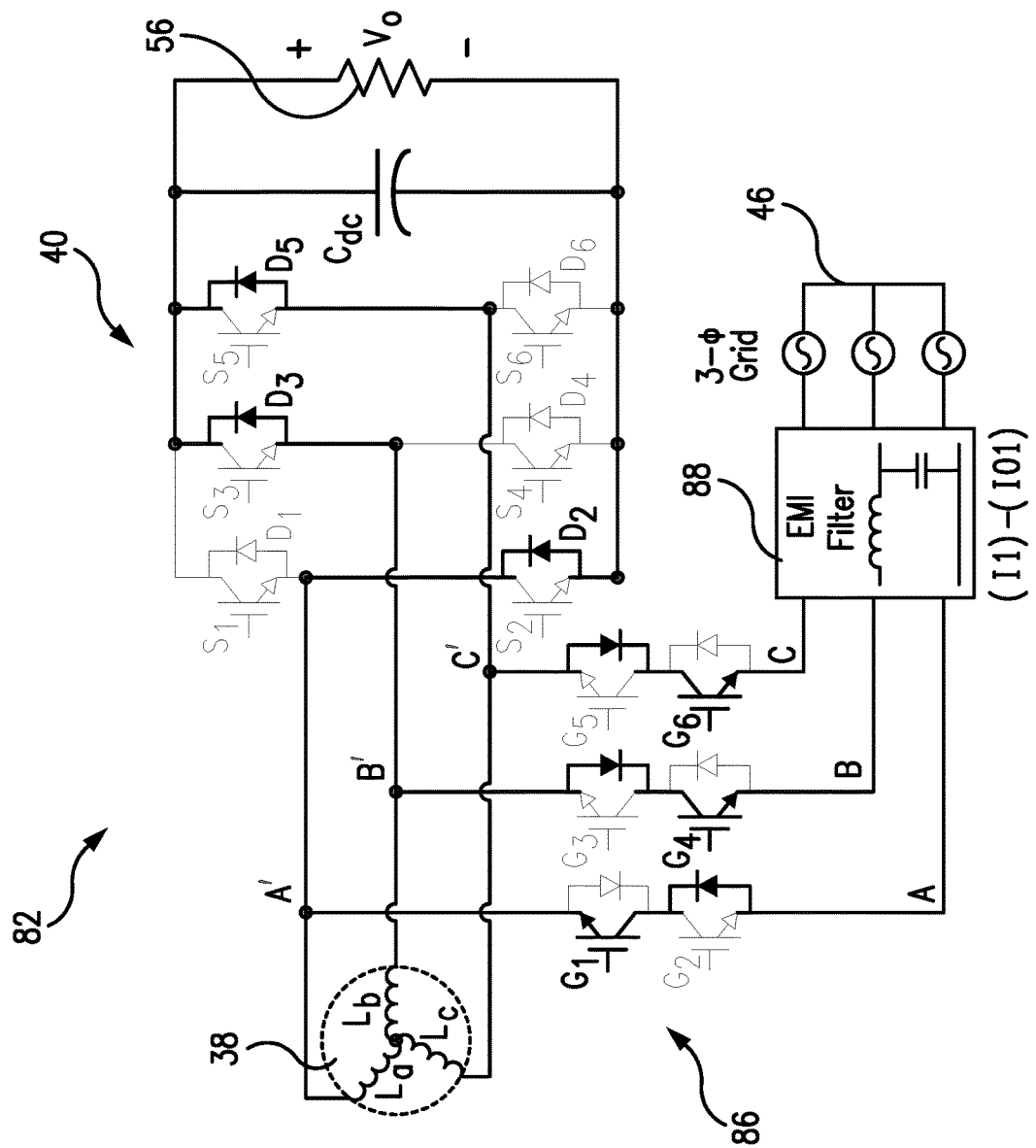
FIG. 16 is representative of electrical diagrams reflecting switching sub-modes of the buck-boost-type PWM rectifier corresponding to the active and the zero switching sub-modes during the battery charging mode of operation.
Figure 16:
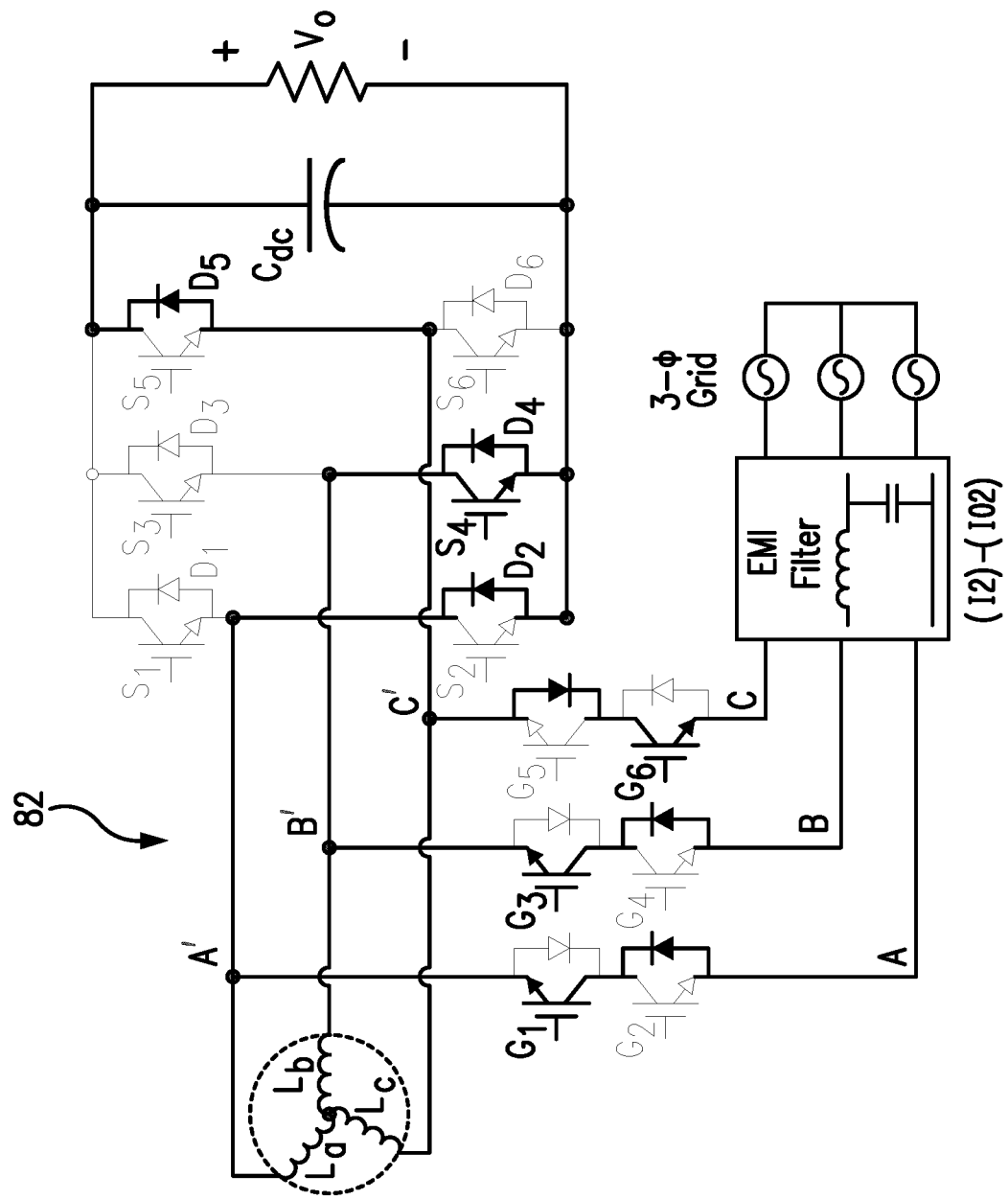
Figure 16:
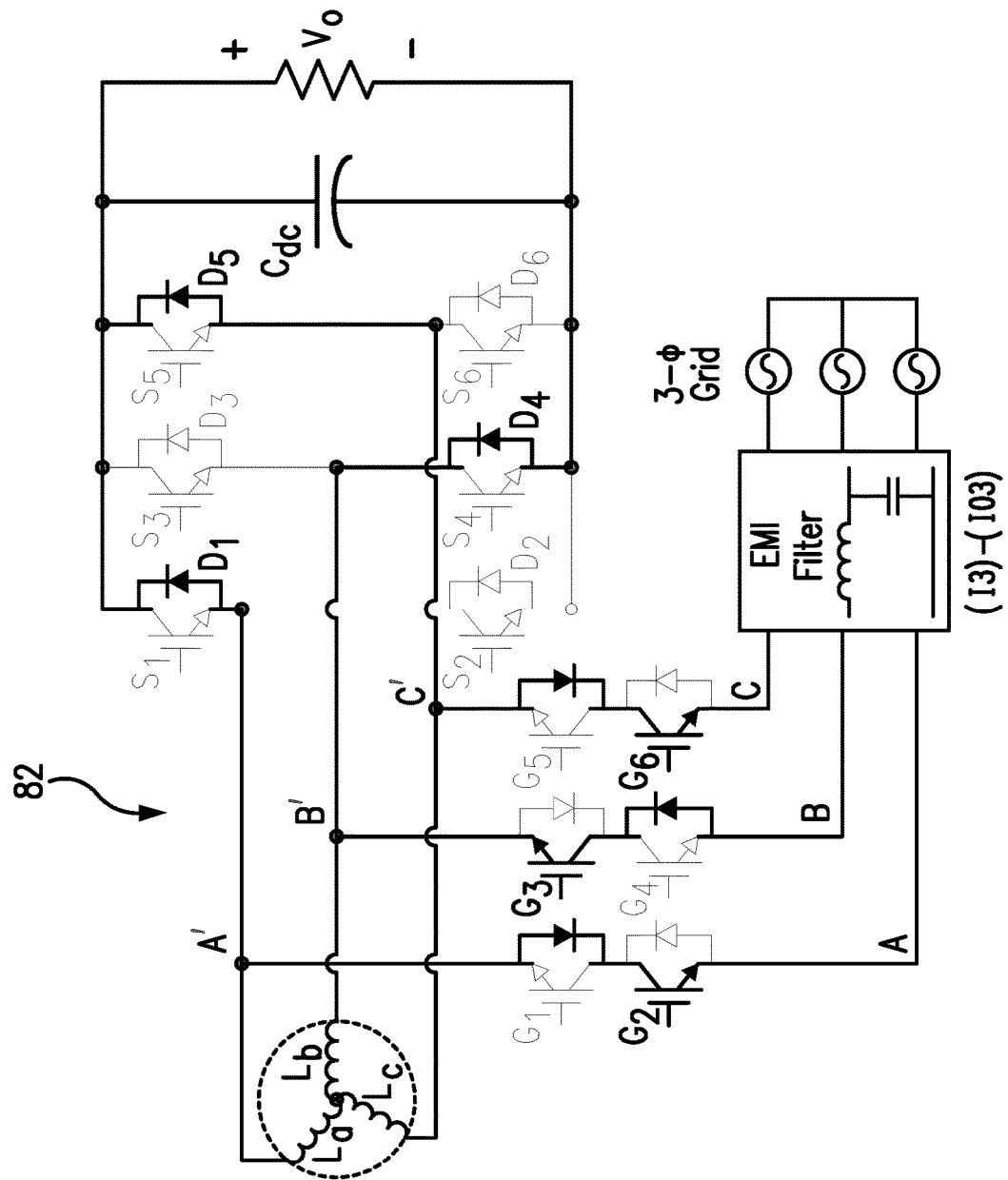
Figure 16:
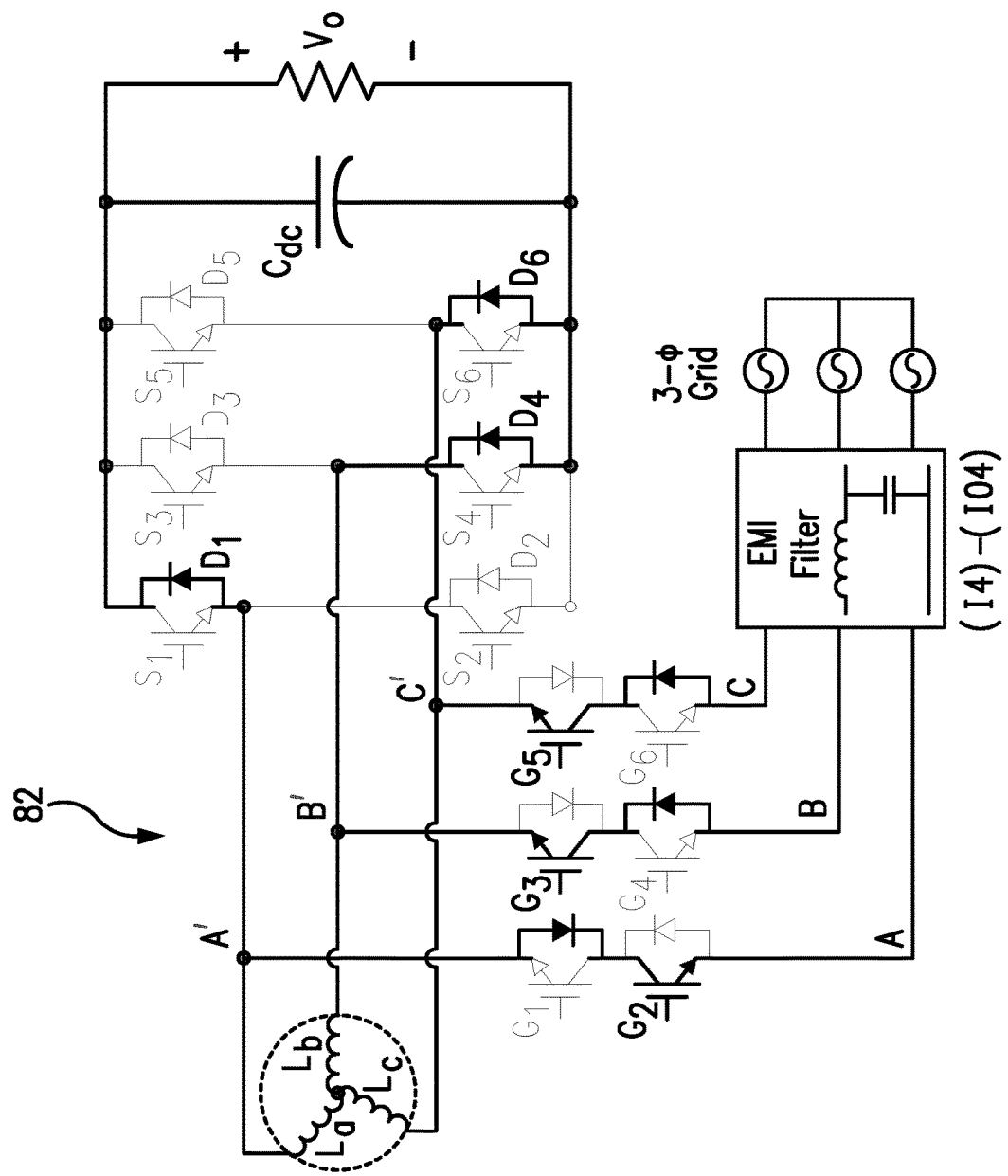
Figure 16:
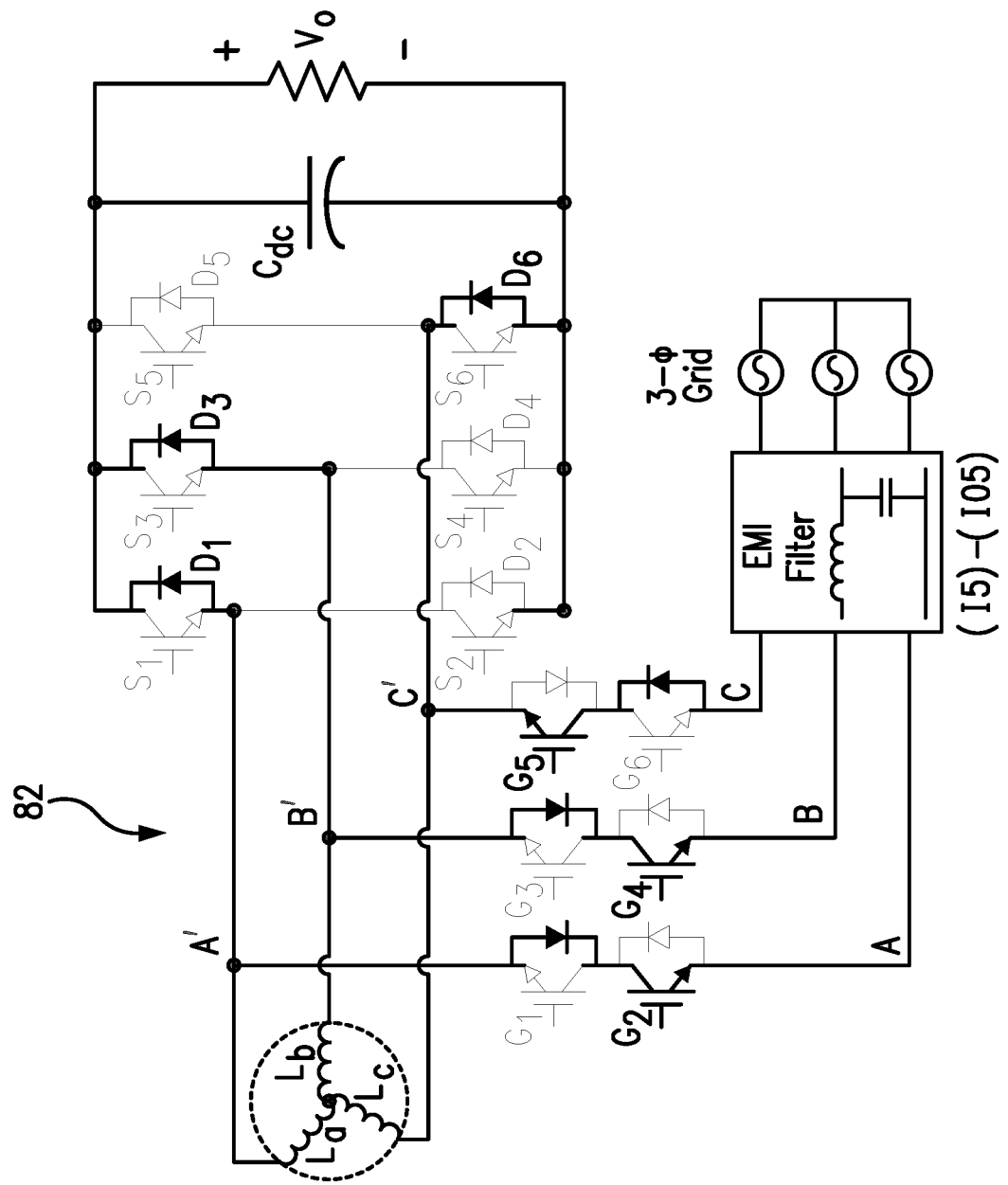
Figure 16:
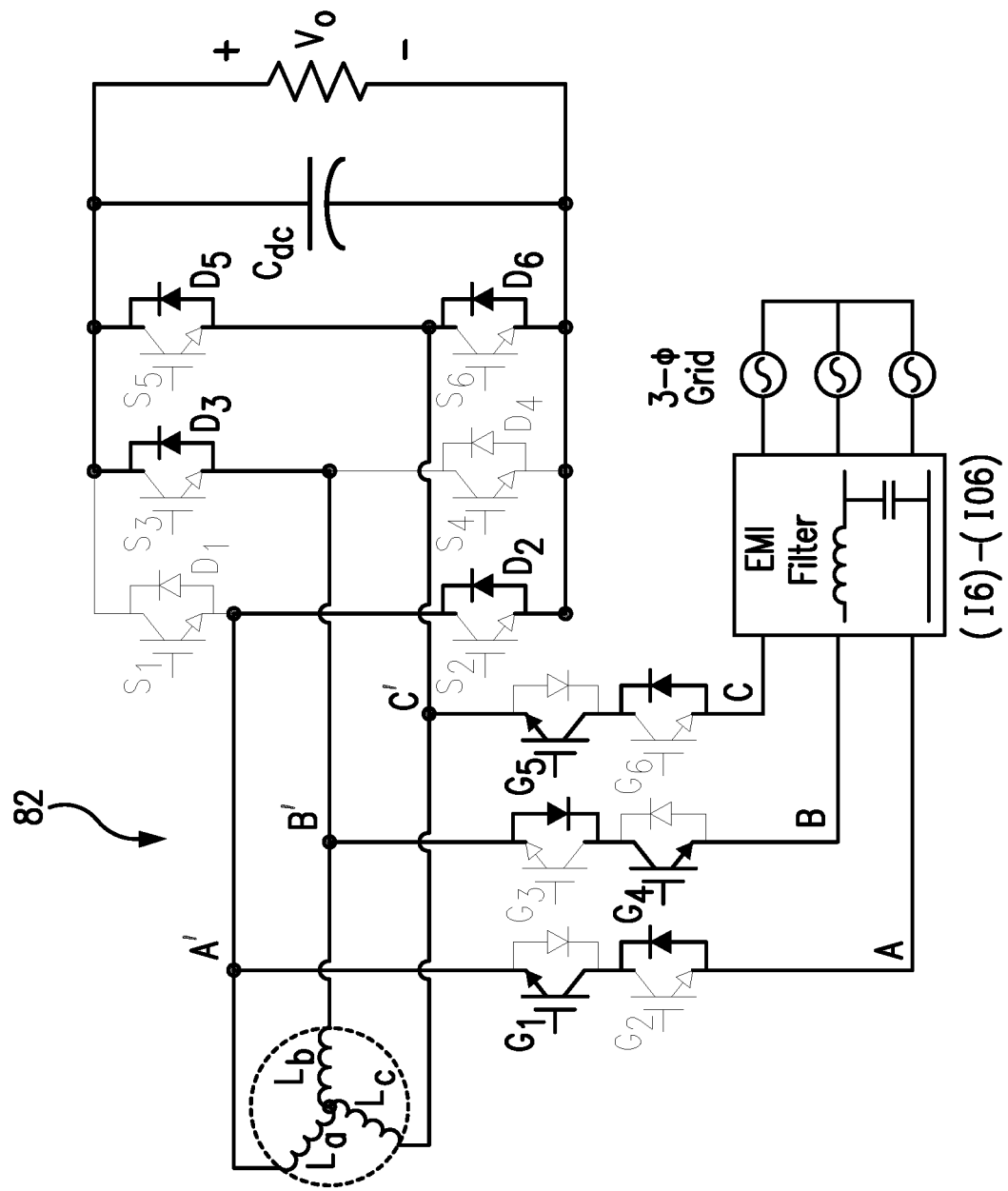

Unlike the buck-type rectifier 84 of the onboard charger 80, the switches of the buck-boost-type rectifier 86, i.e. $G_1$~$G_6$, are controlled by the controller with six active switching modes (I1-I6) and six corresponding zero switching modes (I01~I06), shown in FIG. 16. Each bridge leg 90,

92, 94 of the PWM rectifier 86 is controlled with complementary operation, where "1" stands for odd-numbered switches ($G_1$, $G_3$, $G_5$) turn-on, and "0" stands for even-numbered switches ($G_2$, $G_4$, $G_6$) turn-on.

Figure 17A:
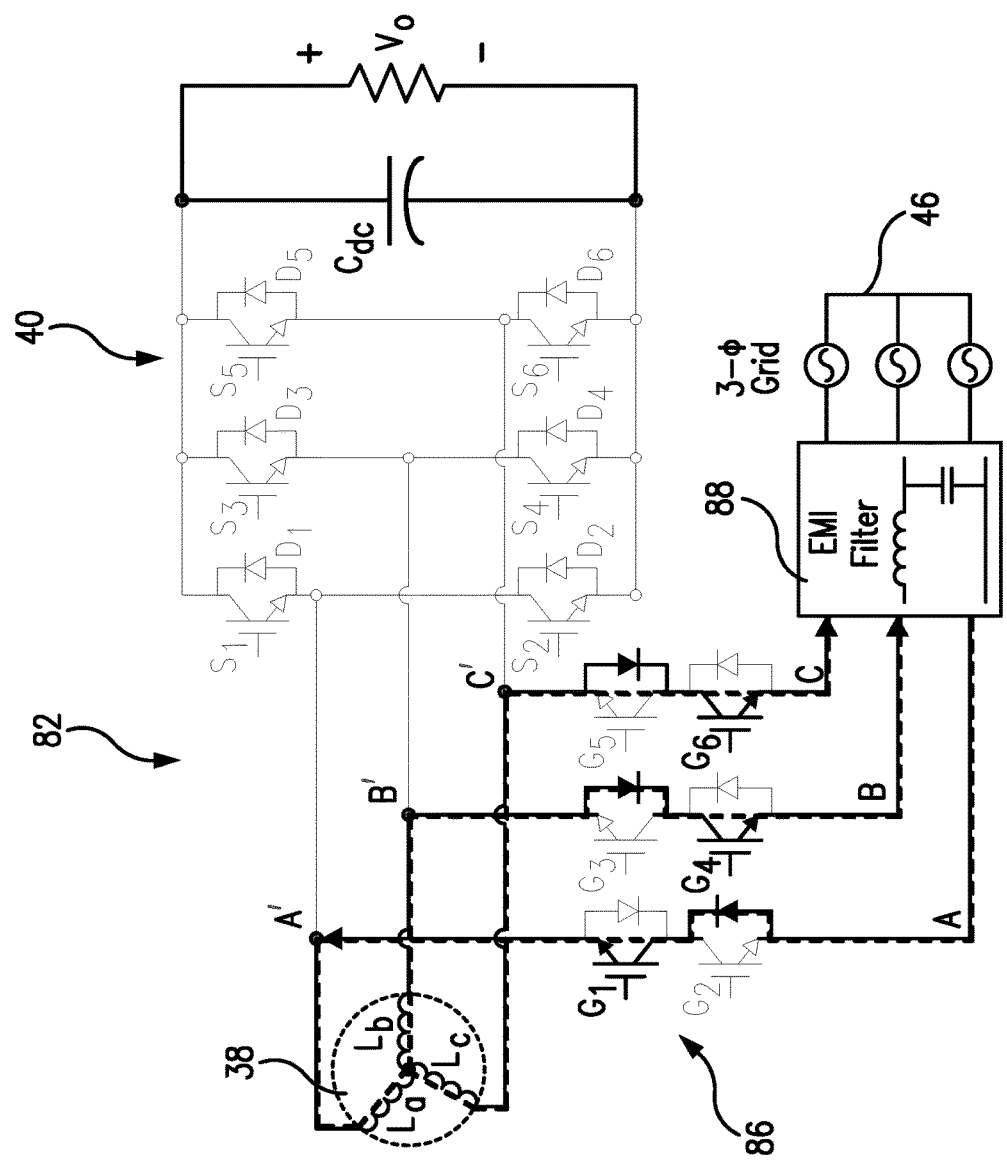
FIGS. 17A-17B are representative of electric diagrams reflecting two switching modes of operation with a winding charging in the active switching sub-mode I1 (FIG. 17A), and the winding discharging in a corresponding zero switching sub-mode I01 (FIG. 17B)
Figure 17B:
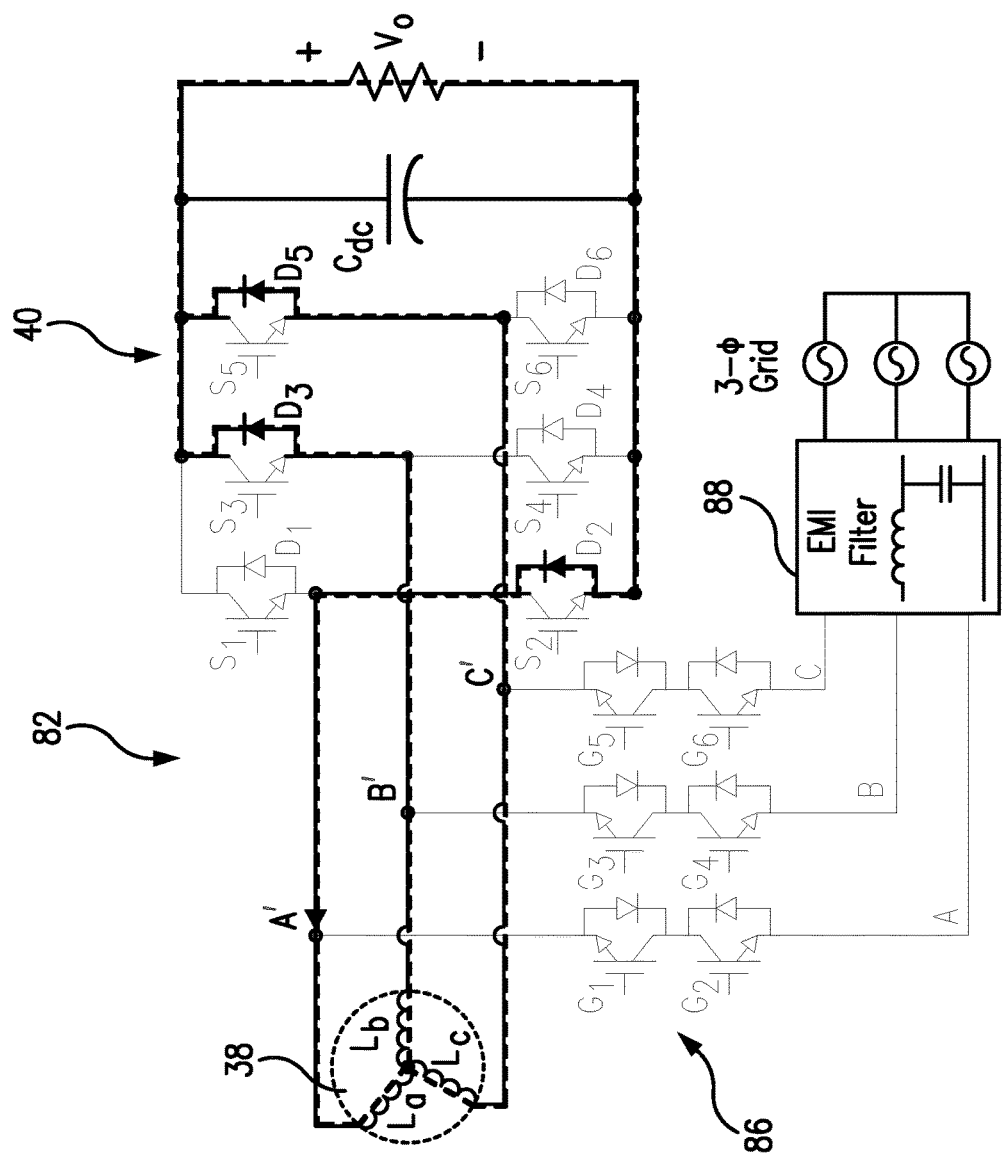

For each switching sub-mode, three out of six switches $G_1$-$G_6$ are turned ON at a time. In each switching sub-mode, the charger operates with an active switching mode in partial period, followed by a zero switching mode operation. One of the two back-to-back switches is turned ON (for example, $G_1$ is turned ON), when the converter operates with one active switching sub-mode. The switch current flows through the diode of another switch (in this case, diode of the switch $G_2$ conduct) at the same time, thus creating a unidirectional rectifier leg. In the same sub-mode, each active switching mode is followed by a corresponding zero switching mode, where all switches $G_1$-$G_6$ are turned OFF and three out of six inverter diodes conduct. FIG. 16 illustrates the switching sub-modes representing the active switching modes (when a corresponding winding is charged) and the corresponding zero switching modes (when the corresponding winding is discharged). The freewheeling diodes $D_1$-$D_6$ of the Inverter 40 do not conduct unless the rectifier 86 operates with zero switching modes. In each switching sub-mode operation with active switching sub-mode (for instance, I2 shown in FIG. 17A), the grid 46 charges the AC Propulsion machine's windings through the three-phase unidirectional legs (in this case $G_1$, $G_4$, $G_6$ are turned ON). This is followed by a zero switching mode, as shown in FIG. 17B, where all switches $G_1$-$G_6$ are turned OFF, and the windings are discharged through the corresponding Inverter diodes (in the case I01, where the zero sub-mode diodes $D_2$, $D_3$, $D_5$ conduct).

Alternative Three-Phase and Single-Phase Integrated Charger Topologies

Although the analyses have been presented in previous paragraphs for a buck-type three-phase charger 80 without a dc-dc converter between the battery 56 and the propulsion machine inverter 40, it is contemplated that the subject system is equipped with a bidirectional DC-DC converter to increase battery voltage and provide maximum operation efficiency for the inverter/propulsion machine during propulsion.

Different configurations of electric vehicle power supplies dictate that at least one DC/DC converter is necessary to interface with the battery and the DC link. The DC/DC converter has to be reliable and lightweight, small in volume, operate with high efficiency and low EMI (electromagnetic interference) and a low current/voltage ripple.

A DC/DC converter is a power converter having an electric circuit which converts a source of direct current DC from one voltage level to another, by storing the input energy temporarily and subsequently releasing the energy to the output at a different voltage level.

The amount of power flow between the input and the output of the DC/DC converter can be controlled by adjusting the duty cycle which is identified as a ratio of on/off time of a switch in the DC/DC converter. Usually, this is performed to control the output voltage, the input current, the output current, or to maintain a constant power.

The most common DC/DC converters can be grouped in several categories: Non-isolated converters which are generally used where the voltage must be stepped up or down by relatively small ratio (less than 4:1). There are a number of types of converters in the non-isolated group, usually called the buck, boost, buck-boost, CUK, and charge-pump converters. The buck converters are used for voltage step-down, while the boost converters are used for voltage step-up. The buck-boost and CUK converters can be used for the user step down or step up. The charge-pump converters are used for either voltage step-up or voltage inversion, but only in relatively low power applications.

Another category of DC/DC converters includes isolated converters in which a high frequency transformer is used. These converters are useful in applications where the output must be completely isolated from the input. All of these converters can be used as bi-direction converters with a high ratio of stepping down or stepping up the voltage. Transformer-based converters may provide isolation, between the input and the output.

A basic interleaved multi-channel DC/DC converter topology permits reduction of the input and output current and voltage ripples, as well as reduction of the voltage and weight of the inductors, with a result of increase in efficiency. This structure, however, cannot operate efficiently when a high voltage step-up ratio is required, since the duty cycle is limited by the circuit impedance leading to a maximum step-up ratio of approximately 4. Hence, two series connected step-up converter would be required to achieve the specific voltage gain of the application specification.

A full-bridge DC/DC converter is the most frequently implemented circuit configuration for fuel cell power conditioning when electrical insulation is required. The full-bridge DC/DC converter is suitable for high-power transmission because switch voltage and current are high. This has small input and output current of voltage ripples. The full-bridge topology is a prime candidate for zero voltage switching (ZVS) pulse switch modulation (PSM) techniques.

The analyses presented in previous paragraphs are valid for the case, where the DC-DC converter is included in the system. In fact, the use of DC-DC converter provides additional flexibility in the control of the overall system.

Figure 18:
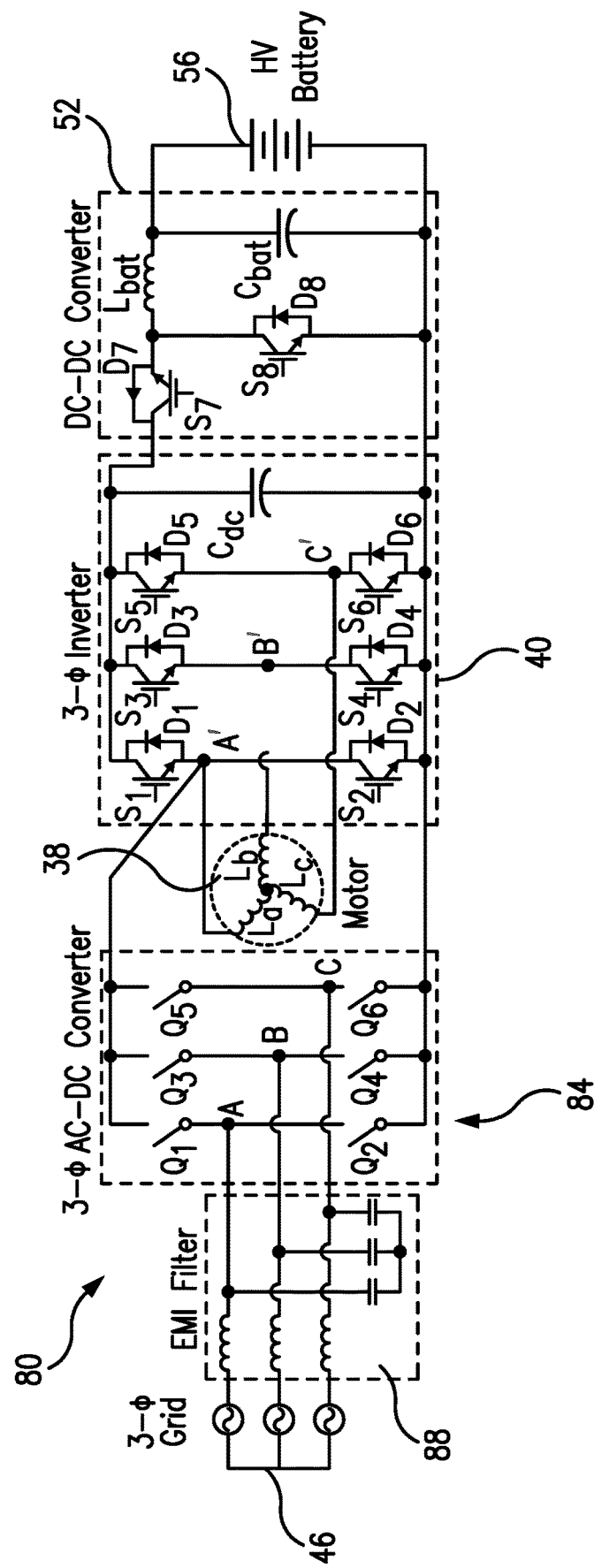
FIG. 18 is the electrical diagram of the subject onboard integrated three-phase buck-boost-type charger with a bi-directional DC/DC converter coupled between the battery pack and the Propulsion Inverter.

FIG. 18 shows the proposed onboard and integrated three-phase buck-type charger 80, using a bidirectional DC-DC converter 52 coupled between the battery pack 56 and the Propulsion machine Inverter 40. Similar to the switches shown in FIGS. 10A-10B, the switches $Q_1$~$Q_6$ are either unidirectional switches or other combinations of switches that lead to unidirectional operation.

Figure 19:
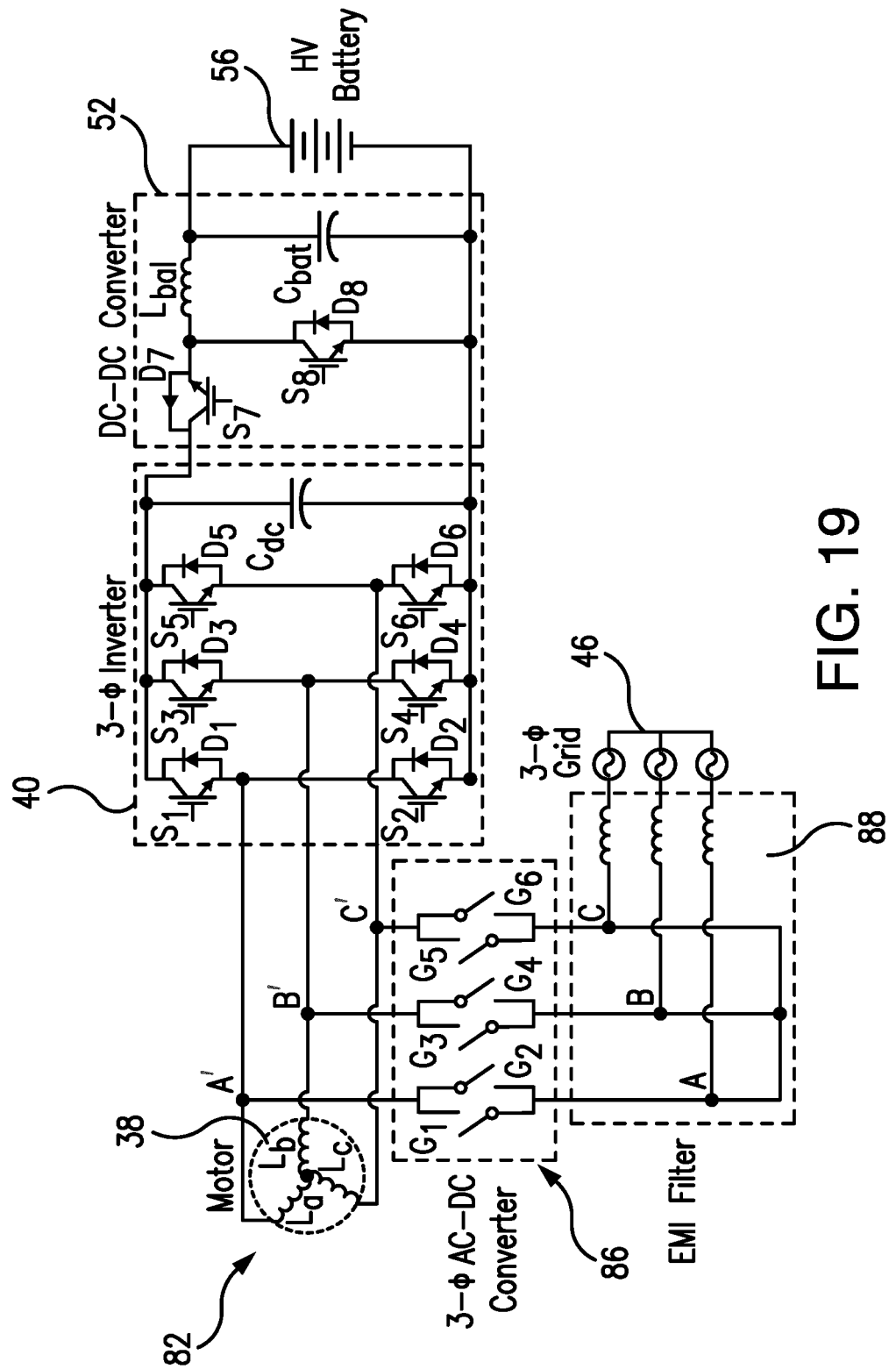
FIG. 19 is the electrical diagram of the alternative design of the subject onboard integrated three-phase buck-boost-type charger with a bi-directional DC/DC converter coupled between the battery pack and the Propulsion Inverter.

FIG. 19 shows the onboard integrated three-phase buck-boost-type charger 82 using the bidirectional DC-DC converter 52 between the battery pack 56 and the Propulsion machine Inverter 40. The switches $G_1$~$G_6$, in FIG. 19, are either bidirectional switches or any combination of switches that lead to bidirectional operation, similar to the switches in FIG. 11A-11B.

Figure 20A:
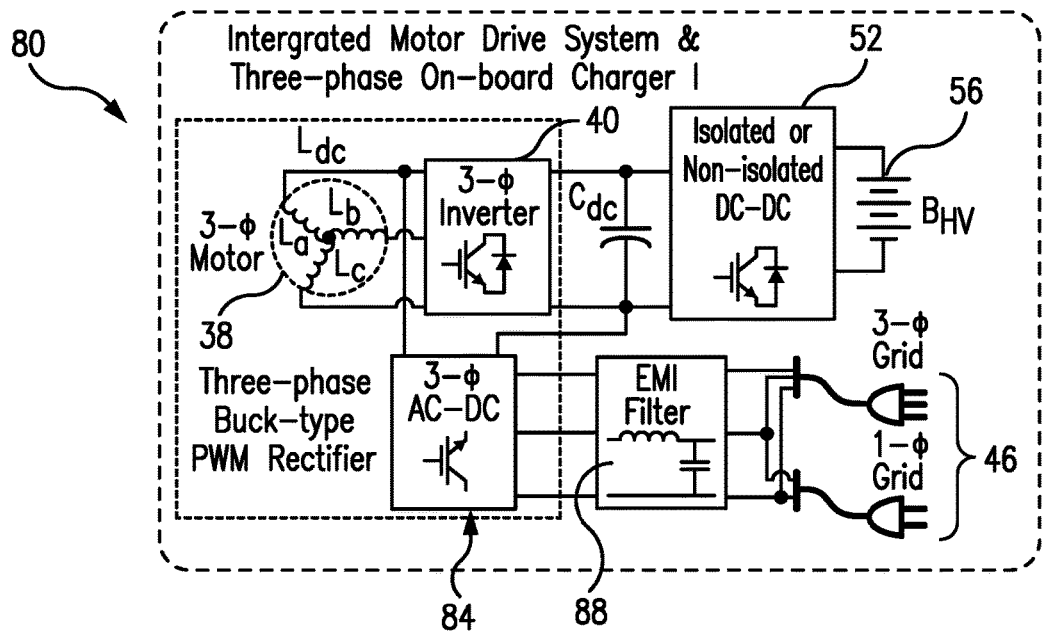
FIGS. 20A-20B are representative of the schematics of the three-phase onboard charger compatible with the single-phase chargers, where
Figure 20B:
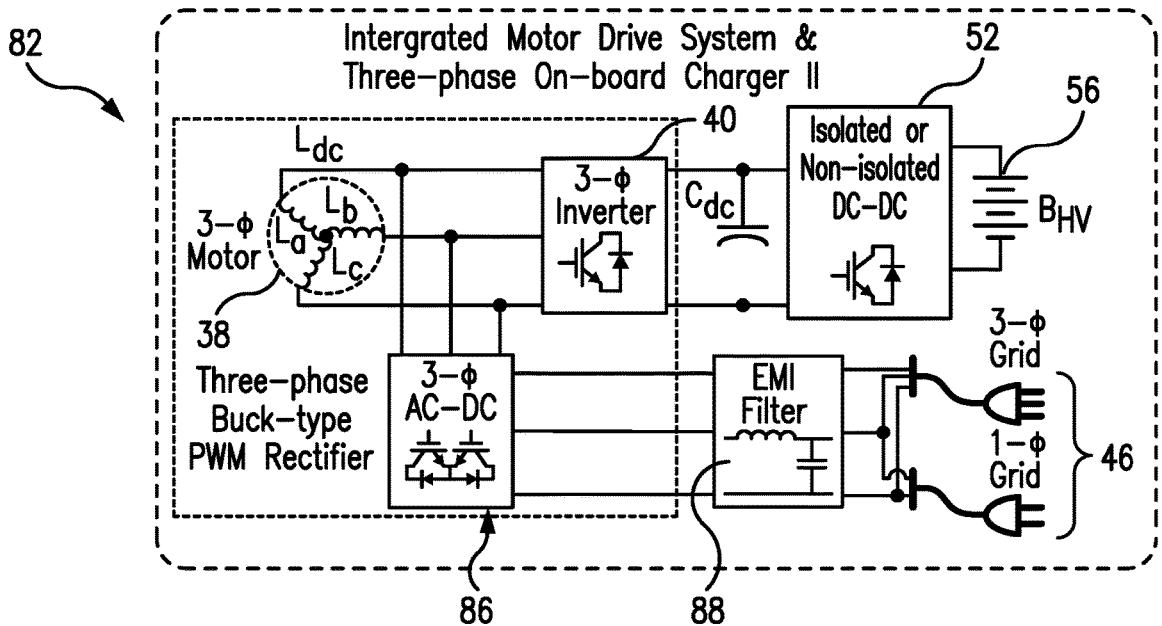

The subject three-phase chargers 80, 82 are compatible with single-phase chargers 32. FIGS. 20A-20B demonstrate the overall schematics of these chargers for buck-type 80 (FIG. 20A) and buck-boost-type 82 (FIG. 20B) integrated chargers.

Figure 21A:
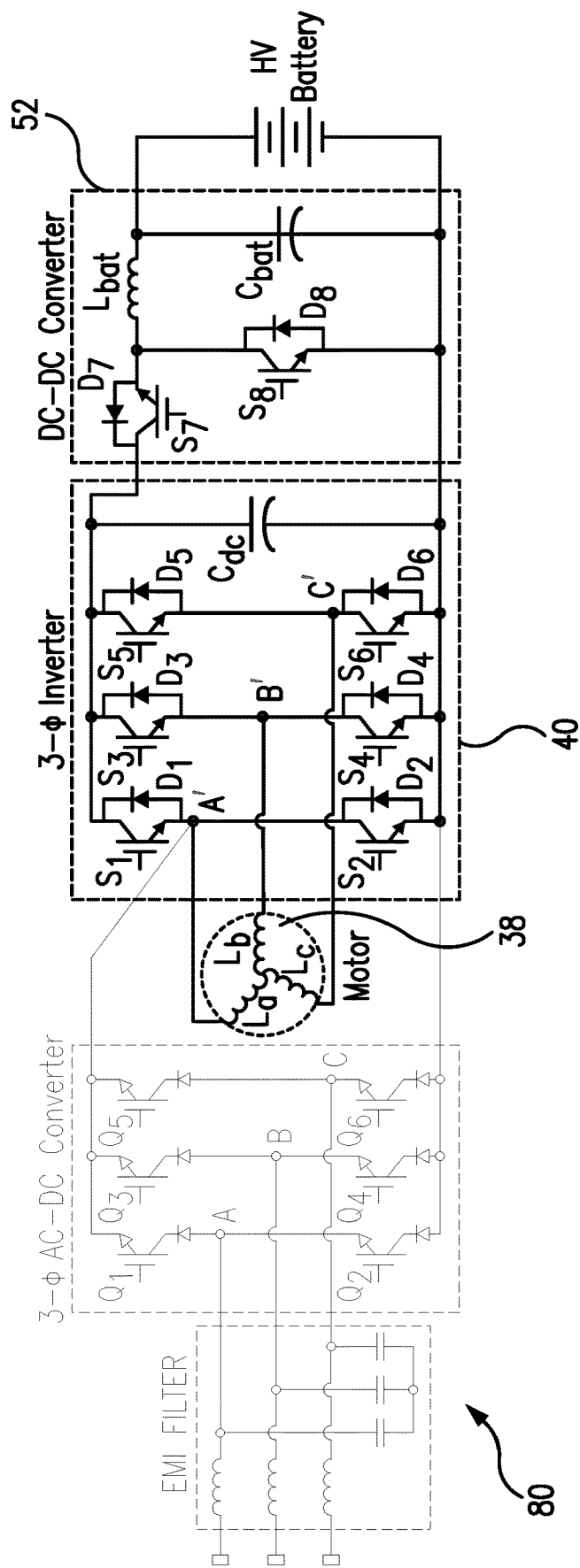
FIGS. 21A-21C are electrical diagrams of the subject integrated onboard buck-type converter (charger) operating during the PEV propulsion (as shown in FIG. 21A), with FIG. 21B showing the subject buck-type converter operating during three-phase charging, and FIG. 21C showing the subject buck-type converter operating during single-phase charging.
Figure 21B:
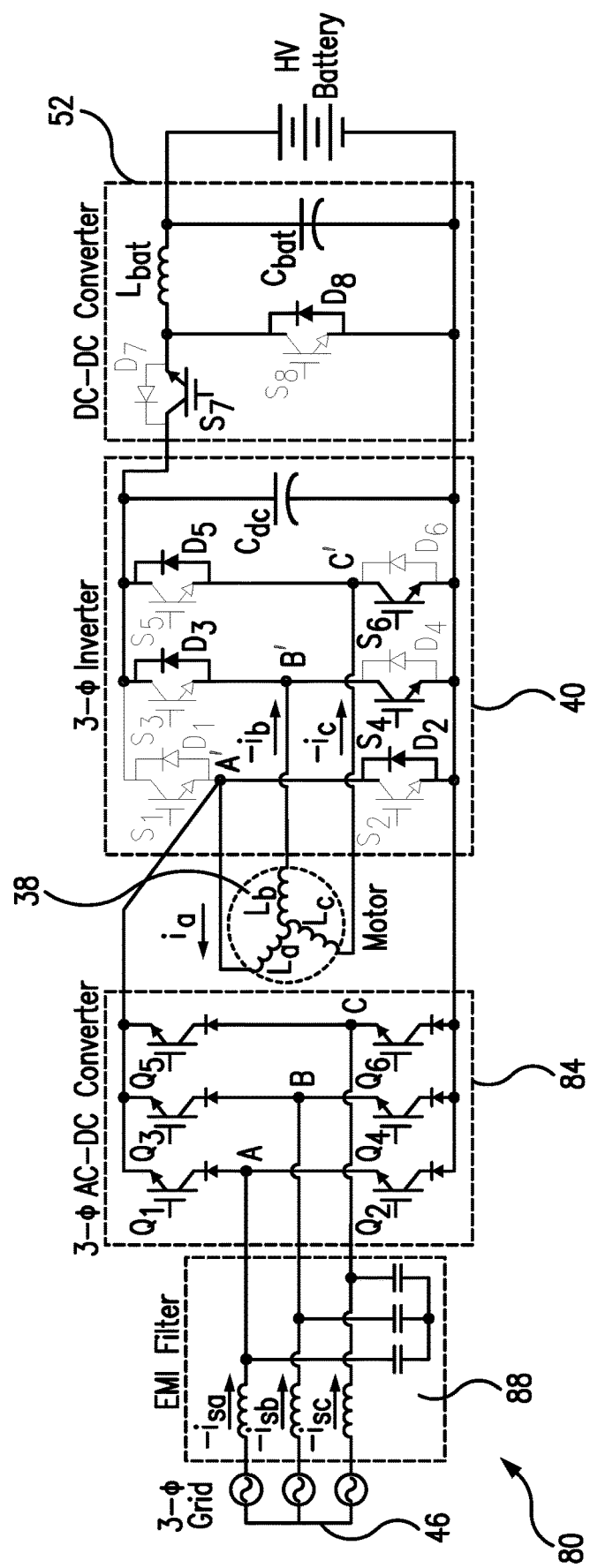
Figure 21C:
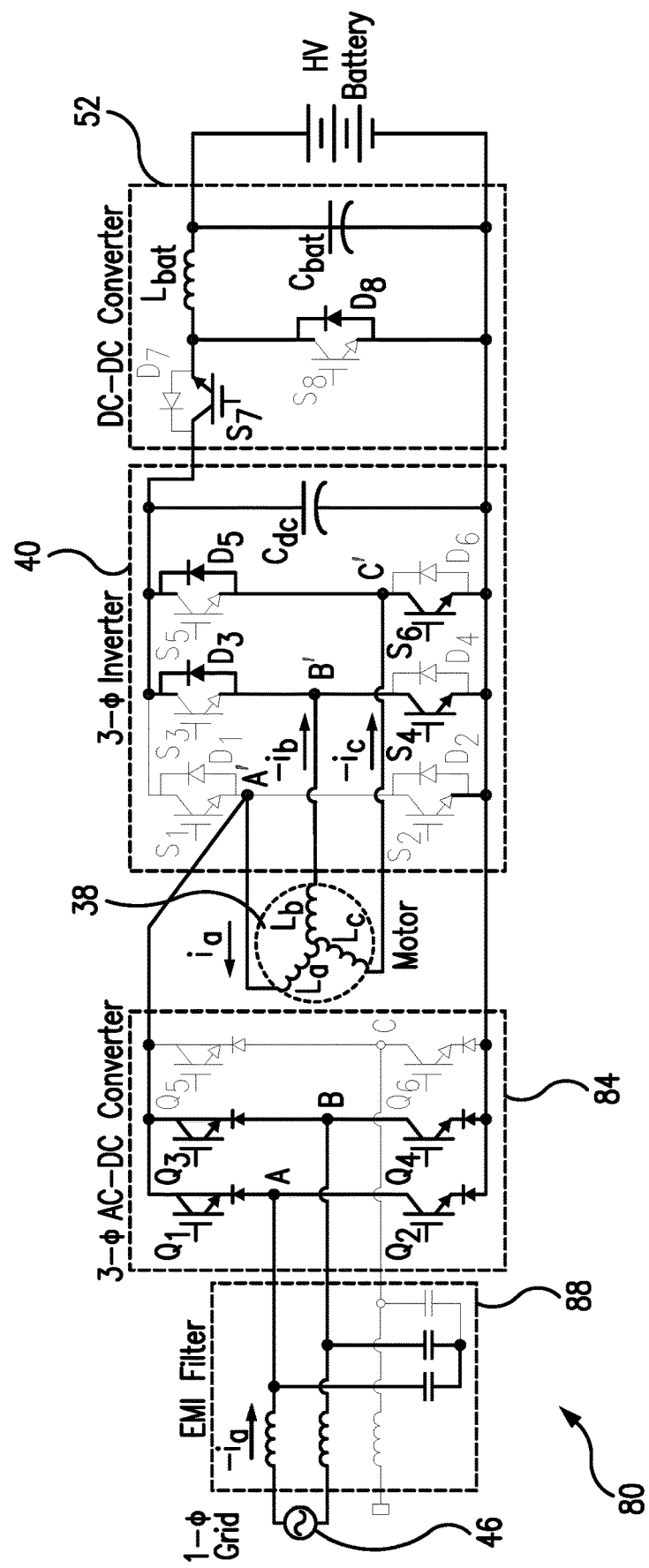

FIGS. 21A-21C show the circuit-level schematics of the subject integrated buck-type onboard charger system operation during PEV propulsion (FIG. 21A), during three-phase charging (FIG. 21B), and during single-phase charging (FIG. 21C).

Figure 22A:
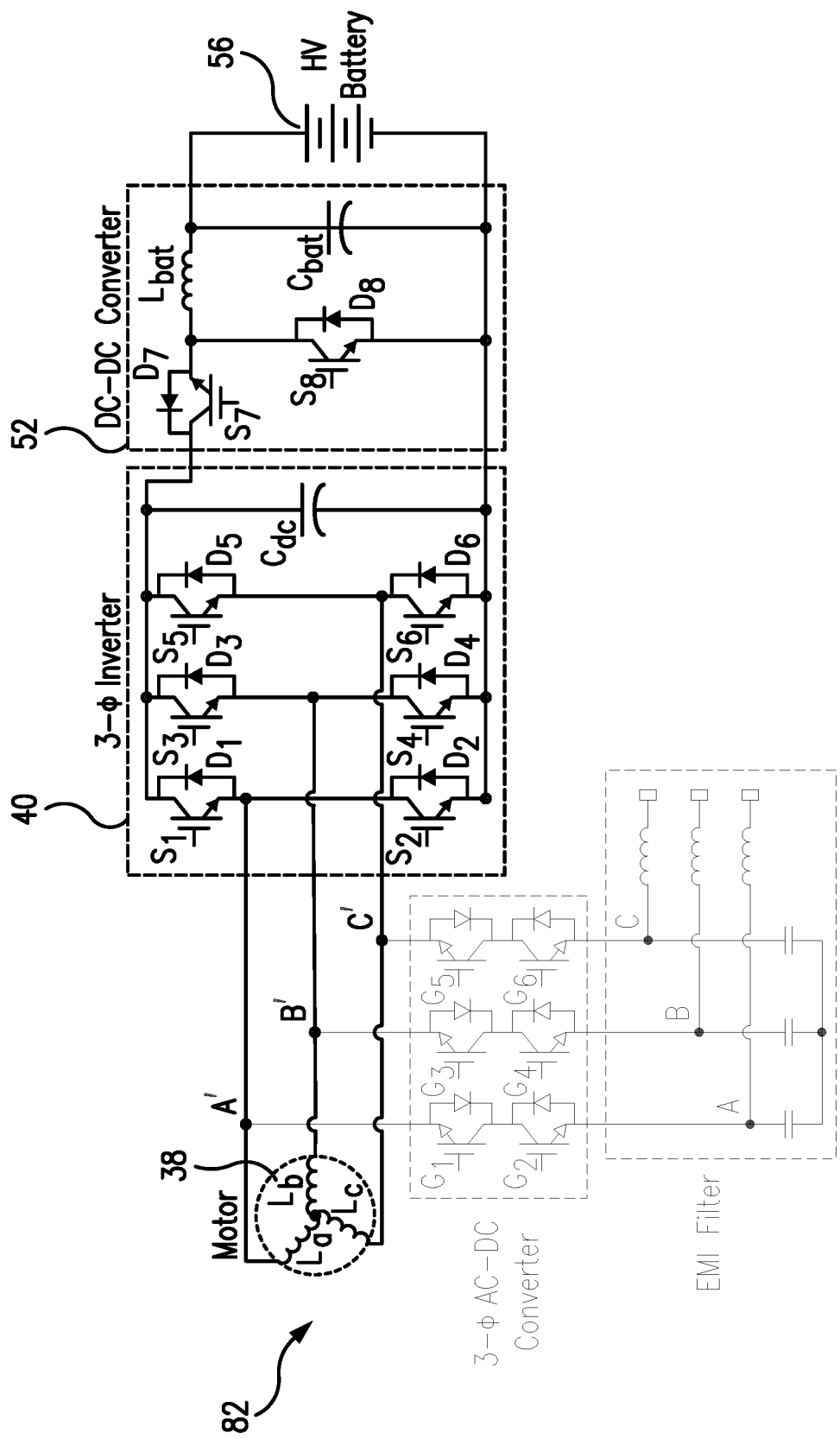
FIGS. 22A-22C are electrical diagrams of the subject integrated buck-boost type onboard charger system (converter) during the PEV propulsion (FIG. 22A), during three-phase battery charging (FIG. 22B), and during single-phase charging (FIG. 22C)
Figure 22B:
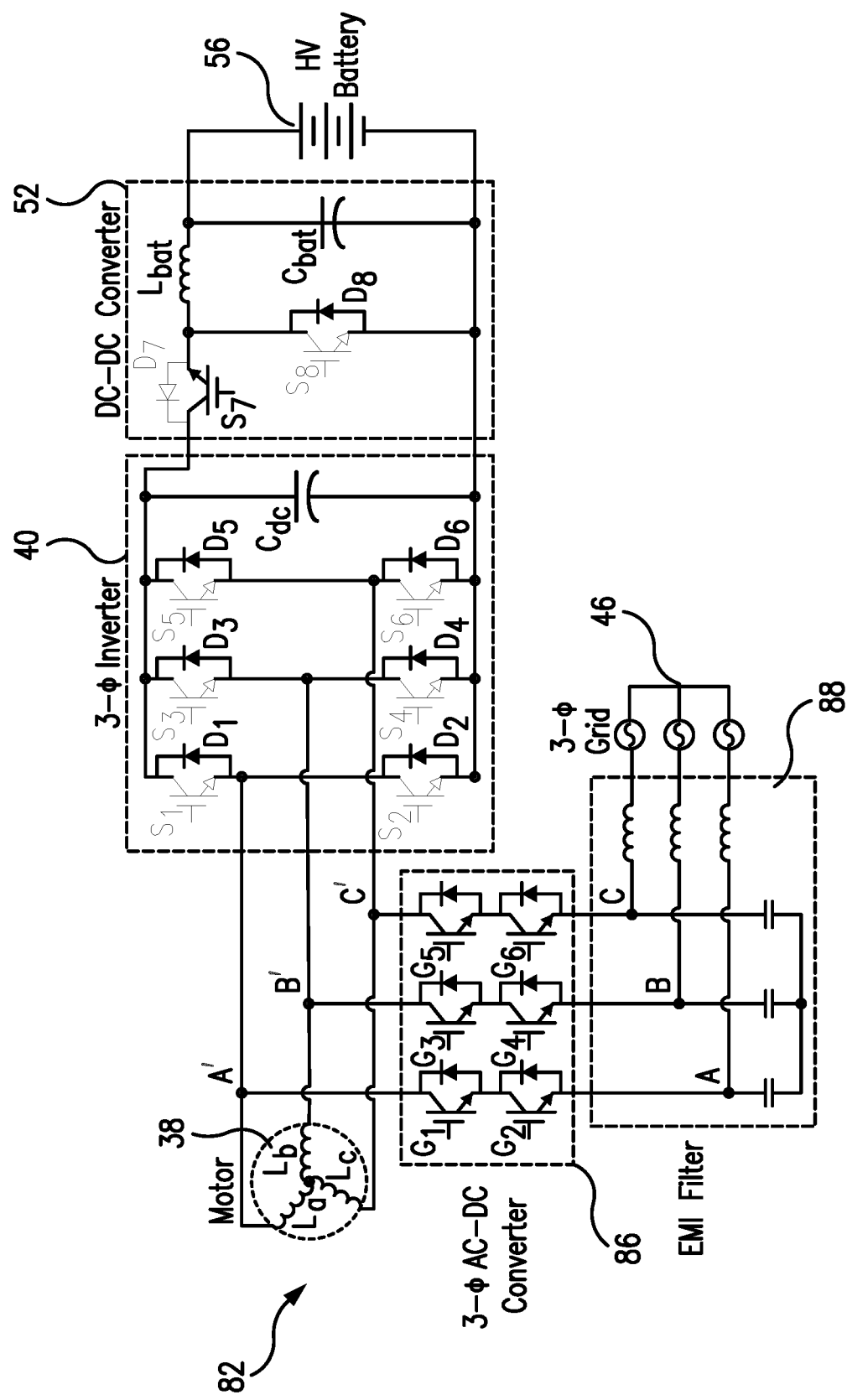
Figure 22C:
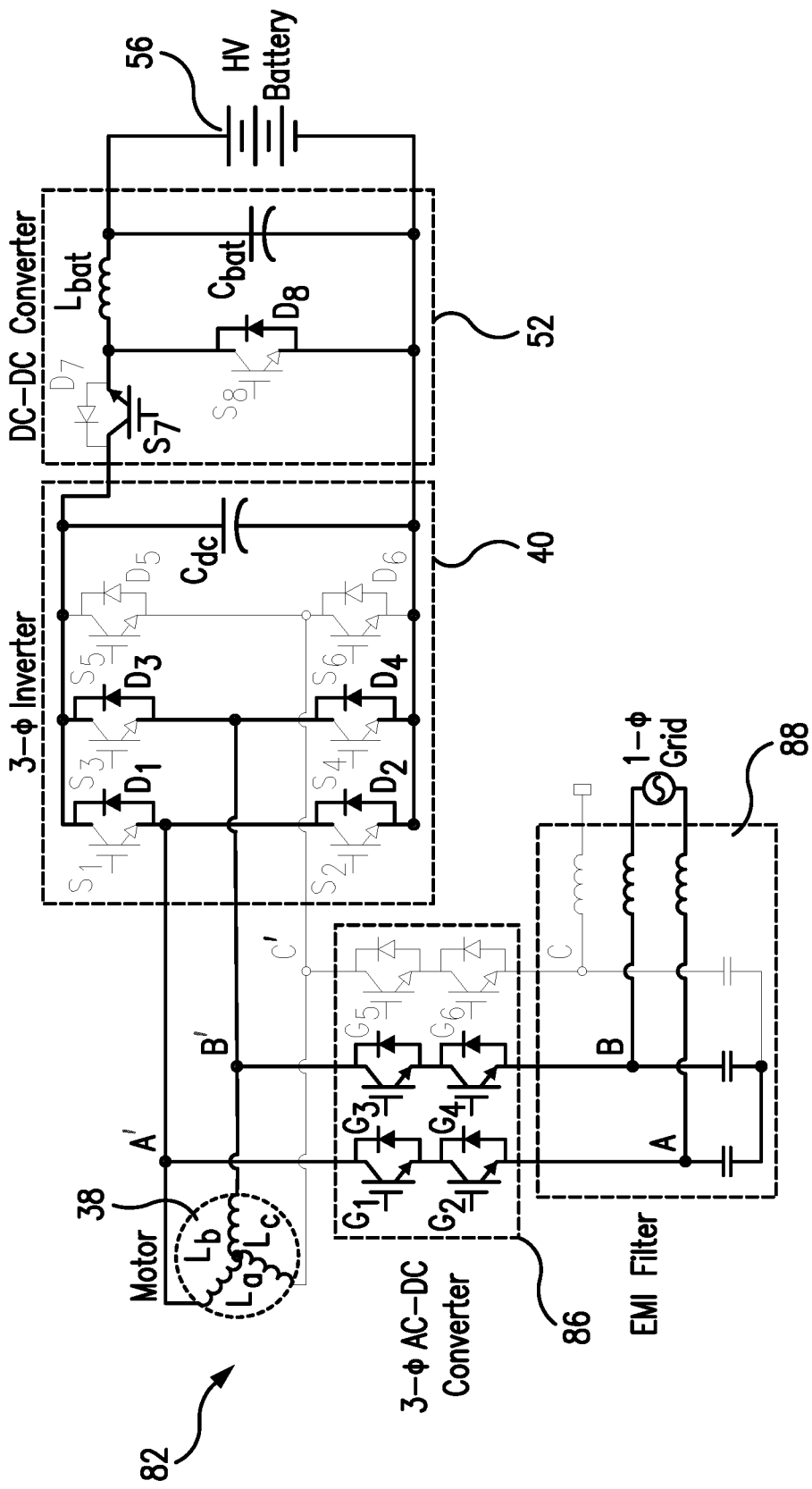

FIGS. 22A-22C show the circuit-level schematics of the proposed integrated buck-boost-type onboard charger 82 for operation during PEV propulsion (FIG. 22A), during three-phase battery charging (FIG. 22B), and during single-phase battery charging (FIG. 22C).

In addition, it should be noted that even though the figures and the circuit diagrams in the present Application demonstrate the chargers with non-isolated DC-DC converters, bidirectional DC-DC converters can be isolated as well, and the suggested innovations are applicable to isolated cases as well. Furthermore, the principles underlying the subject system and method include cases when the electric vehicle is equipped with a non-isolated DC-DC converter for propulsion and an isolated DC-DC converter for charging, or other alternative functions. In such cases, the proposed onboard chargers and charging schemes are applicable to both isolated and non-isolated cases.

Figure 23:
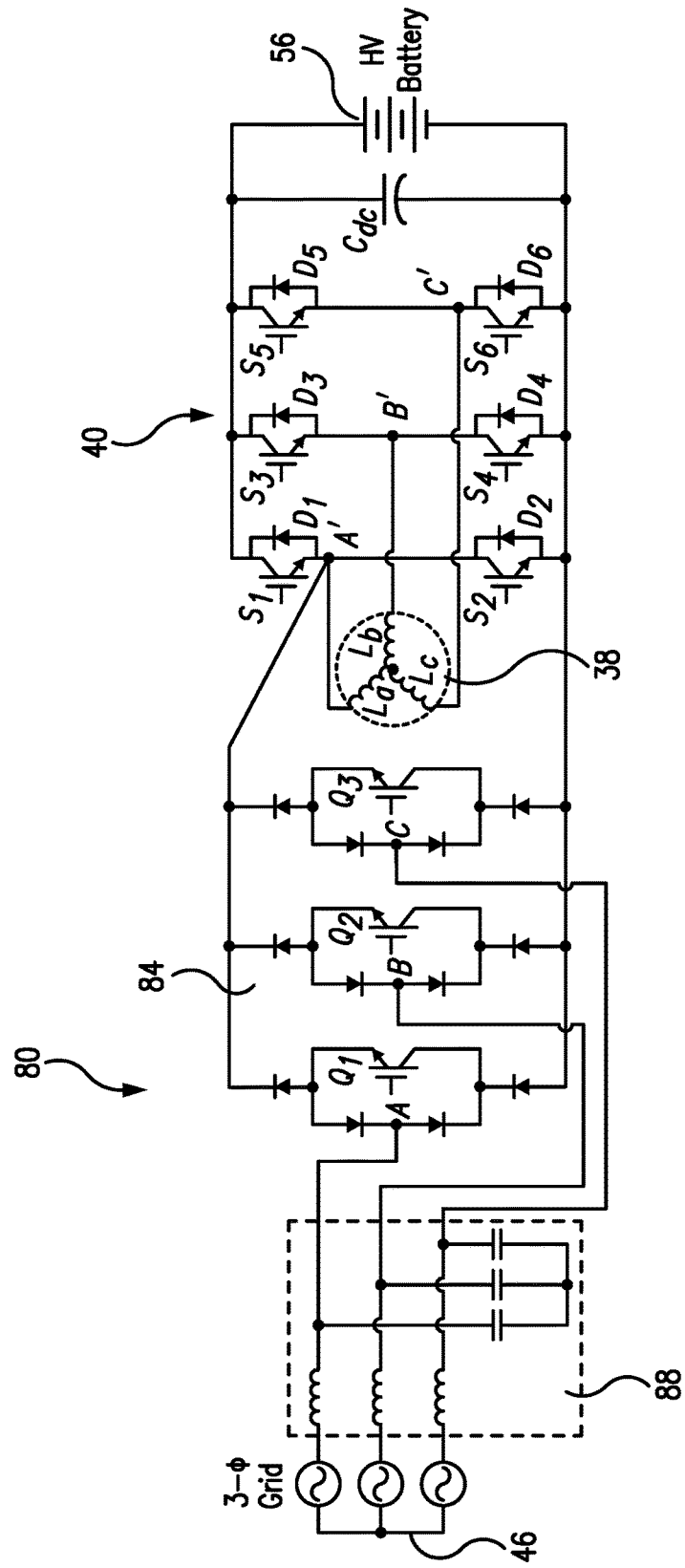
FIG. 23 is an electrical diagram of the alternative design of the subject integrated onboard charger.

FIG. 23 shows an alternative subject integrated onboard converter (charger) topology.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. An onboard charger system for a battery in Plug-in Electric Vehicles (PEVs), wherein said onboard charger is operatively coupled to an AC 1-phase grid, comprising:
   an onboard charger integrated with at least one Propulsion machine-Inverter Group built with a 3-phase Alternative Current (AC) Propulsion Machine having three phase-terminals and a Propulsion Inverter coupled to an input of said 3-phase AC Propulsion machine, said onboard charger being operatively coupled between a grid supplying AC voltage and a battery to charge said battery at a rated power of said 3-phase AC Propulsion machine,
   a controller supplying control signals to said Propulsion Machine-Inverter Group in a predetermined order depending on a required mode of operation of the PEV to attain efficient charging of said battery, wherein said mode of operation includes a propulsion mode of operation and a battery charging mode of operation, and
   a diode bridge coupled between said 1-phase grid and said at least one Propulsion Machine-Inverter Group, and between at least one of said three phase-terminals of said Propulsion machine and said Propulsion Inverter, wherein said Propulsion Inverter has a DC_link operatively coupled to said battery, wherein said diode bridge is coupled to a negative terminal of said DC_link of said Propulsion Inverter, and wherein said 3-phase AC Propulsion Machine has three windings angularly spaced apart 120° one from another,
   wherein in said battery charging mode of operation, said diode bridge operates to rectify said AC voltage supplied by said 1-phase grid, wherein said 3-phase AC Propulsion Machine's windings and said Propulsion Inverter are pulse-width-modulation (PWM) switched by said controller to operate as a two-channel interleaved boost converter,
   wherein said Propulsion Inverter includes a first leg, a second leg, and a third leg, each leg coupled to a first, second, a third winding of said 3-phase AC Propulsion Machine, respectively, said first leg including switches $S_1$ and $S_2$, and corresponding diodes $D_1$ and $D_2$, each coupled in parallel to a respective one of said switches $S_1$ and $S_2$, respectively, said second leg including switches $S_3$ and $S_4$, and corresponding diodes $D_3$ and $D_4$, each coupled in parallel to a respective one of said switches $S_3$ and $S_4$, respectively, and said third leg including switches $S_5$ and $S_6$, and corresponding diodes $D_5$ and $D_6$, each coupled in parallel to a respective one of said switches $S_5$ and $S_6$, respectively, and wherein said controller operates two of said first, second and third legs in interleaved regime with 180° phase difference in time domain, wherein said one of switches $S_2$, $S_4$, $S_6$ and one of corresponding diodes $D_1$, $D_3$, $D_5$ form a first channel, and wherein said one of switches $S_2$, $S_4$, $S_6$ and one of corresponding diodes $D_1$, $D_3$, $D_5$ form a second channel of said interleaved boost converter, wherein said controller PWM switches said two-channel interleaved boost converter in switching sub-modes I, II, III, IV, wherein, when a duty cycle D of said PWM switching 0<D<0.5, said controller switches said two-channel interleaved boost controller in a periodical switching sequence I-III-II-III-I of the switching sub-modes, wherein, when 0.5<D<1, said controller switches said two-channel interleaved boost controller in a periodical switching sequence IV-I-IV-II-IV of said switching sub-modes, wherein in said switching sub-mode I, said controller turns ON said switch $S_4$, and turns OFF said switch $S_6$, and said diode $D_5$ is in conducting state, wherein in said switching sub-mode II, said controller switches ON said switch $S_6$, and turns OFF said switch $S_4$, and said diode $D_3$ is in conducting state, wherein in said switching sub-mode III, said controller turns OFF said switches $S_4$ and $S_6$, and said diodes $D_3$ and $D_5$ are in conducting state, and wherein in said switching sub-mode IV, said controller turns ON said switches $S_4$ and $S_6$, and reverse biases said diodes $D_3$ and $D_4$.

2. An onboard charger system for a battery in Plug-in Electric Vehicles (PEVs), wherein said onboard charger is operatively coupled to an AC 3-phase grid, comprising:

an onboard charger integrated with at least one Propulsion machine-Inverter Group built with a 3-phase Alternative Current (AC) Propulsion Machine having three phase-terminals and a Propulsion Inverter coupled to an input of said 3-phase AC Propulsion machine, said onboard charger being operatively coupled between a grid supplying AC voltage and a battery to charge said battery at a rated power of said 3-phase AC Propulsion machine, a controller supplying control signals to said Propulsion Machine-Inverter Group in a predetermined order depending on a required mode of operation of the PEV to attain efficient charging of said battery, wherein said mode of operation includes a propulsion mode of operation and a battery charging mode of operation, a unidirectional AC-DC 3-phase buck-type PWM rectifier coupled between at least one of said three phase-terminals of said Propulsion machine and a negative terminal of the DC_link of said Propulsion Inverter, and an Electromagnetic Interference (EMI) filter coupled between said 3-phase grid and said 3-phase buck-type PWM rectifier, wherein said windings of said Propulsion Machine are utilized as a DC-inductor, wherein said 3-phase buck-type PWM rectifier includes semiconductor switches $Q_1$, $Q_2$, $Q_3$, $Q_4$, $Q_5$, $Q_6$, each switch including a switch selected from a group of unidirectional switches including insulated-gate-bipolar-transistor (IGBT) coupled in series with a freewheeling diode, metal-oxide-semiconductor field-effect-transistors (MOSFETs) coupled in series with a freewheeling diode, silicon-controlled-rectifier (SCR), and combination thereof.

3. An onboard charger system for a battery in Plug-in Electric Vehicles (PEVs), wherein said onboard charger is operatively coupled to an AC 3-phase grid, comprising:

an onboard charger integrated with at least one Propulsion machine-Inverter Group built with a 3-phase Alternative Current (AC) Propulsion Machine having three phase-terminals and a Propulsion Inverter coupled to an input of said 3-phase AC Propulsion machine, said onboard charger being operatively coupled between a grid supplying AC voltage and a battery to charge said battery at a rated power of said 3-phase AC Propulsion machine, a controller supplying control signals to said Propulsion Machine-Inverter Group in a predetermined order depending on a required mode of operation of the PEV to attain efficient charging of said battery, wherein said mode of operation includes a propulsion mode of operation and a battery charging mode of operation, a bidirectional AC-AC three-phase buck-boost type PWM rectifier coupled to the Propulsion Machine's three phase-terminals, and an EMI filter coupled between said 3-phase grid and said bi-directional AC-AC three-phase buck-boost type PWM rectifier, wherein said bi-directional AC-AC three-phase buck-boost type PWM rectifier includes a first leg, a second leg and a third leg, each leg including bi-directional switches selected from a group including a pair of back-to-back connected IGBTs, a pair of back-to-back MOSFETs, bilateral triode thyristors (TRIACs), and combination thereof.

4. The onboard charger system of claim 2, wherein in said propulsion mode of operation, said battery provides propulsion power through said switches $S_1$-$S_6$ of said three-phase Propulsion Inverter, wherein in said battery charging mode of operation, said switches $S_1$ and $S_2$ of said Propulsion Inverter connected to a positive terminal of said unidirectional AC-DC 3-phase buck-type PWM rectifier are disabled, wherein $D_1$ and $D_2$ are reverse biased, and wherein said second and third legs containing said $S_4$ and $D_3$ and $S_6$ and $D_5$, respectively, are controlled in the interleaved regime.

5. The onboard charger system of claim 2, wherein during said battery charging mode of operation, said controller switches said semiconductor switches $Q_1$-$Q_6$ in active switching sub-modes I1, I2, I3, I4, I5, I6, and zero-switching sub-modes I0 and I7 in a predetermined order, wherein in each of said switching sub-mode, three out of six semiconductor switches $Q_1$-$Q_6$ are turned ON at a time, wherein during said active switching sub-modes, a DC current flows through respective three switches of said switches $Q_1$-$Q_6$ and said 3-phase grid, and said diode $D_2$ is reverse biased, and wherein in said zero-switching modes, said 3-phase grid is disconnected from said at least one Propulsion machine-Inverter Group.

6. The onboard charger system of claim 5, wherein said controller PWM switches said onboard charger in switching sub-modes I, II, III, IV, wherein, when a duty cycle D of said PWM switching 0<D<0.5, said controller PFM switches said two-channel interleaved boost controller in a periodical switching sequence I-III-II-III-I of said modes, wherein, when 0.5<D<1, said controller PWM switches said two-channel interleaved boost controller in a periodical switching sequence IV-I-IV-II-IV of said sub-modes, wherein in said sub-mode I, said controller turns ON said switch $S_4$, turns OFF said switch $S_6$, and said diode $D_5$ is in conducting state, wherein in said sub-mode II, said controller switches ON said switch $S_6$, turns OFF said switch $S_4$, and said diode $D_3$ is in conducting state, wherein in said sub-mode III, said controller turns OFF said switches $S_4$ and $S_6$, and said diodes $D_3$ and $D_5$ are in conducting state, and wherein in said sub-mode IV, said controller turns ON said switches $S_4$ and $S_6$, and reverse biases said diodes $D_3$ and $D_4$.

7. The onboard battery charger system of claim 3, wherein during said battery charging mode of operation, said switches $S_1$-$S_6$ of said first, second and third legs of said Propulsion Inverter are disabled by said controller, and said corresponding freewheeling diodes $D_1$-$D_6$ of said Propulsion Inverter are in conducting state, wherein said Propulsion machine windings $L_a$, $L_b$, $L_c$, and said freewheeling diodes $D_1$-$D_6$ create a three-phase buck-boost AC-DC converter, wherein the bi-directional switches $G_1$-$G_6$ of said first, second and third legs of said buck-boost type PWM rectifier are controlled by said controlled in a number of switching sub-modes in a predetermined order, wherein in each switching sub-mode, respective three out of six switches $G_1$-$G_6$ are turned ON, wherein each of said switching sub-modes includes a respective one of active switching modes I1-I6 to charge a corresponding winding of said Propulsion machine followed by a corresponding one of zero switching modes IO1-IO6 to discharge said corresponding winding of said Propulsion machine, wherein in said respective active switching sub-mode, one of said back-to-back switches is turned ON, and the diode corresponding to another switch in said two back-to-back switches conducts, thus creating a unidirectional rectifier leg, and wherein in said corresponding zero switching sub-mode, said switches $G_1$-$G_6$ are turned off, and three out of six diodes $D_1$-$D_6$ of said Propulsion Inverter conduct.

8. An onboard battery charger system for a battery in Plug-in Electric Vehicles (PEVs), comprising:

an onboard charger integrated with at least one Propulsion machine-Inverter Group built with a 3-phase Alternative Current (AC) Propulsion Machine having three phase-terminals and a Propulsion Inverter coupled to an input of said 3-phase AC Propulsion machine, said onboard charger being operatively coupled between a grid supplying AC voltage and a battery to charge said battery at a rated power of said 3-phase AC Propulsion machine, a controller supplying control signals to said Propulsion Machine-Inverter Group in a predetermined order depending on a required mode of operation of the PEV to attain efficient charging of said battery, wherein said mode of operation includes a propulsion mode of operation and a battery charging mode of operation, and a bi-directional DC-DC converter coupled between said Propulsion Inverter and said battery, wherein said bi-directional DC-DC converter is a converter selected from a group consisting of: non-isolated converter, isolated converter, non-isolated converter used in said propulsion mode of operation, isolated converter used in said battery charging mode of operation, and combinations thereof.

9. The onboard battery charger system of claim 8, wherein said onboard charger is operatively coupled to at least one grid selected from a group consisting of: AC 1-phase grid, AC 3-phase grid, and combination thereof.

10. An onboard charger system for a battery in Plug-In Electric Vehicles (PEVs), wherein said onboard charger is operatively coupled to an AC 3-phase grid, comprising:

an onboard charger integrated with at least one Propulsion machine-Inverter Group built with a 3-phase Alternative Current (AC) Propulsion Machine having three phase-terminals and a Propulsion Inverter coupled to an input of said 3-phase AC Propulsion machine, said onboard charger being operatively coupled between a grid supplying AC voltage and a battery to charge said battery at a rated power of said 3-phase AC Propulsion machine, and a controller supplying control signals to said Propulsion Machine-Inverter Group in a predetermined order depending on a required mode of operation of the PEV to attain efficient charging of said battery, wherein said mode of operation includes a propulsion mode of operation and a battery charging mode of operation.

* * * * *